United States Patent
Koinuma

(10) Patent No.: US 11,674,576 B2
(45) Date of Patent: Jun. 13, 2023

(54) SPEED-CHANGING DEVICE

(71) Applicant: Hitachi Construction Machinery Co., Ltd., Tokyo (JP)

(72) Inventor: Takuma Koinuma, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/911,158

(22) PCT Filed: Sep. 29, 2020

(86) PCT No.: PCT/JP2020/036938
§ 371 (c)(1),
(2) Date: Sep. 13, 2022

(87) PCT Pub. No.: WO2022/070261
PCT Pub. Date: Apr. 7, 2022

(65) Prior Publication Data
US 2023/0147860 A1   May 11, 2023

(51) Int. Cl.
*F16H 37/04*   (2006.01)
*F16H 61/70*   (2006.01)
*F16H 3/72*    (2006.01)
*E02F 9/20*    (2006.01)

(52) U.S. Cl.
CPC ............. *F16H 37/046* (2013.01); *F16H 3/72* (2013.01); *F16H 61/702* (2013.01); *E02F 9/202* (2013.01)

(58) Field of Classification Search
CPC ........ F16H 37/046; F16H 3/72; F16H 61/702; E02F 9/202
See application file for complete search history.

(56) References Cited

U.S. PATENT DOCUMENTS

2018/0023671 A1 *   1/2018   Watt ..................... A01D 69/002
                                                          74/15.4

FOREIGN PATENT DOCUMENTS

DE   102019205211 A1 *  11/2019  ............... B60K 6/08
EP       1 798 447 A1     6/2007
JP     2001-317611 A     11/2001
(Continued)

OTHER PUBLICATIONS

International Search Report (PCT/ISA/210) issued in PCT Application No. PCT/JP2020/036938 dated Nov. 17, 2020 with English translation (five (5) pages).
(Continued)

*Primary Examiner* — Justin Holmes
(74) *Attorney, Agent, or Firm* — Crowell & Moring LLP

(57) ABSTRACT

A speed-changing device (21) is provided with an input shaft (22), an output shaft (23), a planetary gear mechanism (29), a first variator (33), a second variator (34), and a controller (25). The planetary gear mechanism (29) is configured to include a carrier (29A) connected to the input shaft (22), a first sun gear (29B) connected to the first variator (33), and a second sun gear (29C) connected to the output shaft (23). The second variator (34) transmits power transmitted from the first variator (33) to the output shaft (23), or transmits power transmitted from the output shaft (23) to the first variator (33). The controller (25) changes the rotation speed of the first variator (33), thereby changing the rotation speed of the output shaft (23) in relation to the rotation speed of the input shaft (22).

9 Claims, 39 Drawing Sheets

(56) References Cited

FOREIGN PATENT DOCUMENTS

| JP | 2008-247269 A | 10/2008 | | |
|---|---|---|---|---|
| WO | WO 2006/027983 A1 | 3/2006 | | |
| WO | WO-2014098654 A1 | * | 6/2014 | ............. E02F 9/202 |
| WO | WO-2020035238 A1 | * | 2/2020 | |

OTHER PUBLICATIONS

Japanese-language Written Opinion (PCT/ISA/237) issued in PCT Application No. PCT/JP2020/036938 dated Nov. 17, 2020 (three (3) pages).

* cited by examiner

Fig.13

SPEED-CHANGING DEVICE

TECHNICAL FIELD

The present invention relates to speed-changing devices that are mounted on vehicles, such as wheel loaders or hydraulic excavators.

BACKGROUND ART

For example, Patent Document 1 describes a construction machine that performs transmission of power by a planetary stepless speed-changing mechanism composed of a combination of a planetary gear mechanism and an electric motor. According to the construction machine of Patent Document 1, the planetary stepless speed-changing mechanism is used to reduce a rapid change in a rotation speed of an engine, thus making it possible to suppress an operating speed of a cargo working machine from rapidly changing.

PRIOR ART DOCUMENT

Patent Document

Patent Document 1: Japanese Patent Laid-Open No. 2008-247269 A (Japanese Patent No. 5095252)

SUMMARY OF THE INVENTION

There is, however, the technology described in Patent Document 1 has a possibility that it cannot effectively use a speed-changing range in speed multiplication of a planetary stepless speed-changing mechanism.

An object of the present invention is to provide a speed-changing device that can effectively use a speed-changing range in speed multiplication of a planetary stepless speed-changing mechanism.

A speed-changing device according to a first aspect of the present invention comprises: an input shaft linked to a power source; an output shaft linked to a load; a planetary mechanism disposed between the input shaft and the output shaft; a first variator connected to the planetary mechanism; a second variator disposed apart from the first variator; and a controller configured to change a rotation speed of the first variator, characterized in that: the planetary mechanism is configured to include three members of a carrier, a first sun member rotating about a rotation center axis of the carrier and a second sun member rotating about the rotating center axis of the carrier, wherein a first member that is one of the three members in the planetary mechanism is connected directly or via another member to the input shaft, a second member apart from the first member of the three members in the planetary mechanism is connected directly or via another member to the first variator, a third member apart from the first member and the second member of the three members in the planetary mechanism is connected directly or via another member to the output shaft, and a planet member and a balance member are supported on the carrier of the planetary mechanism, the planet member and the balance member performing power transmission while revolving about the rotation center axis of the carrier and rotating with the first sun member and the second sun member, wherein the planetary mechanism distributes torque transmitted to the planetary mechanism from the power source to the second member and the third member, the planetary mechanism performs a rotation motion with two degrees of freedom between the first member, the second member and the third member, the second variator transmits power transmitted from the first variator to the load or the power source, or transmits power transmitted from the load or the power source to the first variator, and the controller changes a rotation speed of the first variator to change a rotation speed of the output shaft in relation to a rotation speed of the input shaft.

A speed-changing device according to a second aspect of the present invention comprises: an input shaft linked to a power source; an output shaft linked to a load; a planetary mechanism disposed between the input shaft and the output shaft; a first variator connected to the planetary mechanism; a second variator disposed apart from the first variator; and a controller configured to change a rotation speed of the first variator, characterized in that: the planetary mechanism is configured to include three members of a carrier, a sun member rotating about a rotation center axis of the carrier and a ring member positioned closer to a radial outside than the sun member and rotating about the rotation center axis of the carrier, wherein a first member that is one of the three members in the planetary mechanism is connected directly or via another member to the input shaft, a second member apart from the first member of the three members in the planetary mechanism is connected directly or via another member to the first variator, a third member apart from the first member and the second member of the three members in the planetary mechanism is connected directly or via another member to the output shaft, and a planet member is supported on the carrier of the planetary mechanism, the planet member performing power transmission while revolving about the rotation center axis of the carrier and rotating with the sun member and the ring member, wherein the planetary mechanism distributes torque transmitted to the planetary mechanism from the power source to the second member and the third member, the planetary mechanism performs a rotation motion with two degrees of freedom between the first member, the second member and the third member, the second variator transmits power transmitted from the first variator to the load or the power source, or transmits power transmitted from the load or the power source to the first variator, and the controller changes a rotation speed of the first variator to change a rotation speed of the output shaft in relation to a rotation speed of the input shaft, further comprising a first power transmission route as a power transmission route for transmitting the power from the power source through the planetary mechanism to the load, a second power transmission route that is disposed in parallel with the first power transmission route to transmit the power to the load by meshing of gears each other without via the planetary mechanism, and a first clutch disposed in the second power transmission route to switch the engagement and disengagement, wherein the controller engages the first clutch to perform power transmission through the second power transmission route.

According to the aspect of the present invention, it is possible to effectively use the speed-changing range in speed multiplication of the planetary stepless speed-changing mechanism including the planetary mechanism, the first variator and the second variator.

BRIEF DESCRIPTION OF THE DRAWINGS

FIG. 13 is a configuration diagram as similar to FIG. 3, showing a first modification example (configuration without external lockup).

MODE FOR CARRYING OUT THE INVENTION

Hereinafter, transmissions according to embodiments in the present invention will be in detail explained with reference to the accompanying drawings by taking a case of being applied to a wheel loader as an example.

Figure 1:
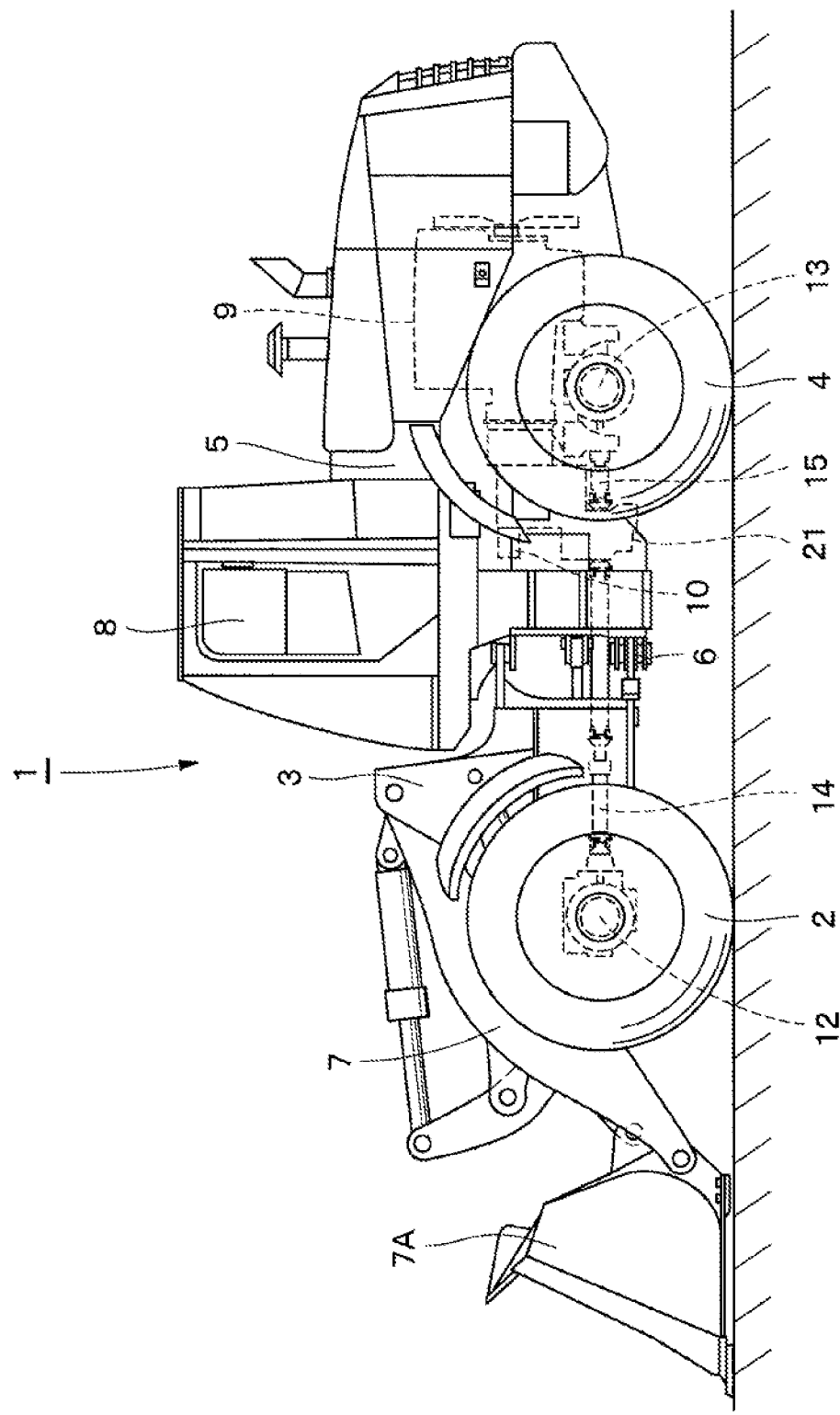
FIG. 1 is a left side view showing a wheel loader on which a speed-changing device according to a first embodiment of the present invention is mounted.

FIG. 1 to FIG. 12 show a first embodiment. In FIG. 1, a wheel loader 1 is a representative example of a vehicle (working machine). The wheel loader 1 is configured as an articulate type working vehicle in which a front vehicle body 3 provided with left and right front wheels 2 and a rear vehicle body 5 provided with left and right rear wheels 4 are connected to be capable of bending in the left-right direction. The front vehicle body 3 and the rear vehicle body 5 configure a vehicle body of the wheel loader 1. A center hinge 6 and a steering cylinder (not shown) are disposed between the front vehicle body 3 and the rear vehicle body 5, and expansion/contraction of the steering cylinder enables the front vehicle body 3 and the rear vehicle body 5 to bend about the center hinge 6 in the left-right direction. Thereby, the wheel loader 1 can perform the steering at the traveling.

Figure 3:
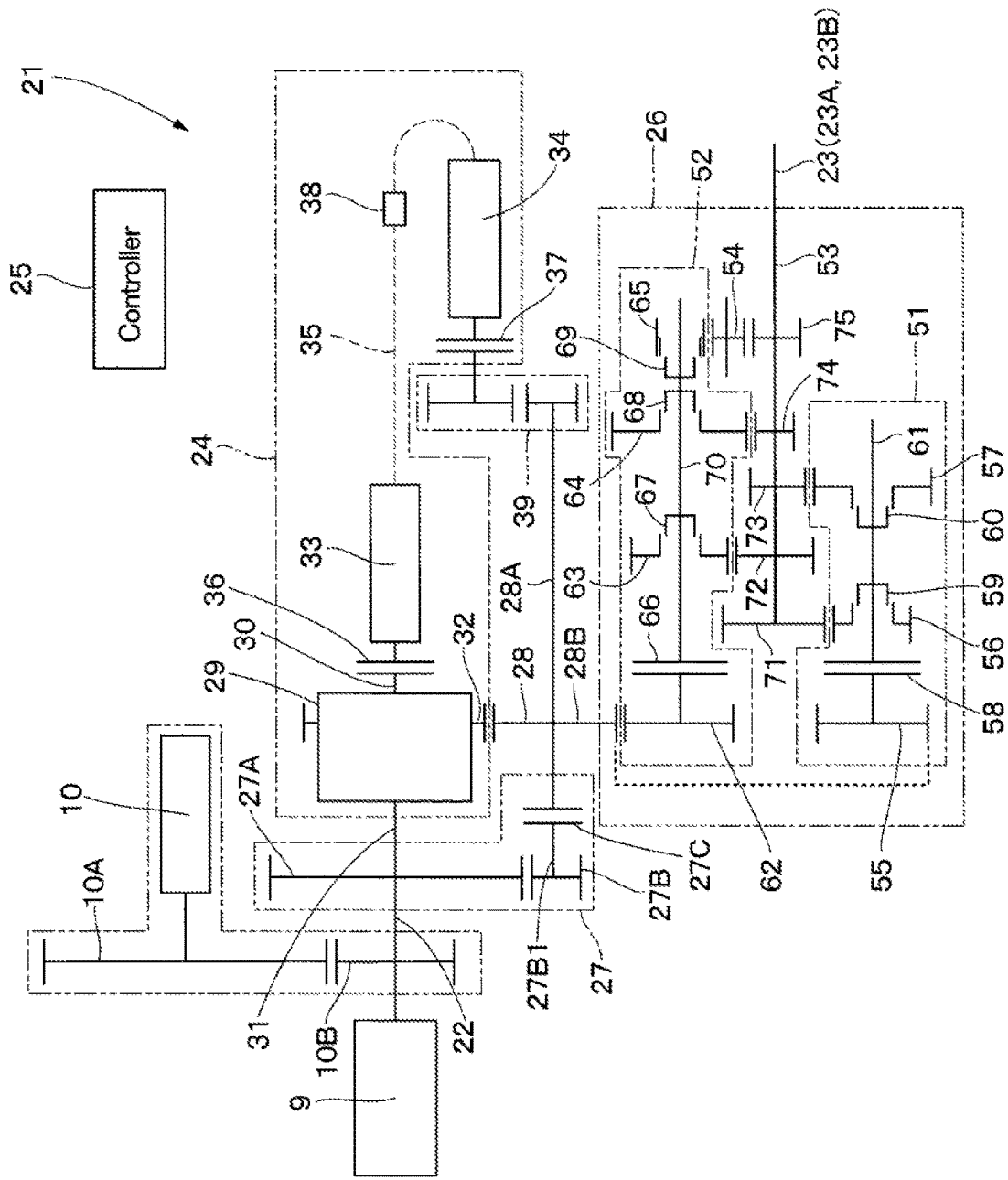
FIG. 3 is a configuration diagram showing the speed-changing device according to the first embodiment.

A cargo working machine 7 called also a working mechanism is disposed in the front vehicle body 3 of the wheel loader 1 to be capable of tilting/lifting thereto. The cargo working machine 7 is provided with a loader bucket 7A. On the other hand, a cab 8 that defines therein an operating room, an engine 9, a hydraulic pump 10, a speed-changing device 21 as a transmission (power transmission device) and the like are arranged in the rear vehicle body 5 of the wheel loader 1. The engine 9 is a power source (prime mover) of the wheel loader 1. The power source can be configured of the engine 9 as a unit that is an internal combustion engine, and besides, may be configured of, for example, an engine and an electric motor or an electric motor unit. The hydraulic pump 10 is connected to the engine 9. The hydraulic pump 10 is a hydraulic source for operating the cargo working machine 7. As shown in FIG. 3 to be described later, the hydraulic pump 10 is connected via gears 10A, 10B to the engine 9.

A front axle 12 extending in the left-right direction is provided under the front vehicle body 3. The left and right front wheels 2 are provided on both end sides of the front axle 12. On the other hand, a rear axle 13 extending in the left-right direction is provided under the rear vehicle body 5. The left and right rear wheels 4 are provided on both end sides of the rear axle 13.

The front axle 12 is connected through a front propeller shaft 14 to the speed-changing device 21. The rear axle 13 is connected through a rear propeller shaft 15 to the speed-changing device 21. The speed-changing device 21 increases and decreases rotation of the engine 9 to be transmitted to the front propeller shaft 14 and the rear propeller shaft 15. Power from the engine 9 is transmitted to the speed-changing device 21 connected to the engine 9.

Figure 2:
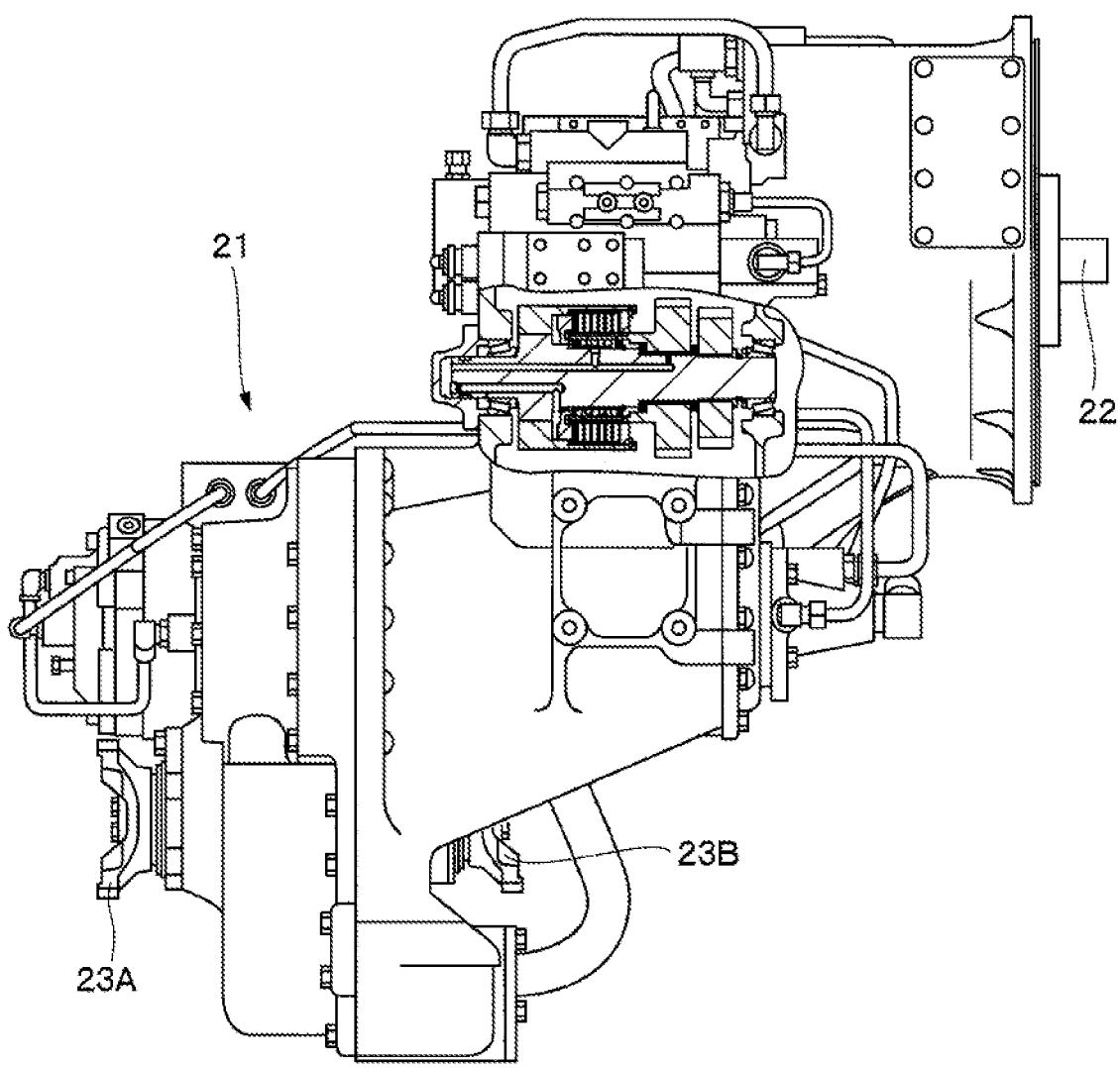
FIG. 2 is a partially broken side view showing the speed-changing device in FIG. 1.

The power from the engine 9 is adjusted in a rotation number and in a rotation direction by the speed-changing device 21, which is then transmitted from a front output shaft 23A and a rear output shaft 23B via the front propeller shaft 14 and the rear propeller shaft 15 to the front axle 12 and the rear axle 13. That is, as illustrated in FIG. 2, the speed-changing device 21 is provided with an input shaft 22 connected to the engine 9, a front output shaft 23A connected to the front propeller shaft 14 and a rear output shaft 23B connected to the rear propeller shaft 15. The speed-changing device 21 switches a power transmission route in the speed-changing device 21 to perform a speed change and a forward rotation/reverse rotation between the input shaft 22 and the output shafts 23A, 23B.

Next, an explanation will be made of an operation of the wheel loader 1. The wheel loader 1 repeats an operation pattern such as a V cycle in which a dump loading work is mainly performed or load and carry of direct input to a hopper or the like. The V cycle is the operation pattern of, after the starting-up, excavating earth and sand or the like, which is then loaded on a dump. The load and carry are the operation pattern of, after the starting-up, excavating earth and sand or the like, transporting it (high-load travel), discharging it to a dump, and deadheading (low-load travel). The wheel loader 1 needs to frequently switch the speed-changing device 21 for obtaining travel speeds and drive forces optimal to various working states of starting-up, transporting, loading, deadheading and the like.

At the excavating and the starting-up, the speed-changing device 21 needs a high traction force. Therefore, the speed-changing device 21 needs to increase a reduction ratio to raise output torque of the output shafts 23A, 23B. Further, even when a vehicle speed of the wheel loader 1 is 0 km/h (the rotation speed of the output shafts 23A, 23B are 0 km/h), the rotation speed of the input shaft 22 needs to be kept in a predetermined value or more in such a manner that the engine 9 as the power source does not stop, and a change gear ratio of the speed-changing device 21 needs to be limitless. It should be noted that the vehicle speed of the wheel loader 1 at the excavating is 0 to 4 km/h, for example.

At the transporting, the speed-changing device 21 needs to perform power transmission from the input shaft 22 to the output shafts 23A, 23B each in a high transmission efficiency for fuel saving. The vehicle speed at the transporting is 0 to 13 km/h, for example. On the other hand, in a case of discharging earth and sand to the dump, the wheel loader 1 raises up the cargo working machine 7 while transporting. Therefore, when a raising-up speed of the cargo working machine 7 rapidly slows, the cargo working machine 7 is possibly forced to collide with the dump. Therefore, upon approaching the dump, it is preferable to be capable of suppressing a rapid change in discharge flow rate of the hydraulic pump 10. In addition, in order to do so, it is necessary to control the speed-changing device 21 in such a manner that the rotation speed of the engine 9 does not change rapidly. At the time of discharging earth and sand to the dump, the vehicle speed for approaching the dump is 0 to 7 km/h, for example. In this vehicle speed, it is preferable to be capable of suppressing the rapid variation in a rotation speed of the engine 9.

At the deadheading of a vehicle traveling in a non-loading state in an ordinary road or in a working site, the speed-changing device 21 needs to perform the power transmission from the input shaft 22 to the output shafts 23A, 23B each in a high transmission efficiency for fuel saving. The vehicle speed at the deadheading is 0 to 40 km/h, for example. At the deadheading, a high operability of the cargo working machine 7 is not needed. Therefore, a rapid change in a rotation speed of the engine 9 is allowable. For fuel saving, however, the power transmission needs to be performed from the input shaft 22 to the output shafts 23A, 23B each in an efficiency higher than at the transporting.

Figure 11:
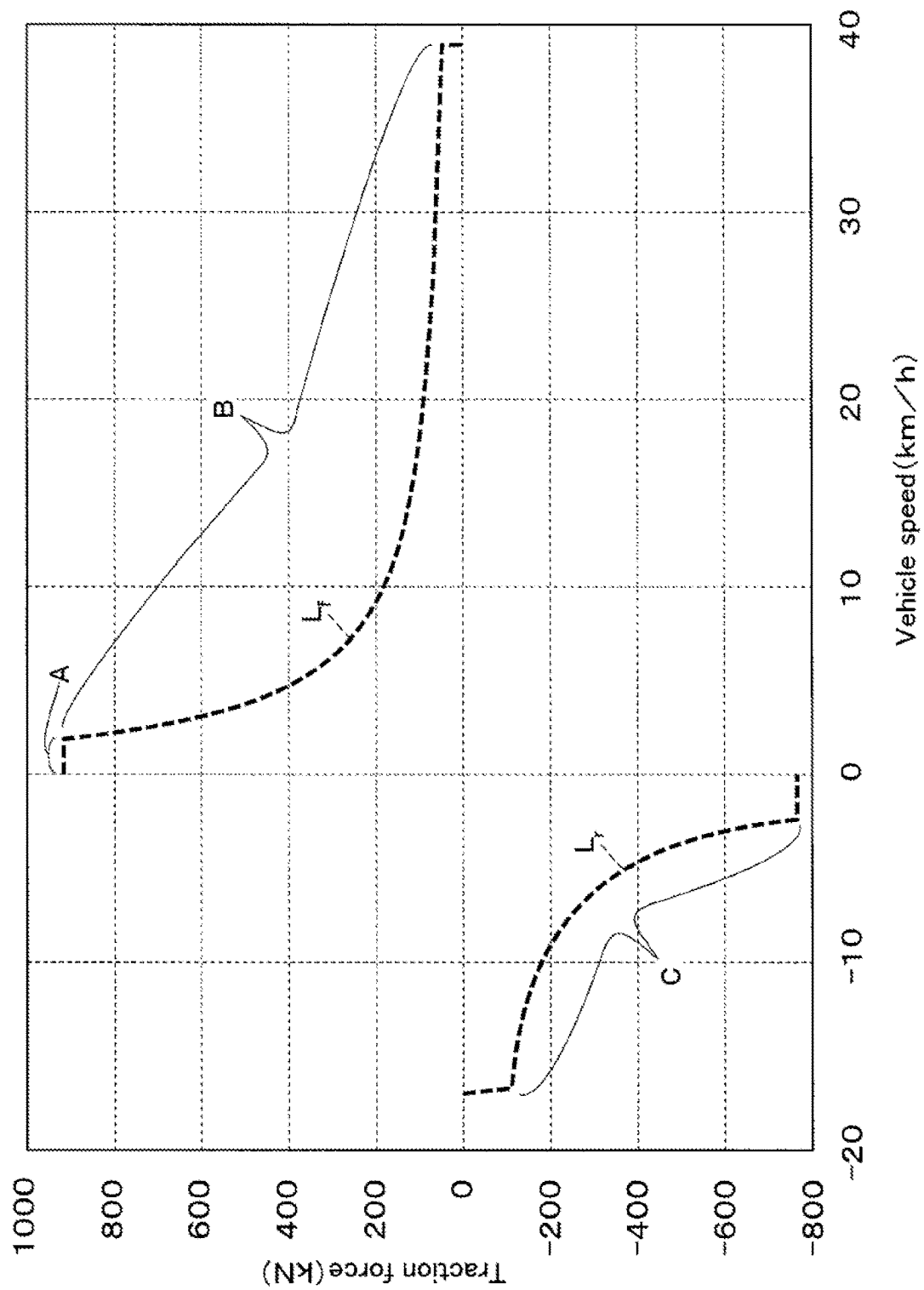
FIG. 11 is a drive force diagram showing an idealistic relation between vehicle speeds and traction forces of a wheel loader.

FIG. 11 shows an idealistic drive force diagram of the wheel loader 1. In FIG. 11, an idealistic drive force line Lf in the forward direction and an idealistic drive force line Lr in the backward direction (retreat direction) are shown. At the forwarding time, a high traction force is required at the excavating, and a travel in a high vehicle speed (0 to 40 km/h) is required at the deadheading. In addition, the wheel loader 1 needs to stably travel on the upslope at various grades provided in a quarry or the like. Therefore, for example, at a vehicle speed of 3 km/h or more, a traction force is preferably the iso-horsepower regardless of the vehicle speed.

A range A in FIG. 11 shows a range in which a high traction force is required for excavation, that is, a range A of a drive power line at the excavating. A range B in FIG. 11 shows a range in which a traction force of the iso-horsepower is required regardless of the vehicle speed, that is, a range B of a drive power line of the iso-horsepower in the forward direction. A range C in FIG. 11 shows a range in which a traction force of the iso-horsepower is required regardless of the vehicle speed, that is, a range C of a drive power line of the iso-horsepower in the backward direction. The following Formula 1 is established in the range B of the drive power line of the iso-horsepower in the forward direction and in the range C of the drive power line of the iso-horsepower in the backward direction.

Traction force [N]×vehicle speed [km/h]×(5/18)=constant        [Formula 1]

It should be noted that the wheel loader 1 does not perform excavation in the backward direction. Therefore, the maximum traction force of the idealistic drive force line Lr in the backward direction is lower than at the forwarding time.

Incidentally, in the speed-changing device 21 to be used in a working vehicle of the wheel loader 1 or the like, the switching between the power transmission by the stepless speed-changing mechanism and the power transmission by the lockup mechanism is preferably made possible. In this case, it is preferable that the speed-changing device 21 can effectively use the speed-hanging range in speed multiplication of the stepless speed-changing mechanism. In addition to it, at the switching from the power transmission by the stepless speed-changing mechanism to the power transmission by the lockup mechanism, it is preferable that a change in an acceleration/deceleration of a vehicle can be made small. In addition, in a case where an upper limit value of a rotation speed and an upper limit value of generation (absorption) possible torque of a variator are limited, it is possible to provide an arrangement (gear arrangement) in which a change gear ratio (gear ratio) of a planetary mechanism (planetary gear mechanism) becomes an optimal value, preferably improving a transmission efficiency of a stepless speed-changing mechanism.

Figure 4:
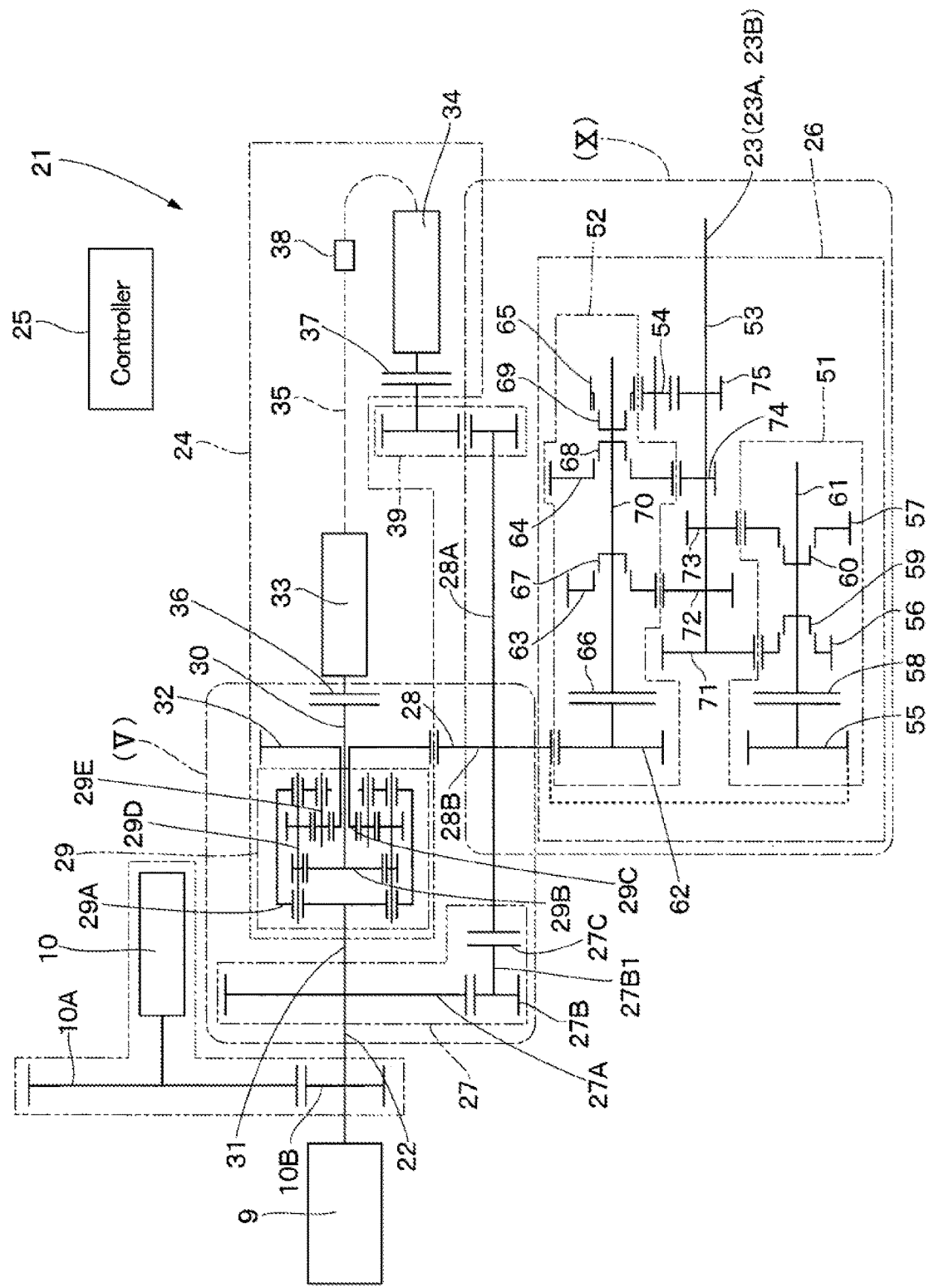
FIG. 4 is a configuration diagram showing the speed-changing device in FIG. 3 together with an internal part of a planetary mechanism.

Therefore, as shown in FIG. 3 and FIG. 4, the speed-changing device 21 according to the first embodiment is provided with a mode of transmitting power while steplessly speed-changing the planetary stepless speed-changing mechanism 24, a mode of transmitting power by internal lockup of the planetary stepless speed-changing mechanism 24 and a mode of transmitting power by an external lockup mechanism (a direct connecting mechanism 27) without via a planetary gear mechanism 29. The power transmission by the internal lockup is carried out by stopping rotation of a rotation member (for example, a first sun gear) linked to a first variator 33 of three rotation members (for example, a carrier, the first sun gear and a second sun gear) in the planetary gear mechanism 29. Thereby, it is possible to effectively use the speed-changing range in speed multiplication of the planetary stepless speed-changing mechanism 24.

On the other hand, the power transmission by the external lockup is performed via the external lockup mechanism (direct connecting mechanism 27) attached to an exterior of the planetary stepless speed-changing mechanism 24. In this case, the power transmission by the external lockup is performed in a state of stopping the power transmission by the planetary stepless speed-changing mechanism 24. This stop is performed by releasing (or reducing the torque) the rotation of the rotation member (for example, the first sun gear) linked to the first variator 33 of the three rotation members (for example, the carrier, the first sun gear and the second sun gear) in the planetary gear mechanism 29. Thereby, it is possible to transmit the power in a transmission efficiency higher than the internal lockup, and it is possible to perform the power transmission by further increasing the speed-changing range in speed multiplication of the planetary stepless speed-changing mechanism 24.

Figure 5:
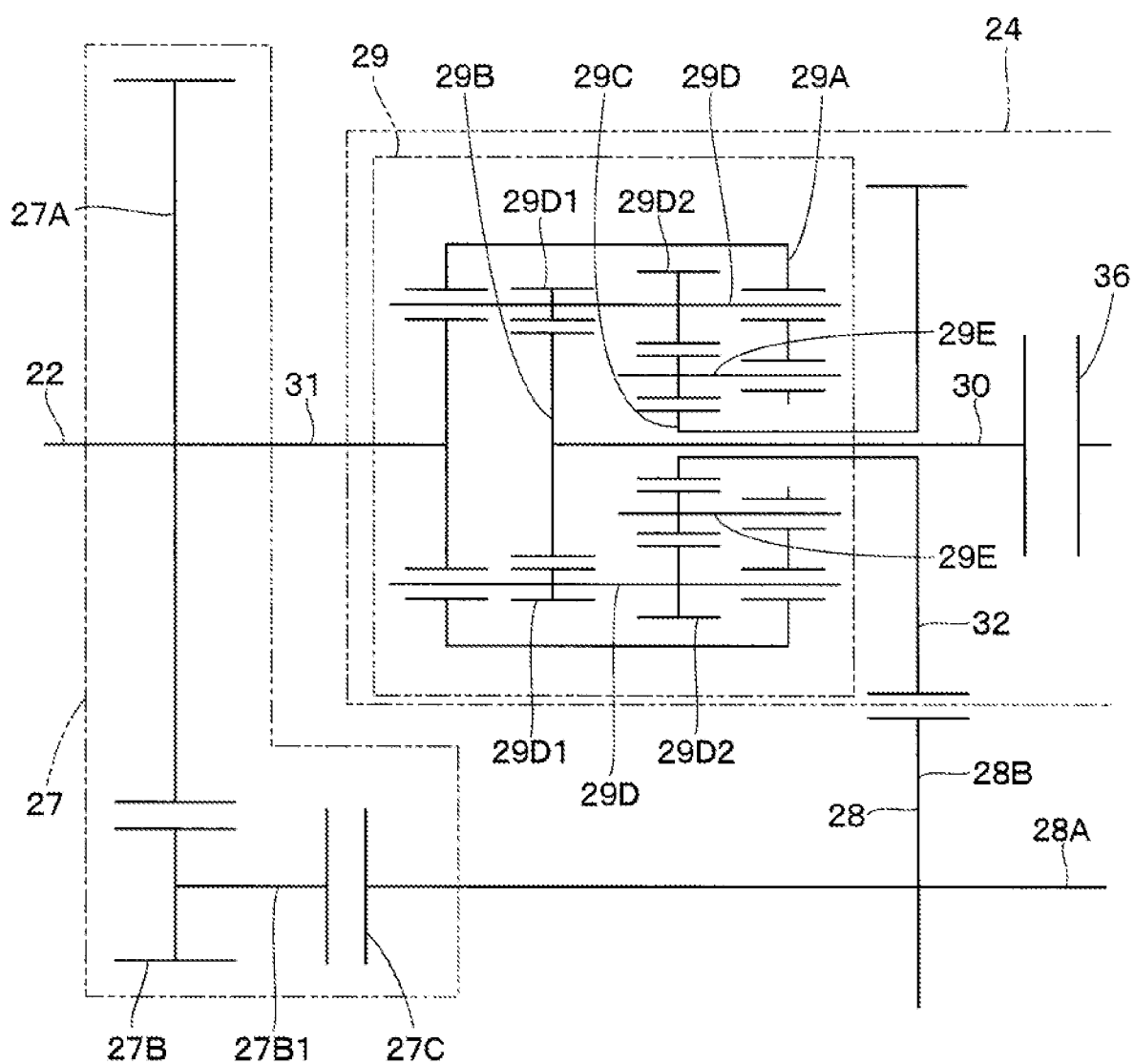
FIG. 5 is an enlarged view showing (V) part in FIG. 4.
Figure 6:
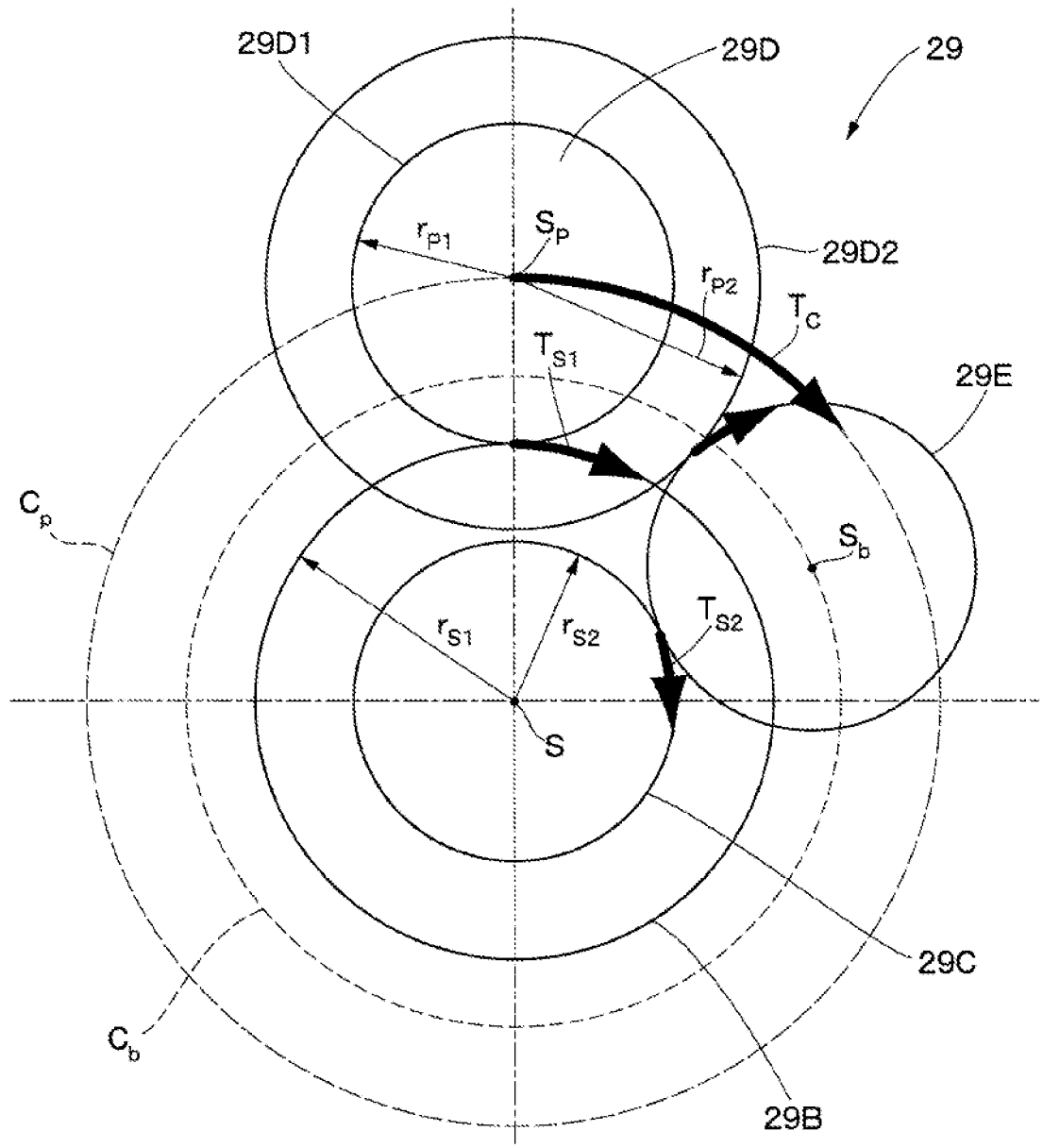
FIG. 6 is an explanatory diagram showing the planetary mechanism as viewed from a power source side.

Further, according to the first embodiment, as shown in FIG. 4 to FIG. 6, the planetary gear mechanism 29 is provided with two sun gears 29B, 29C, a planet gear 29D and a balance gear 29E revolving about a center axis S (FIG. 6) of the two sun gears 29B, 29C and rotating on its own axis, and one carrier 29A supporting the planet gear 29D and the balance gear 29E to be capable of rotating about the center axis S of the two sun gears 29B, 29C. Thereby, the planetary gear mechanism 29 can be provided with a gear arrangement in which a gear ratio becomes an optimal value. That is, by using the planetary gear mechanism 29 with this gear arrangement, even in a case of using the first variator 33 that is inexpensive and small-sized and in which the upper limit value of the rotation speed and the upper limit vale of the generation (absorption) possible torque are limited, it is possible to improve the transmission efficiency of the planetary stepless speed-changing mechanism 24.

Hereinafter, an explanation will be in detail made of the speed-changing device 21 according to the first embodiment. It should be noted that in FIG. 3, the planetary gear mechanism 29 in the speed-changing device 21 is shown in a box, and on the other hand, FIG. 4 shows an internal part of the planetary gear mechanism 29, that is, also a specific gear arrangement of the planetary gear mechanism 29. In addition, in FIG. 3 and FIG. 4, for avoiding complication of the figures, the output shaft 23 of the speed-changing device 21 is shown in a simple manner as the common output shaft 23 (=output shafts 23A, 23B) that transmits power to both of the front axle 12 and the rear axle 13. That is, in FIG. 3 and FIG. 4, the configuration of dividing the power to the output shaft 23A on the front side and the output shaft 23B on the rear side through, for example, a center differential mechanism or the like is omitted in illustration.

FIG. 3 and FIG. 4 are configuration diagrams of the speed-changing device 21 according to the first embodiment, more specifically the speed-changing device 21 provided with both of the internal lockup and the external lockup. The speed-changing device 21 is provided with the input shaft 22 as an input member, the output shaft 23 as an output member, the planetary stepless speed-changing mechanism 24 as a stepless speed-changing mechanism (main speed-changing mechanism), and a controller 25. In addition, more preferably the speed-changing device 21 is provided with a multistage speed-changing mechanism 26 as a stepped speed-changing mechanism (sub speed-changing mechanism), and a direct connecting mechanism 27 as an external lockup mechanism. The direct connecting mechanism 27 is provided with a first clutch 27C to be connected at the time of transmitting the power through the direct connecting mechanism 27. In addition, the speed-changing device 21 is provided with an idler element 28 (an idler shaft 28A and an idler gear 28B) that mechanically connects the planetary stepless speed-changing mechanism 24, the multistage speed-changing mechanism 26 and the direct connecting mechanism 27. The planetary stepless speed-changing mechanism 24 configures a first power transmission route. The direct connecting mechanism 27 configures a second power transmission route.

The engine 9 is connected to the input shaft 22 of the speed-changing device 21. The input shaft 22 is provided with the gear 10B for transmitting the power to the hydraulic pump 10. The input shaft 22 is provided with an input gear 27A of the direct connecting mechanism 27. The input shaft 22 is connected via a second connecting member 31 to be described later to the planetary stepless speed-changing mechanism 24 (more specifically, the planetary gear mechanism 29). On the other hand, the power is outputted from the output shaft 23 of the speed-changing device 21. The output shaft 23 of the speed-changing device 21 acts also as an output shaft 53 of the multistage speed-changing mechanism 26 to be described later. The power inputted from the input shaft 22 is transmitted via the planetary stepless speed-changing mechanism 24 or the direct connecting mechanism 27 to the idler element 28. The power transmitted to the idler element 28 is outputted through the multistage speed-changing mechanism 26 from the output shaft 23.

The planetary stepless speed-changing mechanism 24 forms a state of the internal lockup by stopping a first connecting member 30 for connecting the planetary gear mechanism 29 (for example, a first sun gear 29B) and the first variator 33. The state of the internal lockup is formed, for example, by braking the first variator 33 to stop the first connecting member 30. When the planetary stepless speed-changing mechanism 24 is in a state of the internal lockup, the power inputted from the input shaft 22 is transmitted through "a second connecting member 31 for connecting the planetary gear mechanism 29 (for example, a carrier 29A) and the input shaft 22", "the planetary gear mechanism 29", and "a third connecting member 32 for connecting the planetary gear mechanism 29 (for example, a second sun gear 29C) and the idler element 28" to the idler element 28. This internal lockup will be described later.

In the first embodiment, the power transmission route for transmitting the power inputted from the engine 9 to the input shaft 22 to the multistage speed-changing mechanism 26 can be selected from any one of three routes of the following (A), (B) and (C).

(A) Stepless speed-changing route (first power transmission route via the planetary stepless speed-changing mechanism 24) for transmitting the power inputted from the engine 9 to the input shaft 22 to the multistage speed-changing mechanism 26 in a state where the planetary stepless speed-changing mechanism 24 is steplessly speed-changed. At this time, a first clutch 27C is disengaged, and a second clutch 36 and a third clutch 37 are connected (engaged).

(B) Internal lockup route (first power transmission route via the planetary stepless speed-changing mechanism 24) for transmitting the power inputted from the engine 9 to the input shaft 22 to the multistage speed-changing mechanism 26 in a state where the planetary stepless speed-changing mechanism 24 is made in the internal lockup. At this time, the first clutch 27C is disengaged, and the second clutch 36 is connected (engaged). The third clutch 37 is connected (engaged) as needed.

(C) External lockup route (second power transmission route via the direct connecting mechanism 27 without via the planetary stepless speed-changing mechanism 24) for transmitting the power inputted from the engine 9 to the input shaft 22 via the direct connecting mechanism 27 to the multistage speed-changing mechanism 26. At this time, the first clutch 27C is connected (engaged), and the second clutch 36 and the third clutch 37 are disengaged as needed.

Thereby, at the time it is appropriate to steplessly speed-change the planetary stepless speed-changing mechanism 24, it is possible to perform the power transmission by steplessly speed-changing the planetary stepless speed-changing mechanism 24. At the time it is appropriate to make the planetary stepless speed-changing mechanism 24 operate in the internal lockup, it is possible to perform the power transmission by making the planetary stepless speed-changing mechanism 24 operate in the internal lockup. At the time it is appropriate to perform the power transmission via the direct connecting mechanism 27, the power transmission can be performed via the direct connecting mechanism 27.

At the time it is appropriate to perform the power transmission by steplessly speed-changing the planetary stepless speed-changing mechanism 24, the vehicle is at the excavating or at the transporting and the vehicle speed is in a range of 0 to 7 km/h. This reason is shown as the following (a) to (c).

(a) The transmission efficiency at the starting-up and at the excavating of a vehicle is high.

(b) It is possible to make a gear change ratio limitless. That is, even in a case where the engine 9 is at the rotating, it is possible to transmit the torque to the output shaft 23 while stopping the rotation of the output shaft 23. Therefore, the first embodiment is appropriate for the excavating work.

(c) It is possible to control the torque transmitted to the output shaft 23 through the speed-changing device 21 of the power generated by the engine 9. That is, the distribution of the power is made possible between the hydraulic pump 10 for operating the cargo working machine 7 and the speed-changing device 21.

At the time it is appropriate to perform the power transmission by making the planetary stepless speed-changing mechanism 24 operate in the internal lockup, the vehicle is at the transporting or at the deadheading and the vehicle speed is in a range of 7 to 9 km/h. This reason is shown as the following (d) and (e).

(d) As the vehicle speed becomes high, the transmission efficiency is higher in a case of performing the power transmission by making the planetary stepless speed-changing mechanism 24 operate in the internal lockup than by making the planetary stepless speed-changing mechanism 24 steplessly speed-change.

(e) The switch from the stepless speed change to the internal lockup can be performed mechanically. Therefore, at the switching from the stepless speed change to the internal lockup, a rapid change in rotation of the engine 9 can be suppressed. Thereby, a rapid change in a discharge flow rate of the hydraulic pump 10 can be suppressed to improve operability of the cargo working machine 7. Therewith, a change in torque of the output shaft 23 at the switching can be made small to improve a ride comfort of the wheel loader 1.

At the time it is appropriate to perform the transmission of the power via the direct connecting mechanism 27, the vehicle is at the transporting and the vehicle speed is in a range of 9 to 13 km/h. In addition, the vehicle is at the deadheading and the vehicle speed is in a range of 9 to 40 km/h. This reason is as follows. In the external lockup of performing the transmission of the power via the direct connecting mechanism 27, the transmission efficiency of the power is the highest. That is, since the power is transmitted in the external lockup by meshing of a pair of gears 27A, 27B each other, the transmission efficiency is higher than in the internal lockup of performing the power transmission via the planetary gear mechanism 29. When the vehicle speed is 9 km/h or less, there is a possibility that the excavation rapidly starts in the middle of the deadheading or transporting. On the other hand, in a case of switching the power transmission route from the direct connecting mechanism 27 (external lockup) to the planetary stepless speed-changing mechanism 24, it possibly takes time in this switching. Therefore, it is preferable not to use the direct connecting mechanism 27 when the vehicle speed is 9 km/h or less.

Table 1 as follows shows a combination of power transmission routes in the speed-changing device 21 provided with both of the internal lockup and the external lockup. In this case, the multistage speed-changing mechanism 26 is provided with a shift stage of a forward four-speed and a backward one-speed. Therefore, in a case of performing the power transmission via the direct connecting mechanism 27 (external lockup mechanism), the multistage speed-changing mechanism 26 can select a shift stage of a forward one-speed, a forward two-speed, a forward three-speed, a forward four-speed and a backward one-speed.

On the other hand, as to the backward, the speed change is made possible in three stages of a backward one-speed stepless speed change Lr1, a backward one-speed internal lockup Lr2 and a backward one-speed external lockup Lr3. Thereby, the drive force diagram can be made as close as possible to the idealistic drive force line Lr in the backward direction. As a result, a high traction force can be obtained at the excavating, and a high vehicle speed (0 to 40 km/h) can be obtained at the deadheading. In addition, the wheel loader 1 stably travels on the upslopes at various grades.

TABLE 1

| Name of power transmission state | Selection of planetary stepless speed-changing mechanism or external lockup mechanism | Multistage speed-changing mechanism | Vehicle speed [km/h] | Operation of wheel loader |
|---|---|---|---|---|
| forward one-speed stepless speed change | planetary stepless speed-changing mechanism (stepless speed-changing operation) | forward one-speed | 0 to 9 | excavation startup transport deadhead |
| forward one-speed internal lockup | planetary stepless speed-changing mechanism (internal lockup operation) | forward one-speed | 7 to 9 | transport deadhead |
| forward one-speed external lockup | external lockup mechanism | forward one-speed | 9 to 14 | transport deadhead |
| forward two-speed external lockup | external lockup mechanism | forward two-speed | 14 to 20 | deadhead |
| forward three-speed external lockup | external lockup mechanism | forward three-speed | 20 to 28 | deadhead |
| forward four-speed external lockup | external lockup mechanism | forward four-speed | 28 to 40 | deadhead |
| backward one-speed stepless speed change | planetary stepless speed-changing mechanism (stepless speed-changing operation) | backward one-speed | 0 to 9.9 | startup transport deadhead |
| backward one-speed internal lockup | planetary stepless speed-changing mechanism (internal lockup operation) | backward one-speed | 7.7 to 9.9 | transport deadhead |
| backward one-speed external lockup | external lookup mechanism | backward one-speed | 9.9 to 15.4 | transport deadhead |

It should be noted that even in a case where a speed stage of the multistage speed-changing mechanism 26 is any one of the forward two-speed, the forward three-speed and the forward four-speed, the power transmission may be performed via the planetary stepless speed-changing mechanism 24 without via the direct connecting mechanism 27. The operation of the planetary stepless speed-changing mechanism 24 at this time may be a stepless speed-changing operation or in a state of being in the internal lockup. However, when the planetary stepless speed-changing mechanism 24 is made to steplessly speed-change, the transmission efficiency of the planetary stepless speed-changing mechanism 24 is lower than in the internal lockup and the external lockup. Thereby, since the transmission efficiency of the speed-changing device 21 is lower, favorably it is preferable to select a combination of power transmission routes as shown in Table 1.

Figure 12:
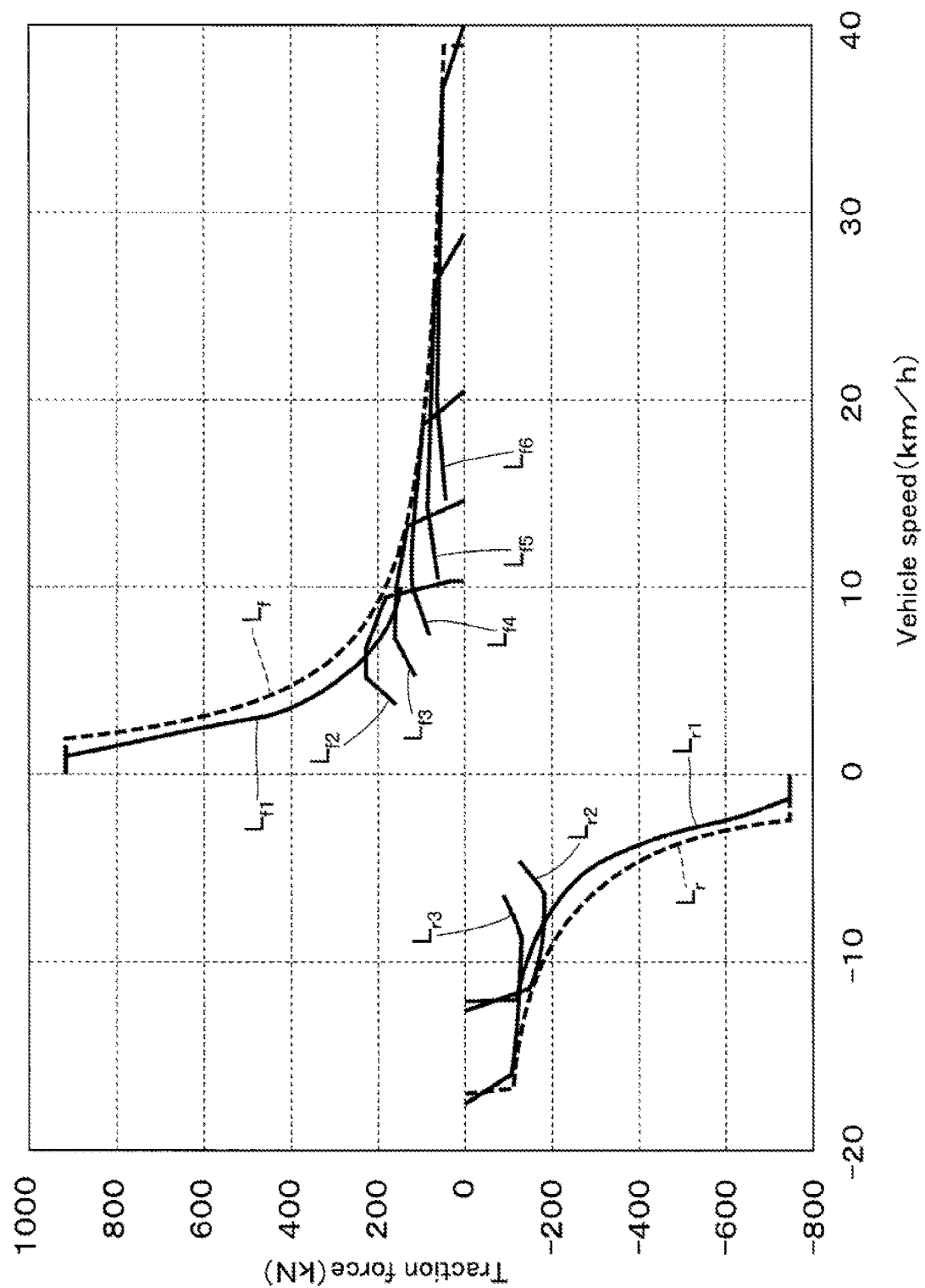
FIG. 12 is a drive force diagram showing an idealistic relation between vehicle speeds and traction forces of a wheel loader according to the first embodiment.

FIG. 12 shows a drive force diagram of the speed-changing device 21 in which the internal lockup and the external lockup both are present. As shown in FIG. 12, as to the forward, the speed change is made possible in six stages of a forward one-speed stepless speed change Lf1, a forward one-speed internal lockup Lf2, a forward one-speed external lockup Lf3, a forward two-speed external lockup Lf4, a forward three-speed external lockup Lf5 and a forward four-speed external lockup Lf6. Thereby, the drive force diagram can be made as close as possible to the idealistic drive force line Lf in the forward direction.

It should be noted that, for realizing a broad speed change ratio width, it is preferable that the speed-changing device 21 is provided with both of "the internal lockup of the planetary stepless speed-changing mechanism 24" and "the external lockup by the direct connecting mechanism 27". However, for achieving "to suppress a change in acceleration/deceleration of a vehicle at the switching of the power transmission from the stepless speed change to the lockup state while effectively using the speed changing range in speed multiplication of the planetary stepless speed-changing mechanism 24", the speed-changing device 21 may be provided with only one of the internal lockup and the external lockup.

Figure 13:
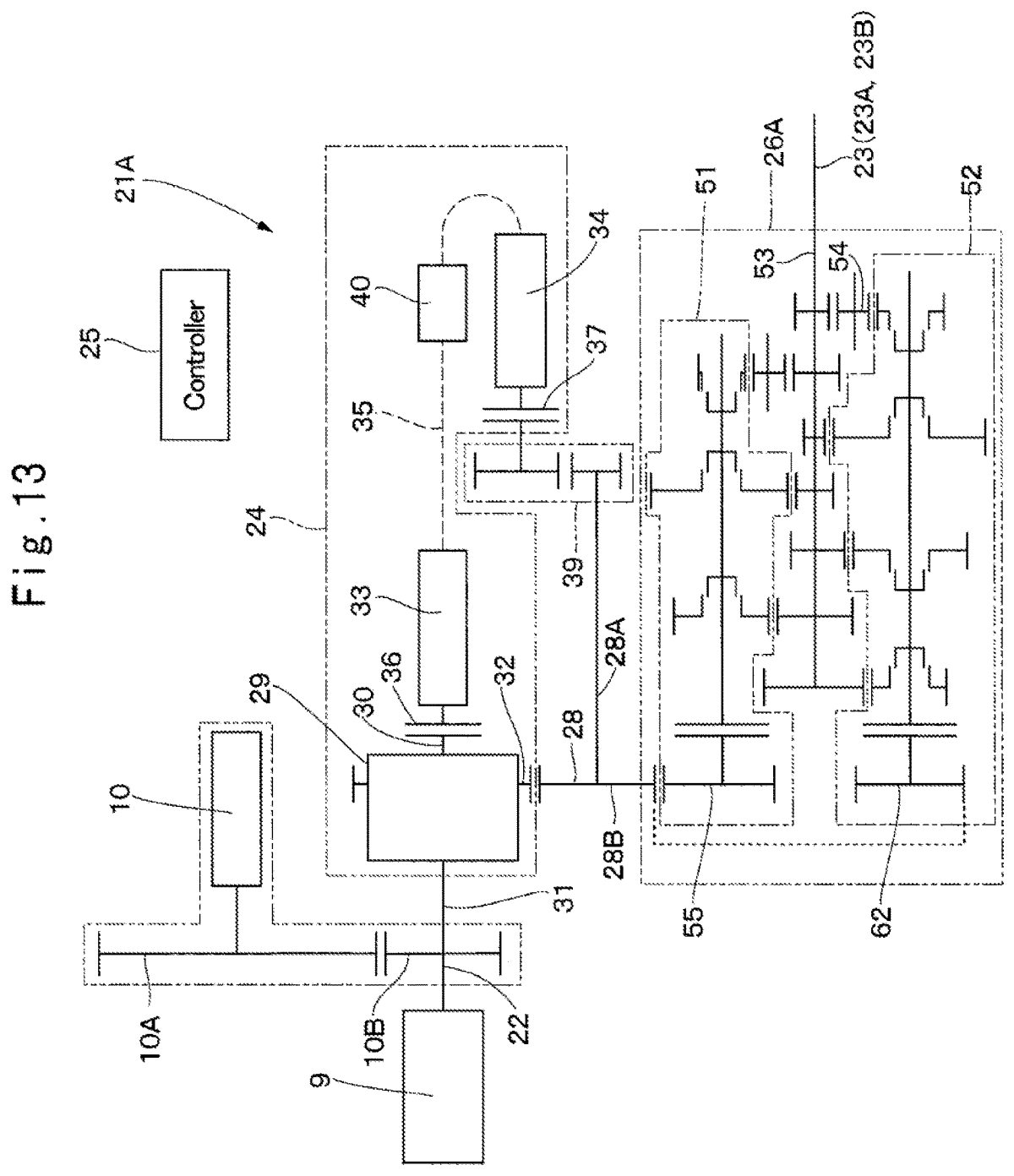

FIG. 13 shows a speed-changing device 21A according to a first modification example provided with only the internal lockup of the planetary stepless speed-changing mechanism 24 as a device for realizing the lockup. In the speed-changing device 21A according to the first modification example, the internal lockup operation of the planetary stepless speed-changing mechanism 24 is made possible but an external lockup mechanism (direct connecting mechanism 27) is not provided. Table 2 as follows shows a combination of power transmission routes of the speed-changing device 21A provided with the internal lockup only.

TABLE 2

| Name of power transmission state | Operation of planetary stepless speed-changing mechanism | Multistage speed-changing mechanism | Vehicle speed [km/h] | Operation of wheel loader |
|---|---|---|---|---|
| forward one-speed stepless speed change | planetary stepless speed-changing mechanism (stepless speed-changing operation) | forward one-speed | 0 to 9 | excavation startup transport deadhead |
| forward one-speed internal lockup | planetary stepless speed-changing mechanism (internal lockup operation) | forward one-speed | 7 to 9 | transport deadhead |
| forward two-speed internal lockup | planetary stepless speed-changing mechanism (internal lookup operation) | forward two-speed | 9 to 14 | transport deadhead |
| forward three-speed internal lockup | planetary stepless speed-changing mechanism (internal lockup operation) | forward three-speed | 14 to 20 | deadhead |
| forward four-speed internal lookup | planetary stepless speed-changing mechanism (internal lookup operation) | forward four-speed | 20 to 28 | deadhead |
| forward five-speed internal lockup | planetary stepless speed-changing mechanism (internal lockup operation) | forward five-speed | 28 to 40 | deadhead |
| backward one-speed stepless speed change | planetary stepless speed-changing mechanism (stepless speed-changing operation) | backward one-speed | 0 to 9.9 | startup transport deadhead |
| backward one-speed internal lockup | planetary stepless speed-changing mechanism (internal lockup operation) | backward one-speed | 7.7 to 9.9 | transport deadhead |
| backward two-speed internal lockup | planetary stepless speed-changing mechanism (internal lockup operation) | backward two-speed | 9.9 to 15.4 | transport deadhead |

Figure 14:
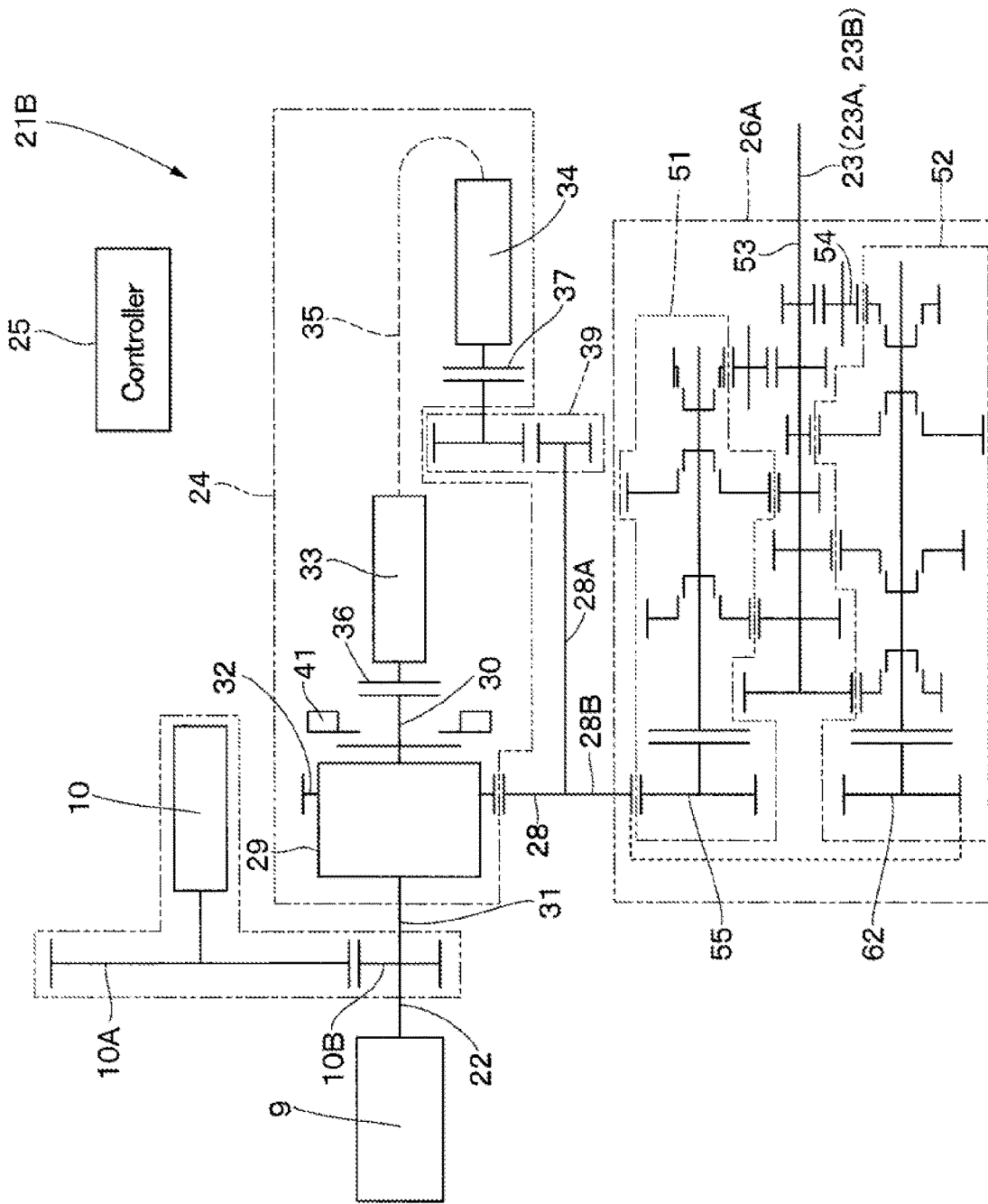
FIG. 14 is a configuration diagram as similar to FIG. 3, showing a second modification example (configuration for executing internal lockup by a brake).
Figure 15:
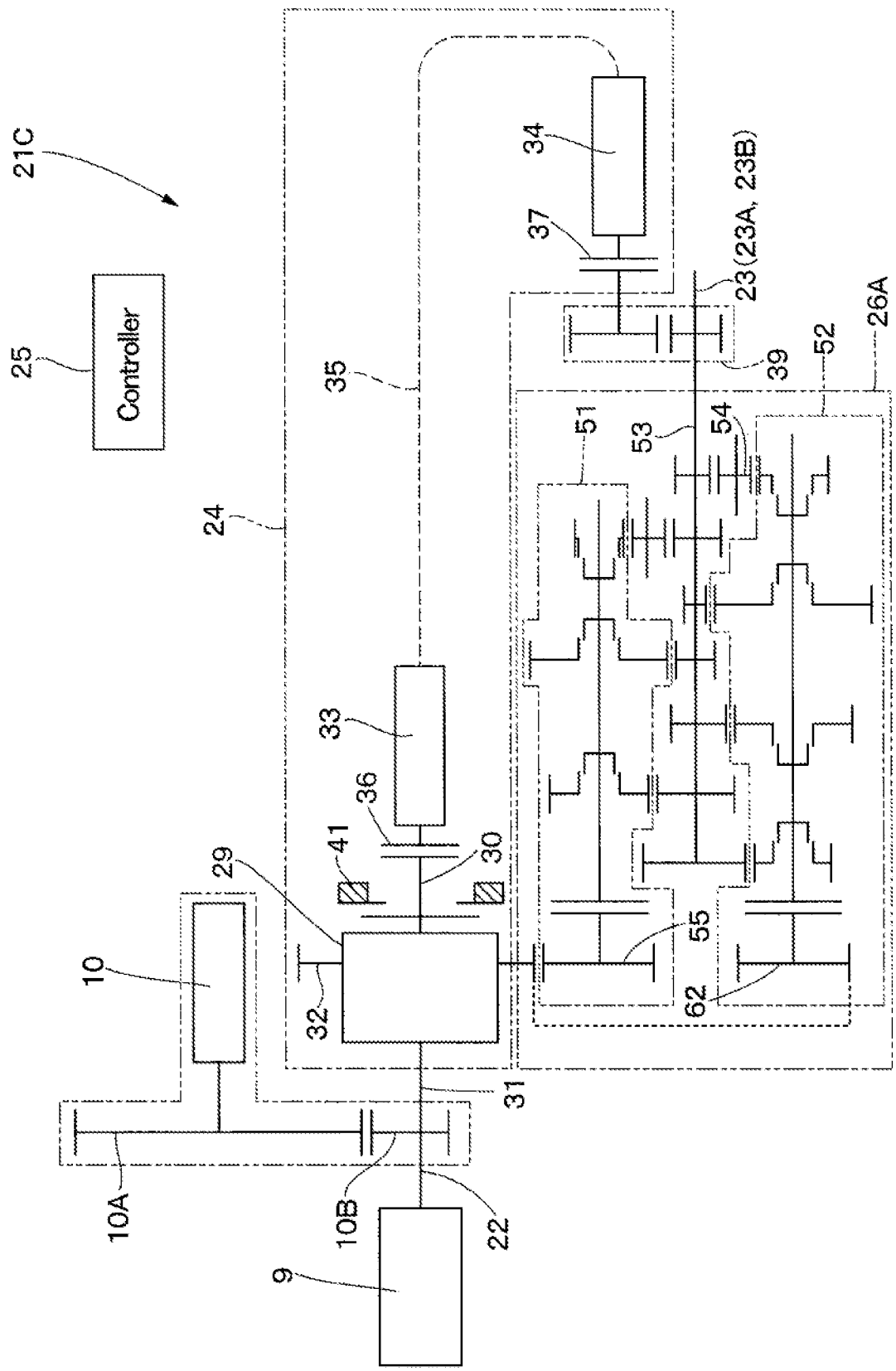
FIG. 15 is a configuration diagram as similar to FIG. 3, showing a third modification example (configuration for performing internal lockup by a brake and without an idling member).

In the first modification example, the speed shift stages by the direct connecting mechanism 27 (external lockup) are reduced by one speed shift stage. Therefore, for obtaining a speed change ratio equivalent to that of the speed-changing device 21 in which the internal lockup and the external lockup both are present, a multistage speed-changing mechanism 26A is provided with speed shift stages of forward five stages and backward two stages in the first modification example. In addition, the planetary stepless speed-changing mechanism 24 is provided with a block mechanism 40 for realizing the internal lockup as to be described later in the first modification example. FIG. 14 shows a speed-changing device 21B according to a second modification example. The speed-changing device 21B according to the second modification example also omits the external lockup mechanism as to be similar to the first modification example. The second modification example is provided with a brake mechanism 41 for realizing the internal lockup to be described later. Further, FIG. 15 shows a speed-changing device 21C according to a third modification example. The speed-changing device 21C according to the third modification example omits the external lockup mechanism and is provided with the brake mechanism 41, and further omits the idler element 28. That is, in a case of the configuration of omitting the direct connecting mechanism 27 (external lockup), the idler element 28 as well may be omitted.

Figure 16:
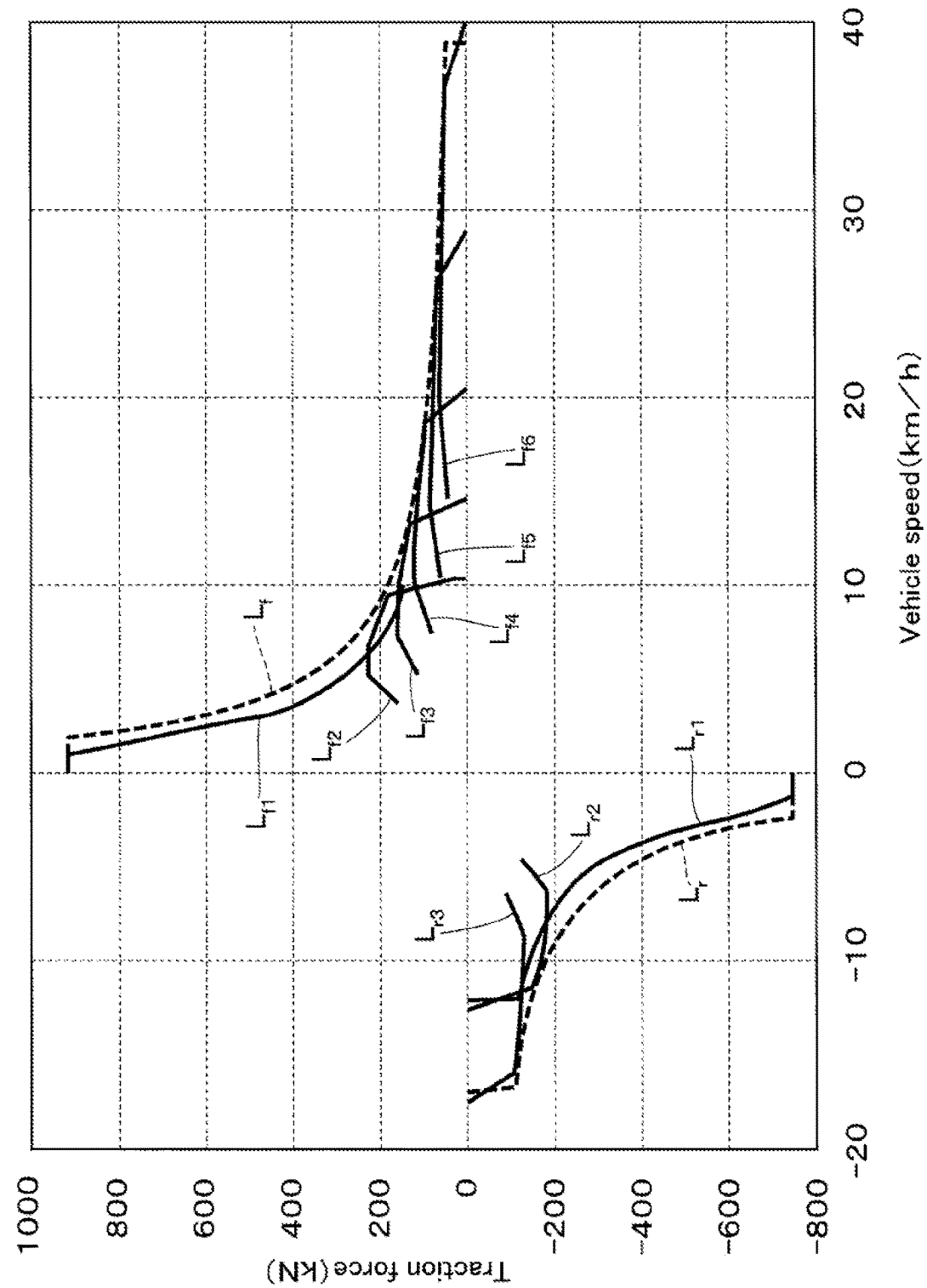
FIG. 16 is a drive force diagram showing a relation between vehicle speeds and traction forces of a wheel loader on which a speed-changing device without external lockup is mounted.

FIG. 16 shows drive force diagrams of the speed-changing devices 21A, 21B and 21C (FIG. 13, FIG. 14 and FIG. 15) provided with the planetary stepless speed-changing mechanism 24 (internal lockup) and not provided with the direct connecting mechanism 27 (external lockup). As shown in FIG. 16, as to the forward, the speed change is made possible in six stages of a forward one-speed stepless speed change Lf1, a forward one-speed internal lockup Lf2, a forward two-speed internal lockup Lf3, a forward three-speed internal lockup Lf4, a forward four-speed internal lockup Lf5 and a forward five-speed internal lockup Lf6. On the other hand, as to the backward, the speed change is made possible in three stages of a backward one-speed stepless speed change Lr1, a backward one-speed internal lockup Lr2 and a backward two-speed internal lockup Lr3.

On the other hand, the configuration of being provided with the external lockup only can be realized by not performing the internal lockup operation in the speed-changing device 21 (FIG. 3 and FIG. 4) in the first embodiment. Table 3 as follows shows a combination of power transmission routes of the speed-changing device 21 that is provided with the external lockup (direct connecting mechanism 27) but does not perform the internal lockup operation.

TABLE 3

| Name of power transmission state | Selection of planetary stepless speed-changing mechanism or external lockup mechanism | Multistage speed-changing mechanism | Vehicle speed [km/h] | Operation of wheel loader |
|---|---|---|---|---|
| forward one-speed stepless speed change | planetary stepless speed-changing mechanism (stepless speed-changing | forward one-speed | 0 to 9 | excavation startup transport |

TABLE 3-continued

| Name of power transmission state | Selection of planetary stepless speed-changing mechanism or external lockup mechanism | Multistage speed-changing mechanism | Vehicle speed [km/h] | Operation of wheel loader |
|---|---|---|---|---|
| | operation) | | | deadhead |
| forward one-speed external lockup | external lockup mechanism | forward one-speed | 9 to 14 | transport deadhead |
| forward two-speed external lockup | external lockup mechanism | forward two-speed | 14 to 29 | deadhead |
| forward three-speed external lockup | external lockup mechanism | forward three-speed | 20 to 28 | deadhead |
| forward four-speed external lockup | external lockup mechanism | forward four-speed | 28 to 40 | deadhead |
| backward one-speed stepless speed change | planetary stepless speed-changing mechanism (stepless speed-changing operation) | backward one-speed | 0 to 9.9 | startup transport deadhead |
| backward one-speed external lockup | external lockup mechanism | backward one-speed | 9.9 to 15.4 | transport deadhead |

Figure 17:
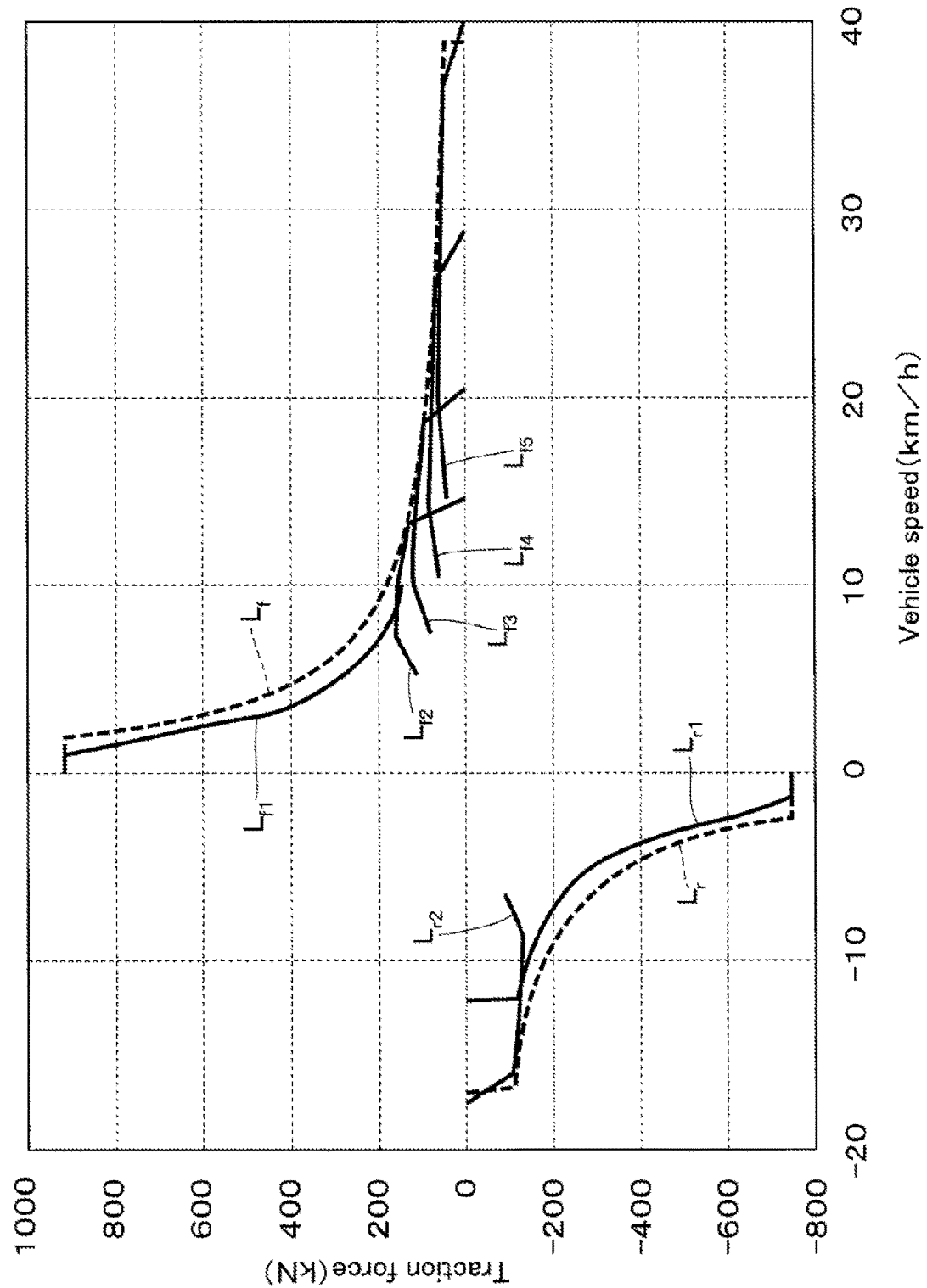
FIG. 17 is a drive force diagram showing a relation between vehicle speeds and traction forces of a wheel loader on which a speed-changing device without internal lockup is mounted.

FIG. 17 is a drive force diagrams showing the speed-changing device 21 that does not perform the internal lockup operation. As shown in FIG. 17, as to the forward, the speed change is made possible in five stages of a forward one-speed stepless speed change Lf1, a forward one-speed external lockup Lf2, a forward two-speed external lockup Lf3, a forward three-speed external lockup Lf4 and a forward four-speed external lockup Lf5. On the other hand, as to the backward, the speed change is made possible in two stages of a backward one-speed stepless speed change Lr1 and a backward one-speed external lockup Lr2.

Next, an explanation will be made of the planetary stepless speed-changing mechanism 24 with reference to FIG. 3. The planetary stepless speed-changing mechanism 24 is provided with the planetary gear mechanism 29, the first variator 33, a second variator 34, a transmission element 35, the second clutch 36 and the third clutch 37. The planetary gear mechanism 29 is connected via the first connecting member 30 to a first output side (first variator 33-side). The planetary gear mechanism 29 is connected via a second connecting member 31 to an input side (engine 9-side). The planetary gear mechanism 29 is connected via the third connecting member 32 to a second output side (idler element 28-side).

The first variator 33 and the second variator 34 are configured of electric motors/generators (electric motor, electric generator), or hydraulic pumps/motors (hydraulic pump, hydraulic motor) and the like. The first variator 33 and the second variator 34, in a case where a rotation speed of the first variator 33 is different from a rotation speed of the second variator 34, can perform the power transmission between them while steplessly performing the speed change. Therefore, the transmission element 35 is disposed between the first variator 33 and the second variator 34 to transmit the power therebetween. The transmission element 35 is configured of, for example, an electrical wire or a hydraulic pipeline. A power storage source 38 may be attached in the middle of the transmission element 35. The power storage source 38 may be configured of, for example, a hydraulic accumulator or a battery. A function of the first variator 33, the second variator 34 and the transmission element 35 may be configured of a transmission with a limitless speed change ratio (IVT).

The second clutch 36 is disposed between the planetary gear mechanism 29 and the first variator 33, that is, between the first connecting member 30 and the first variator 33. The second clutch 36 is configured of, for example, a clutch (friction plates) by friction joint, a dog clutch or a dog clutch with synchromesh. The second clutch 36 performs mechanical engagement (connection) and disengagement of the first connecting member 30 and the first variator 33 therebetween. That is, the second clutch 36 switches transmission and release of power of the planetary gear mechanism 29 and the first variator 33 between the planetary gear mechanism 29 and the first variator 33.

The controller 25 is configured of a microcomputer provided with, for example, a calculation circuit (CPU), a memory and the like. The controller 25 controls engagement and disengagement of the first clutch 27C, engagement and disengagement of the second clutch 36 and engagement and disengagement of the third clutch 37. The controller 25 controls a rotation speed of the first variator 33. The controller 25 controls a rotation speed of the second variator 34 as needed. The controller 25 controls the transmission element 35 and the power storage source 38 as needed. The controller 25 controls the block mechanism 40 (FIG. 13) and the brake mechanism 41 (FIG. 14 and FIG. 15) to be described later, as needed. Further, the controller 25 controls engagement and disengagement of clutches 58, 59, 60, 66, 67, 68, 69 in the multistage speed-changing mechanism 26 to be described later.

Here, the controller 25 controls the engagement and disengagement of the second clutch 36. For example, when the power transmission by the planetary stepless speed-changing mechanism 24 is unnecessary, the controller 25 outputs a signal for disengaging the second clutch 36 to disengage the second clutch 36. Thereby, the rotation of the first variator 33 can be stopped (or reduced) to reduce power loss due to the rotation of the first variator 33.

The second variator 34 is connected via the third clutch 37 to the idler element 28. The third clutch 37 switches transmission and release of power of the second variator 34 and the idler element 28 between the second variator 34 and the idler element 28. That is, the third clutch 37 is disposed between the second variator 34 and the idler element 28. The idler element 28 is provided with the idler shaft 28A and the idler gear 28B disposed in the idler shaft 28A. The idler shaft 28A is connected via the first clutch 27C to a lockup gear 27B (more specifically, a rotation shaft 27B1 of the lockup gear 27B) of the direct connecting mechanism 27.

In addition, the idler shaft 28A is connected via a transmission 39 and the third clutch 37 to the second variator 34. The idler gear 28B is meshed with the third connecting member 32 and is connected via the third connecting member 32 to the planetary gear mechanism 29. The transmission 39 is disposed between the second variator 34 and the idler element 28 to perform a speed change between the second variator 34 and the idler element 28. This transmission 39 may be omitted. In this case, the third clutch 37 is disposed between the idler shaft 28A of the idler element 28 and a rotation shaft of the second variator 34, and can perform connection (engagement) and disengagement of the idler shaft 28A and the rotation shaft of the second variator 34.

The third clutch 37 is configured of, for example, a clutch (friction plates) by friction joint, a dog clutch or a dog clutch with synchromesh. The third clutch 37 performs mechanical engagement (connection) and disengagement of the second variator 34 and the idler element 28 therebetween. The controller 25 controls the engagement and disengagement of the third clutch 37. For example, when the power transmission by the second variator 34 is unnecessary, the controller 25 outputs a signal for disengaging the third clutch 37 to disengage the third clutch 37. Thereby, the rotation of the second variator 34 can be stopped (or reduced) to reduce power loss due to the rotation of the second variator 34. However, the third clutch 37 is not necessarily disengaged under these conditions.

It should be noted that when the power transmission by the second variator 34 is unnecessary and when the power transmission by the planetary stepless speed-changing mechanism 24 is unnecessary, for example, the conditions are as the following (f) to (i). However, the second clutch 36 or the third clutch 37 is not necessarily disengaged under these conditions of (f) to (i).

(f) When the power inputted from the input shaft 22 is transmitted via the direct connecting mechanism 27 to the idler element 28.

(g) When the planetary stepless speed-changing mechanism 24 is in the internal lockup state by fixing the rotation of the first connecting member 30 by a device other than the first variator 33 (for example, the brake mechanism 41).

(h) When a vehicle is stopped.

(i) When a vehicle is gliding (inertia travel).

The power transmitted to the second connecting member 31 from the engine 9 is distributed to the first connecting member 30 linked to the first variator 33 and the third connecting member 32 linked to the idler element 28 by the planetary gear mechanism 29. The power distributed to the first connecting member 30 is transmitted through the second clutch 36, the first variator 33, the transmission element 35, the second variator 34, the third clutch 37 and the transmission 39 to the idler element 28. The power distributed to the third connecting member 32 is transmitted to the idler element 28. A distribution ratio in torque between the first connecting member 30 and the third connecting member 32 is always constant and depends upon a type and a mesh radius of gears of the planetary gear mechanism 29.

However, the distribution ratio in torque between the first connecting member 30 and the third connecting member 32 is constant. Therefore, the power is not always transmitted from the first variator 33 to the second variator 34, and in some cases the power is transmitted from the second variator 34 to the first variator 33. The power to be transmitted from the third connecting member 32 to the idler element 28 is smaller in a loss than the power via the first variator 33 and the second variator 34 from the first connecting member 30. Therefore, the planetary stepless speed-changing mechanism 24 in which the variators 33, 34 and the planetary gear mechanism 29 are combined has a higher power transmission efficiency than the stepless speed-changing device configured to perform the power transmission by the variator only.

Next, an explanation will be made of the planetary gear mechanism 29. In FIG. 3, the planetary gear mechanism 29 is shown in a square (block). Here, the planetary gear mechanism 29 is provided with three members (rotation members) of a first member linked to the engine 9 as a power source, a second member linked to the first variator 33 and a third member linked to the idler element 28 on the side of the output shaft 23. Here, in the first embodiment the planetary gear mechanism 29 is configured of the carrier and the two sun gears (the first sun gear and second sun gear). Table 4 as follows shows a combination of the configuration elements (the carrier, first sun gear and second sun gear) in the planetary gear mechanism 29. "No. 1-A" in Table 4 is the most preferable from a viewpoint of improving the transmission efficiency of the planetary stepless speed-changing mechanism 24 and configuring the planetary gear mechanism 29 in a small size and a light weight.

TABLE 4

Figure 18:
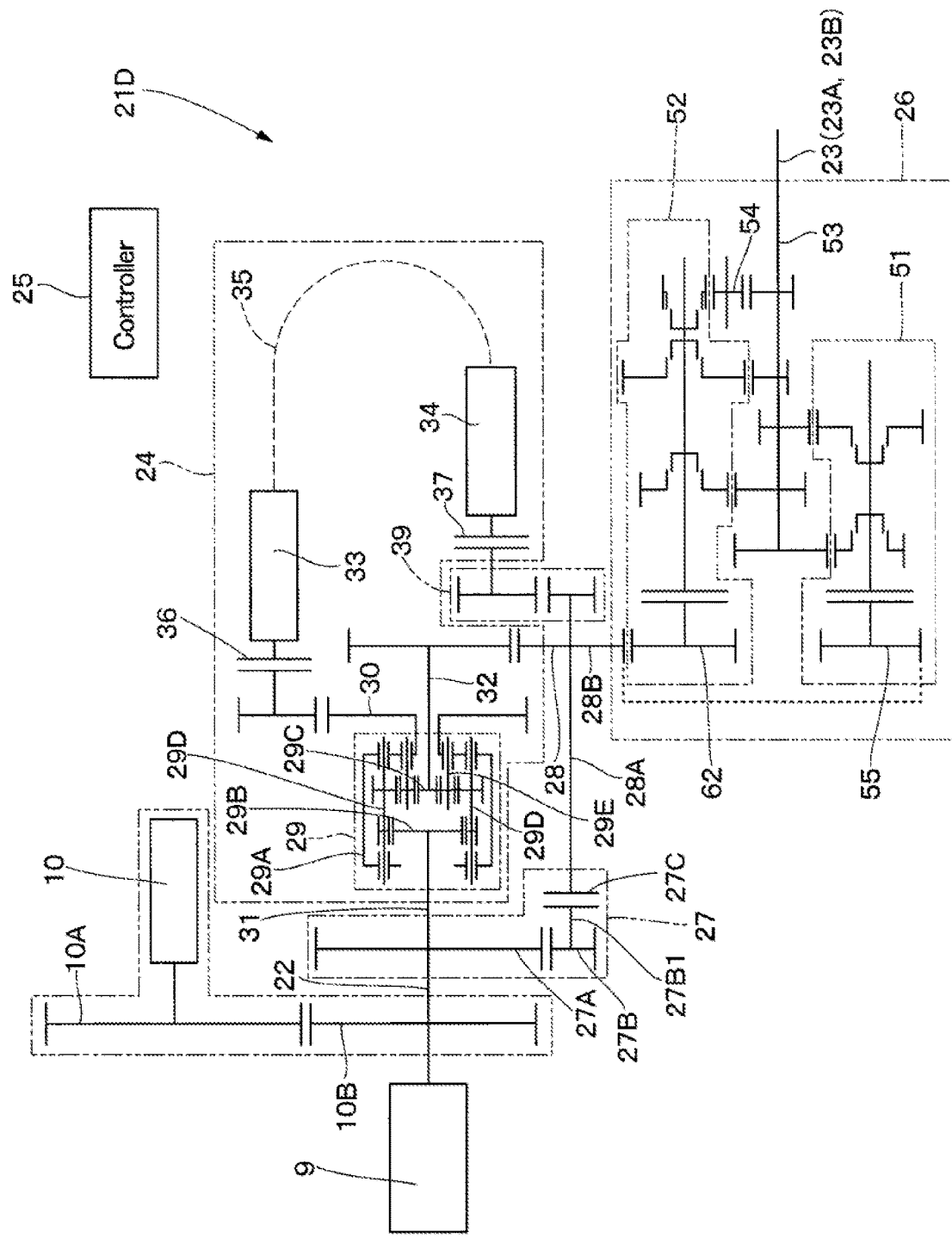
FIG. 18 is a configuration diagram as similar to FIG. 4, showing a fourth modification example (configuration in which an input shaft is connected to a first sun member and a first variator is connected to a carrier).
Figure 19:
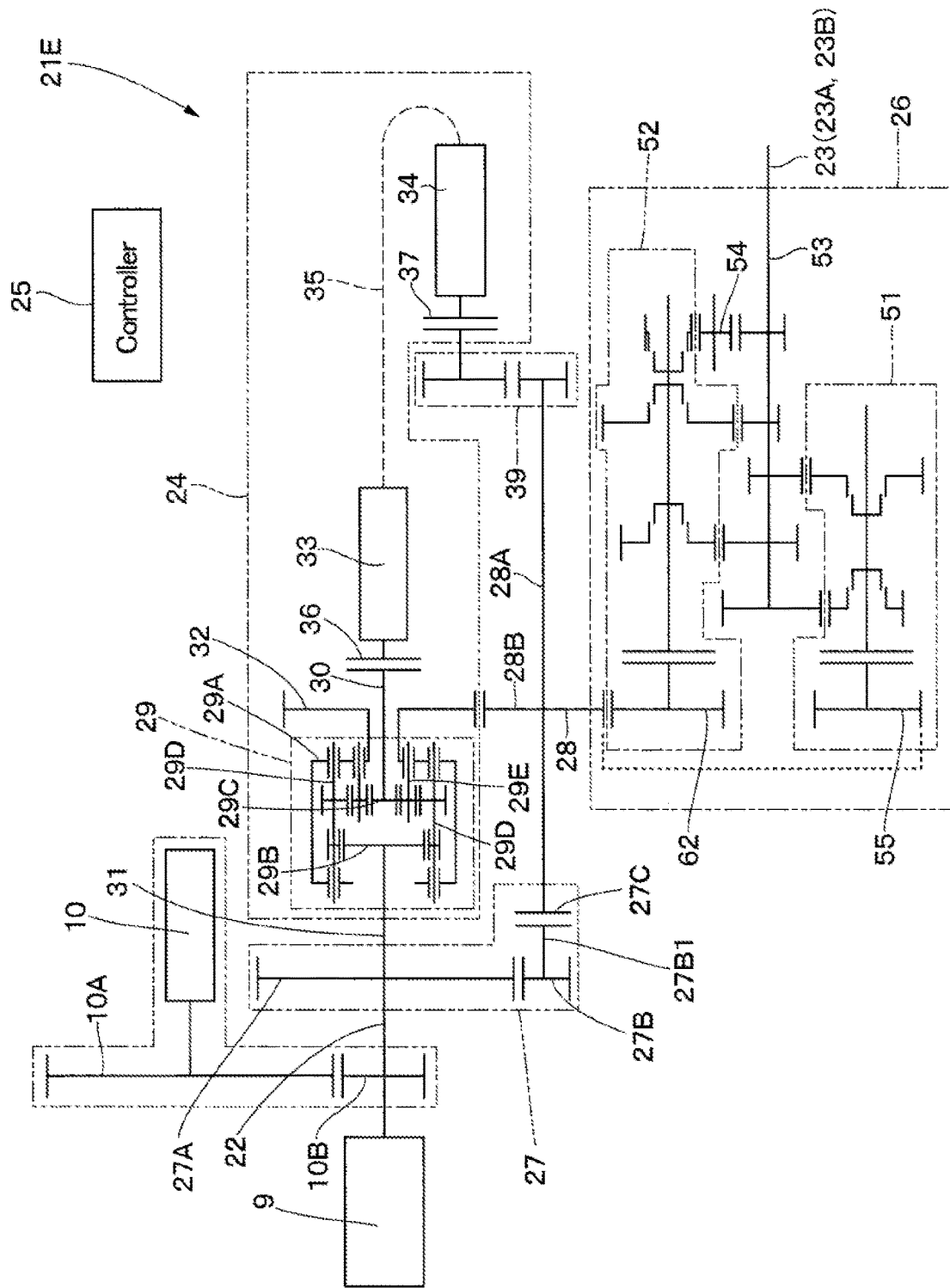
FIG. 19 is a configuration diagram as similar to FIG. 4, showing a fifth modification example (configuration in which an input shaft is connected to a first sun member and a first variator is connected to a second sun member).
Figure 20:
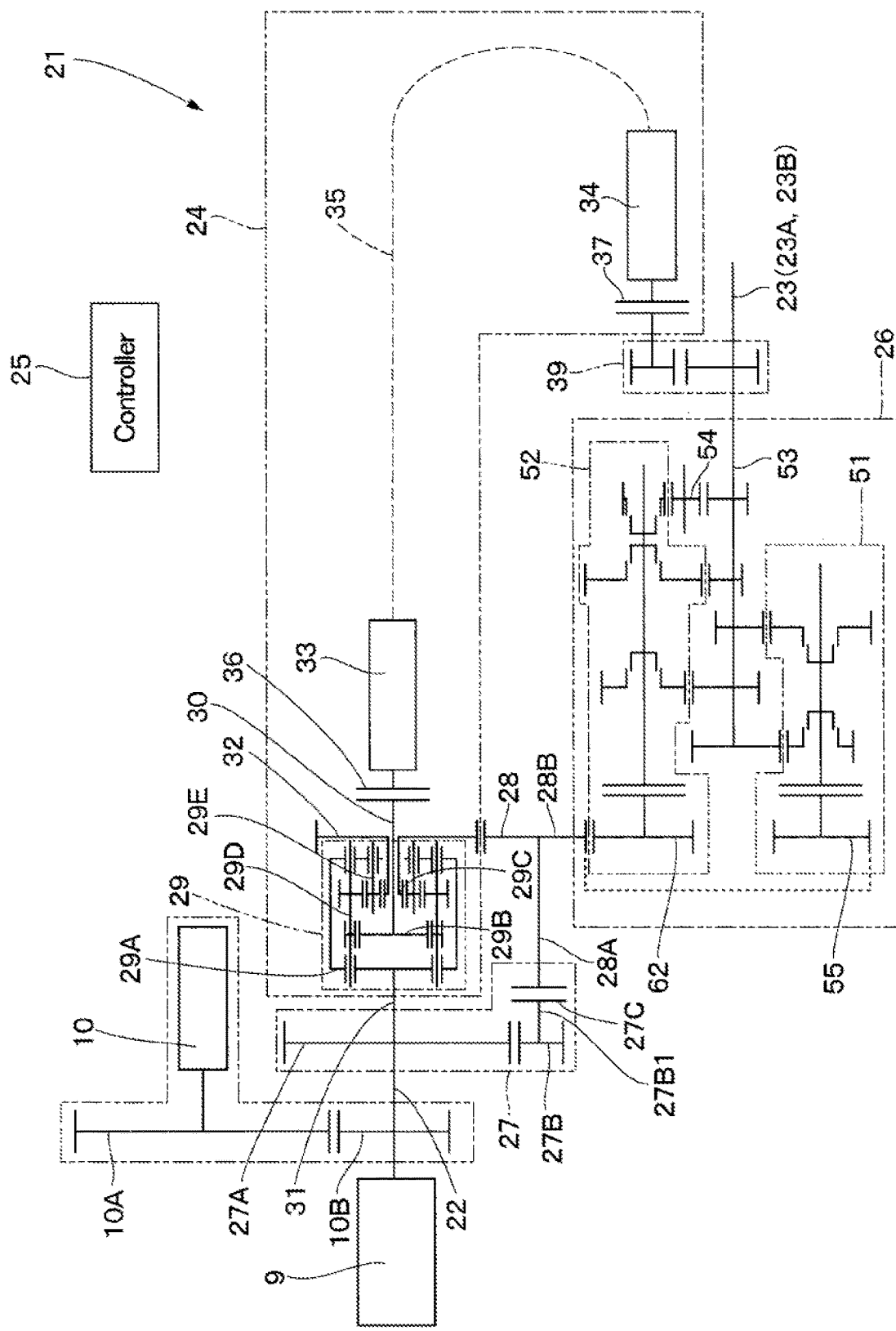
FIG. 20 is a configuration diagram as similar to FIG. 4, showing a fifth modification example (configuration in which a second variator is connected to an output shaft).

| No. | First member linked to power source | Second member linked to first variator | Third member linked to idler element | Number of Figure |
|---|---|---|---|---|
| 1-A | carrier | first sun gear | second sun gear | FIG. 4 (first embodiment) FIG. 20 (sixth modification example) |
| 1-B | first sun gear | carrier | second sun gear | FIG. 18 (fourth modification example) |
| 1-C | first sun gear | second sun gear | carrier | FIG. 19 (fifth modification example) |

As shown in FIG. 4 to FIG. 6, in the first embodiment (that is, No. 1-A in Table 4) the planetary gear mechanism 29 is provided with the carrier 29A corresponding to a first member, the first sun gear 29B corresponding to a second member, the second sun gear 29C corresponding to a third member, a planet gear 29D and a balance gear 29E. The first sun gear 29B, the second sun gear 29C, the planet gear 29D and the balance gear 29E may not perform the power transmission by the meshing of gears but may perform the power transmission by friction of a roller (an outer peripheral surface thereof), for example.

The engine 9 is connected via the second connecting member 31 to the carrier 29A. The first sun gear 29B is connected via the first connecting member 30 to the first variator 33. The second sun gear 29C is connected via the third connecting member 32 to the idler element 28 (idler gear 28B). The first sun gear 29B is meshed with the planet gear 29D. The second sun gear 29C is meshed with the balance gear 29E. The balance gear 29E is meshed with the planet gear 29D.

A rotating axis Sp (FIG. 6) of the planet gear 29D and a rotating axis Sb (FIG. 6) of the balance gear 29E are supported on the carrier 29A. Therefore, the planet gear 29D and the balance gear 29E revolve about a center axis S (FIG. 6) of the planetary gear mechanism 29 and rotate on its own axis. The planet gear 29D is provided with a gear part 29D1 meshing with the first sun gear 29B and a gear part 29D2 meshing with the balance gear 29E. A restriction condition for establishment of the planetary gear mechanism 29 lies in that a distance between the center axis S of the first sun gear 29B and the rotating axis Sp of the planet gear 29D corresponds to a distance between the center axis S of the second sun gear 29C and the rotating axis Sp of the planet gear 29D. Therefore, it is required for these distances to be in agreement by adjusting the number of teeth, a gear module, a gear dislocation of each of the first sun gear 29B, the planet gear 29D, the gear part 29D1 meshing with the first sun gear 29B, the second sun gear 29C, the balance gear 29E and the gear part 29D2 meshing with the balance gear 29E, and a rotating center position of the balance gear 29E. That is, these distances have only to be in agreement, and for example, it is possible to make a difference in the number of teeth between the first sun gear 29B and the second sun gear 29C small or to make the number of teeth the same number. Therefore, a speed reduction ratio of the planetary gear mechanism 29 can be set freely.

According to the first embodiment, the balance gear 29E is disposed between the second sun gear 29C and the planet gear 29D but may be disposed between the first sun gear 29B and the planet gear 29D. However, in a case of disposing the balance gear 29E "between the second sun gear 29C and the planet gear 29D" and "between the first sun gear 29B and the planet gear 29D" respectively, or even in a case of not disposing it in both thereof, the power transmission can be performed. However, preferably the balance gear is disposed in one of them.

Next, an explanation will be made of the operation of the planetary gear mechanism 29 configured of the carrier 29A and the two sun gears 29B, 29C. The following is established in all the conditions of "No. 1-A", "No. 1-B" and "No. 1-C" in Table 4.

First, an explanation will be made of distribution in torque of the three members (carrier 29A and two sun gears 29B, 29C) of the planetary gear mechanism 29. FIG. 6 is a cross section showing the planetary gear mechanism 29 as viewed from the power source side. The carrier 29A, the first sun gear 29B and the second sun gear 29C are concentrically arranged. That is, the center axis S (rotation center axis) of each of the carrier 29A, the first sun gear 29B and the second sun gear 29C is in agreement. The first sun gear 29B is meshed with the gear part 29D1 of the planet gear 29D. The second sun gear 29C is meshed with the balance gear 29E. The balance gear 29E is meshed with the gear part 29D2 of the planet gear 29D. The balance gear 29E and the planet gear 29D rotate freely in a rotating direction by the carrier 29A and are restricted in a revolving direction in relation to the center axis S in such a way that each meshing of the gears establishes. Therefore, the planet gear 29D rotates about the rotating axis Sp as the center axis of the planet gear 29D and revolves about the center axis S of the carrier 29A. Therefore, a trace Cp of the center axis (rotating axis Sp) of the planet gear 29D becomes a circle about the center axis S of the carrier 29A. The balance gear 29E rotates about the rotating axis Sb as the center axis of the balance gear 29E and revolves about the center axis S of the carrier 29A. Therefore, a trace Cb of the center axis (rotating axis Sb) of the balance gear 29E becomes a circle about the center axis S of the carrier 29A.

A mesh radius rs1 of the first sun gear 29B is a mesh radius of the first sun gear 29B-side at the time the first sun gear 29B is meshed with the planet gear 29D. A mesh radius rp1 of the gear part 29D1 of the planet gear 29D is a mesh radius of the gear part 29D1-side at the time the first sun gear 29B is meshed with the planet gear 29D. A mesh radius rs2 of the second sun gear 29C is a mesh radius of the second sun gear 29C-side at the time the second sun gear 29C is meshed with the balance gear 29E. A mesh radius rp2 of the gear part 29D2 of the planet gear 29D is a mesh radius of the planet gear 29D-side at the time the balance gear 29E is meshed with the planet gear 29D.

In the first embodiment (No. 1-A in Table 4), since the carrier 29A is connected to a member linked to the engine 9, that is, the second connecting member 31, torque Tc of the carrier 29A is a torque that the engine 9 can generate. Since the first sun gear 29B is connected to a member linked to the first variator 33, that is, the first connecting member 30, torque Ts1 of the first sun gear 29B is a torque that the first variator 33 can generate. Since the second sun gear 29C is connected to a member linked to the idler element 28, that is, the third connecting member 32, torque Ts2 of the second sun gear 29C is a torque reaction that receives from the idler element 28.

In a speed-changing device 21D of a fourth modification example (that is, No. 1-B in Table 4) as shown in FIG. 18, since the first sun gear 29B is connected to a member linked to the engine 9, that is, the second connecting member 31, torque Ts1 of the first sun gear 29B is a torque that the engine 9 can generate. Since the carrier 29A is connected to a member linked to the first variator 33, that is, the first connecting member 30, torque Tc of the carrier 29A is a torque that the first variator 33 can generate. Since the second sun gear 29C is connected to a member linked to the idler element 28, that is, the third connecting member 32, torque Ts2 of the second sun gear 29C is a torque reaction that receives from the idler gear 28B.

In a speed-changing device 21E of a fifth modification example as shown in FIG. 19 (that is, No. 1-C in Table 4), since the first sun gear 29B is connected to a member linked to the engine 9, that is, the second connecting member 31, torque Ts1 of the first sun gear 29B is a torque that the engine 9 can generate. Since the second sun gear 29C is connected to a member linked to the first variator 33, that is, the first connecting member 30, torque Ts2 of the second sun gear 29C is a torque that the first variator 33 can generate. Since the carrier 29A is connected to a member linked to the idler element 28, that is, the third connecting member 32, torque Tc of the carrier 29A is a torque reaction that receives from the idler gear 28B.

Next, an explanation will be made of the relationship of the torque Ts1 of the first sun gear 29B, the torque Ts2 of the second sun gear 29C and the torque Tc of the carrier 29A. First, the first sun gear 29B and the second sun gear 29C are meshed with each other via the planet gear 29D and the balance gear 29E. In addition, the balance gear 29E and the planet gear 29D rotate freely in the rotating direction by the carrier 29A and are restricted in the revolving direction in relation to the center axis S of the carrier 29A. When a relation of action and reaction is found based upon the above, Formula 2, Formula 3 and Formula 4 as follows are established.

$$Ts1 = \frac{rs1 \times rp2}{rs1 \times rp2 + rs2 \times rp1} \times Tc \qquad \text{[Formula 2]}$$

$$Ts2 = \frac{rs2 \times rp1}{rs1 \times rp2 + rs2 \times rp1} \times Tc \qquad \text{[Formula 3]}$$

$$Tc = Ts1 + Ts2 \qquad \text{[Formula 4]}$$

According to these formulas, the torque Ts1 of the first sun gear 29B, the torque Ts2 of the second sun gear 29C and the torque Tc of the carrier 29A can be calculated from the mesh radius rp2 of the gear part 29D2, the mesh radius rs2 of the second sun gear 29C, the mesh radius rp1 of the gear part 29D1 and the mesh radius rs1 of the first sun gear 29B. Since the mesh radius rp2 of the gear part 29D2, the mesh radius rs2 of the second sun gear 29C, the mesh radius rp1 of the gear part 29D1 and the mesh radius rs1 of the first sun gear 29B each are determined by the mesh radius of each of the gears, the radius cannot be changed during the time when the planetary stepless speed-changing mechanism 24 is transmitting the power. Therefore, a ratio of the torque Ts1 of the first sun gear 29B, the torque Ts2 of the second sun gear 29C and the torque Tc of the carrier 29A does not change during the time when the planetary stepless speed-changing mechanism 24 is transmitting the power.

The controller 25 outputs a signal for controlling the first variator 33 based upon this principle, and controls the torque of the first connecting member 30 (for example, the first sun gear 29B) linked to the first variator 33. That is, the controller 25 controls the torque of the first connecting member 30 (for example, the first sun gear 29B) by controlling the first variator 33. Thereby, the controller 25 indirectly controls the torque of the second connecting member 31 (for example, the carrier 29A) linked to the engine 9 and the torque of the third connecting member 32 (for example, the second sun gear 29C) linked to the idler element 28. As a result, the transmission torque can be controlled between the second connecting member 31 (for example, the carrier 29A) linked to the engine 9 and the third connecting member 32 (for example, the second sun gear 29C) linked to the idler element 28.

Next, an explanation will be made of a relationship of a rotating speed of the first sun gear 29B, a rotating speed of the second sun gear 29C and a rotating speed of the carrier 29A. First, the first sun gear 29B and the second sun gear 29C are meshed via the planet gear 29D and the balance gear 29E. In addition, the balance gear 29E and the planet gear 29D rotate freely in the rotating direction by the carrier 29A and are restricted in the revolving direction in relation to the center axis S of the carrier 29A. When a relation of the rotation speeds is found from the above, Formula 5 as follows is established. It should be noted that "Ka" in Formula 5 is shown as Formula 6. The rotating speed of the carrier 29A is indicated as "Vc", the rotating speed of the first sun gear 29B is indicated as "Vs1" and the rotating speed of the second sun gear 29C is indicated as "Vs2".

$$\frac{Vs2}{Vc} = -Ka\left\{\frac{Vs1}{Vc}\right\} + (Ka+1) \quad \text{[Formula 5]}$$

$$Ka = \frac{\{rs1 \times rp2\}}{\{rs2 \times rp1\}} \quad \text{[Formula 6]}$$

Figure 7:
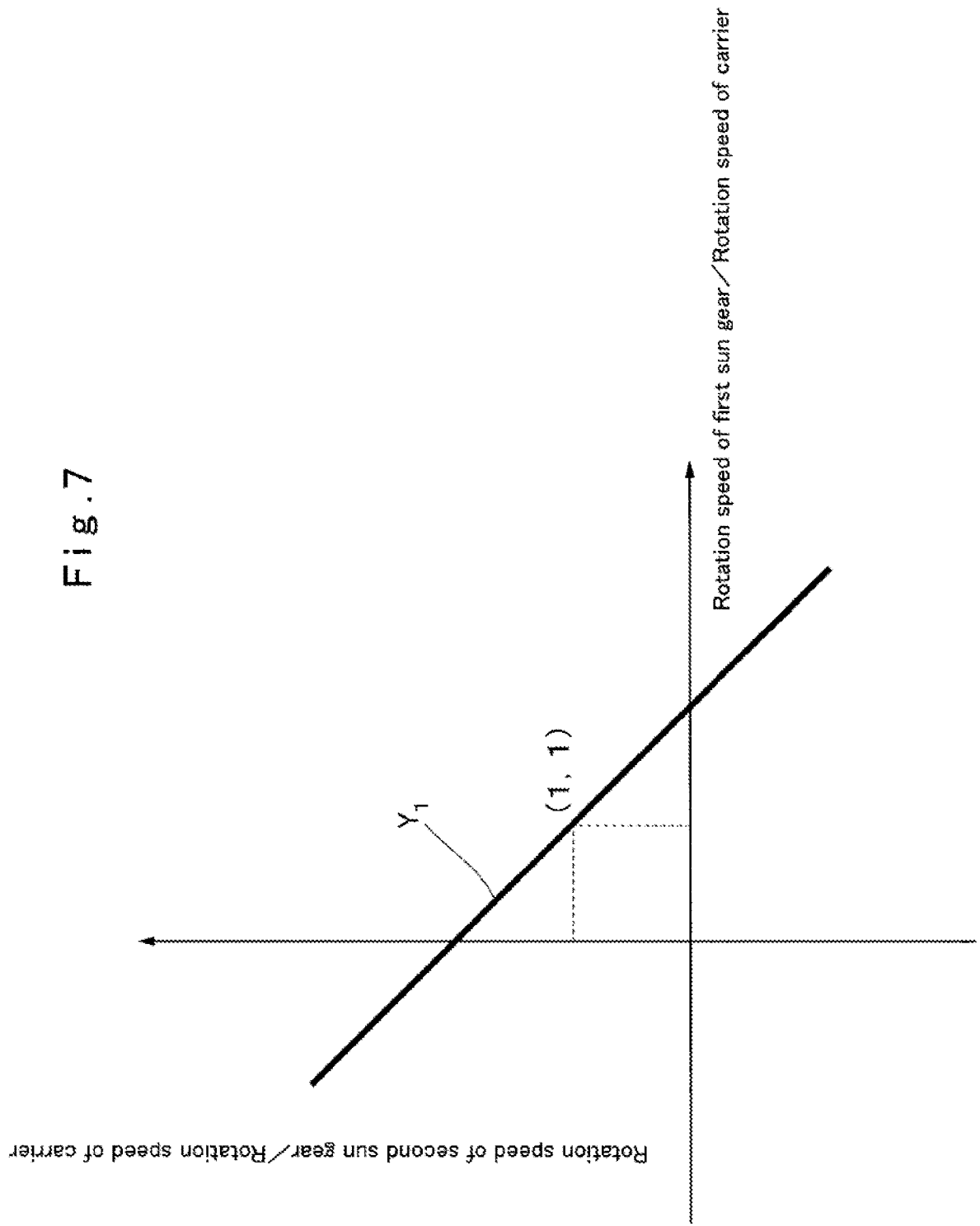
FIG. 7 is a characteristic diagram showing a relation of rotation speeds between respective members in the planetary mechanism ("No. 1-A" in Table 4 to be described later) in FIG. 4.

FIG. 7 shows a relation of rotation speeds of the planetary gear mechanism 29. A speed relation line Y1 in FIG. 7 represents Formula 5 in a diagrammatic drawing. There is assumed that the rotating speed of the carrier 29A is constant. In this case, when the rotating speed of the second sun gear 29C is made high, the rotating speed of the first sun gear 29B is made low. In contrast, when the rotating speed of the second sun gear 29C is made low, the rotating speed of the first sun gear 29B is made high. The controller 25 outputs a signal for controlling the first variator 33 based upon this principle and controls the rotation speed of the first connecting member 30 (for example, the first sun gear 29B) linked to the first variator 33. That is, the controller 25 controls the rotation speed of the first connecting member 30 (for example, the first sun gear 29B) by controlling the first variator 33. Thereby, the controller 25 indirectly controls the rotation speed of the second connecting member 31 (for example, the carrier 29A) linked to the engine 9 and the rotation speed of the third connecting member 32 (for example, the second sun gear 29C) linked to the idler element 28. As a result, the speed change ratio can be controlled between the second connecting member 31 (for example, the carrier 29A) linked to the engine 9 and the third connecting member 32 (for example, the second sun gear 29C) linked to the idler element 28.

As described before, in the planetary gear mechanism 29 it is necessary to make the distance between the center axis S of the first sun gear 29B and the rotating axis Sp of the planet gear 29D correspond to the distance between the center axis S of the second sun gear 29C and the rotating axis Sp of the planet gear 29D. That is, these distances have only to be in agreement and for example, it is possible to freely set the mesh radius rs1 of the first sun gear 29B, the mesh radius rp1 of the gear part 29D1, the mesh radius rs2 of the second sun gear 29C, and the mesh radius rp2 of the gear part 29D2. Accordingly, the planetary gear mechanism 29 adjusts the mesh radius rs1 of the first sun gear 29B, the mesh radius rp1 of the gear part 29D1, the mesh radius rs2 of the second sun gear 29C and the mesh radius rp2 of the gear part 29D2 in accordance with the torque that can be absorbed by the first variator 33 and an allowable maximum rotation speed thereof from the relation formulas (Formula 2, Formula 3 and Formula 4) of the torques Tc, Ts1 and Ts2 and from the relation formulas (Formula 5 and Formula 6) of the rotating speeds Vs1, Vs2 and Vc. Thereby, by setting the value of Ka in Formula 6 to an idealistic value to make an inclination of the speed relation line Y1 an idealistic value as shown in FIG. 7, the torque and the rotation speed of the planetary gear mechanism 29 can be adapted to both of the torque that can be absorbed by the first variator 33 and the allowable maximum rotation speed thereof. As a result, the first variator 33 that is small-sized and inexpensive can be used to improve the transmission efficiency of the planetary stepless speed-changing mechanism 24.

It should be noted that a size and a price of the first variator 33 are in proportion to a magnitude of the torque that can be absorbed by the first variator 33. Therefore, the absorption torque of the first variator 33 is preferable to be smaller. The first embodiment (that is, No. 1-A in Table 4) will be explained by taking a specific example thereof. First, the value of Ka in Formula 6 is preferable to be made small. Further, a transmission efficiency in power between the planetary gear mechanism 29 and the idler element 28 will be considered. In this case, the transmission efficiency of the power transmission route via the first connecting member 30, the first variator 33, the transmission element 35, the second variator 34, the transmission 39 and the third clutch 37 is approximately 70% to 80%. On the other hand, the transmission efficiency of the power transmission route via the third connecting member 32 is approximately 99%. Therefore, as the torque to be distributed to the first variator 33 is smaller, the transmission efficiency of the planetary stepless speed-changing mechanism 24 can be improved. Therefore, making the value of Ka in Formula 6 small is appropriate for the planetary stepless speed-changing mechanism 24.

On the other hand, as the value of Ka is made small based upon the speed relation line Y1 as shown in FIG. 7, "the rotation speed of the first sun gear/the rotation speed (horizontal axis) of the carrier" becomes large when "the rotation speed of the second sun gear/the rotation speed (vertical axis) of the carrier" is small. Since the second sun gear 29C is linked via the idler element 28 and the multistage speed-changing mechanism 26 to the output shaft 23, when "the rotation speed of the second sun gear/the rotation speed of the carrier" is small, a vehicle is in a state where the power source (engine 9) is rotating and the vehicle speed is low. That is, as Ka is made small when the rotation speed of the carrier 29A (the rotation speed of the power source) is constant, the rotation speed of the first variator 33 increases when the vehicle speed is low. As a specific example is taken as one example, when "the rotation speed of the second sun gear/the rotation speed of the carrier" is 0, the rotation speed of the second sun gear 29C is 0. Since the second sun gear 29C is linked via the idler element 28 and the multistage speed-changing mechanism 26 to the output shaft 23, in a case where the second sun gear 29C is 0 min$^{-1}$, the vehicle speed is 0 km/h. That is, a speed change ratio of the planetary stepless speed-changing mechanism 24 is limitless. A limit of the rotation speed of the first sun gear 29B is approximately 6000 min$^{-1}$. In a case where the power source (engine 9) is a diesel engine, since a limit of the rotation speed of the carrier 29A is approximately 2000 min$^{-1}$, "the rotation speed of the first sun gear/the rotation speed of the carrier" becomes 3.0. As "the rotation speed of the second sun gear/the rotation speed of the carrier=0" and "the rotation speed of the first sun gear/the rotation speed of the carrier=3.0" are assigned to Formula 5, Ka=0.5. That is, a value close to Ka=0.5 becomes a lower limit value. As described before, the value of Ka is preferably made small within a range not exceeding the allowable maximum rotation speed of the first variator 33. In addition, as to the planetary gear mechanism 29 configured of the carrier and the two sun gears, since it is possible to freely set the mesh radius rs1 of the first sun gear 29B, the mesh radius rp1 of the gear part 29D1, the mesh radius rs2 of the second sun gear 29C and the mesh radius rp2 of the gear part 29D2, the value of Ka can freely be determined. Therefore, the vehicle can drive to the allowable maximum rotation speed of the first variator 33. As a result, it is possible to use the first variator 33 that is small-sized and inexpensive and improve the transmission efficiency of the planetary stepless speed-changing mechanism 24 to 80% to 93%.

Figure 8:
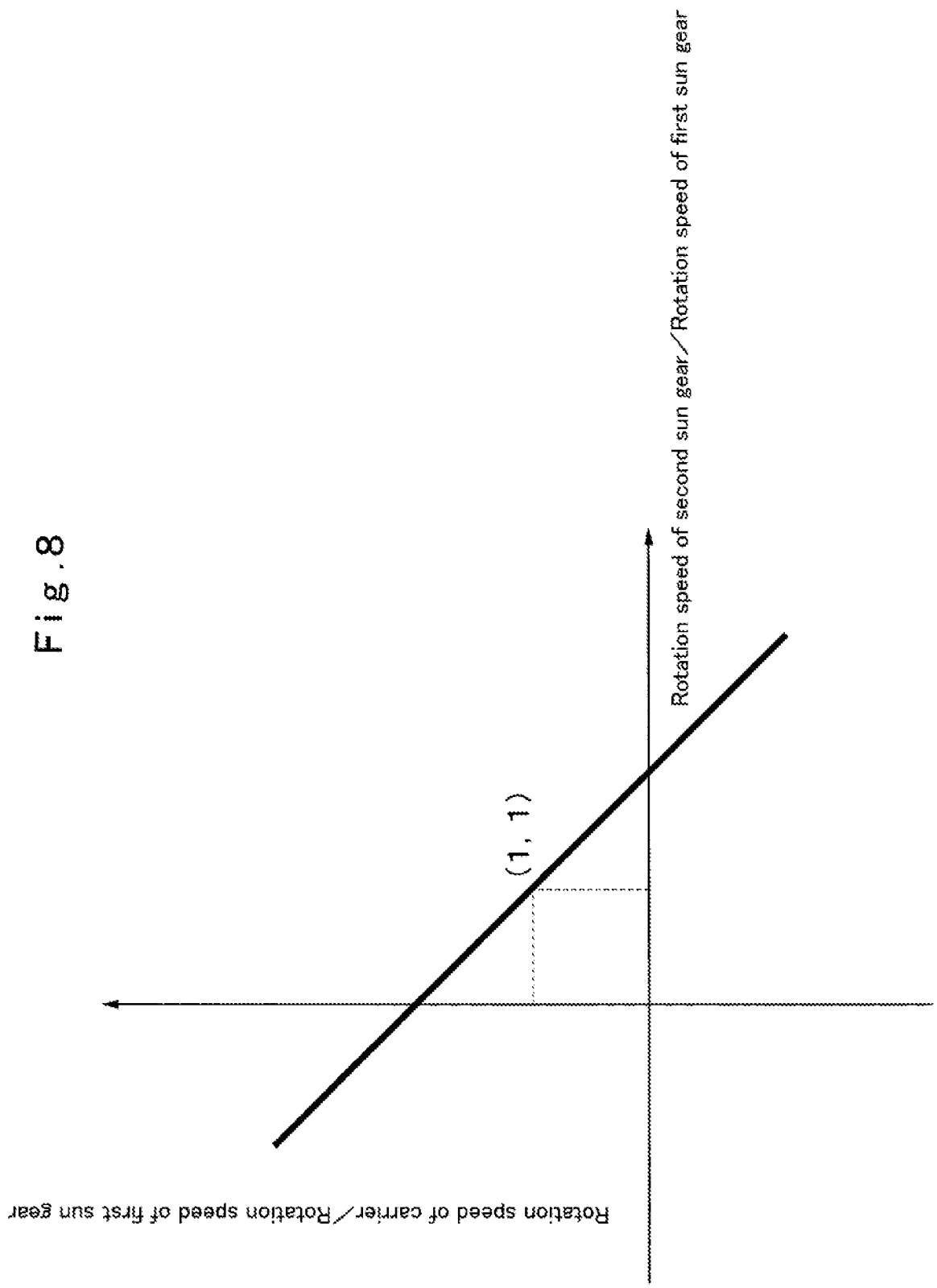
FIG. 8 is a characteristic diagram showing a relation of rotation speeds between respective members in the planetary mechanism ("No. 1-C" in Table 4 to be described later) in FIG. 4.

On the other hand, an explanation will be made of the fifth modification example as shown in FIG. 19 (that is, No. 1-C in Table 4). In the fifth modification example, since the first variator 33 is connected to the second sun gear 29C, the torque to be distributed to the first variator 33-side becomes Ts2. According to Formula 3, Ts2 becomes the smaller when rs2 and rp1 are the smaller and rs1 and rp2 are the larger. As described before, since the torque to be distributed to the first variator 33-side is preferably smaller from a point of view of the transmission efficiency and price of the variator, rs2 and rp1 have only to be small and rs1 and rp2 have only to be large. In this case, Ka becomes large according to Formula 6. That is, it can be said that as Ka is the larger, the torque necessary for the first variator 33 becomes the smaller. Formula 7 as follows is derivable by modifying Formula 5. A diagrammatic drawing in Formula 7 is shown in FIG. 8.

$$\frac{Vc}{Vs1} = \left(\frac{1}{Ka+1}\right)\left(\frac{Vs2}{Vs1}\right) + \frac{ka}{Ka+1} \qquad \text{[Formula 7]}$$

As a specific example is taken as one example, since the carrier 29A is linked via the idler element 28 and the multistage speed-changing mechanism 26 to the output shaft 23, in a case where Vc is 0 min$^{-1}$, the vehicle speed is 0 km/h. In this case, "Vc/Vs1" becomes 0. Here, in a case where the engine 9 as the power source is a diesel engine, since the maximum rotation speed of the engine 9 is approximately 2000 min$^{-1}$, Vs1 becomes 2000 min$^{-1}$. In addition, the allowable rotation speed (Vs2) of the first connecting member 30 linked to the first variator 33 is approximately –6000 min$^{-1}$ to 6000 min$^{-1}$. Thereby, "(Vs2/Vs1)" can be in a range of –3 to 3. As "Vc/Vs1=0" and "Vs2/Vs1=–3" are substituted to Formula 7 to find Ka, Ka=3. That is, the upper limit value of Ka in this case becomes a value between before and after 3. Therefore, the value of Ka is preferably made large within a range not exceeding the allowable maximum rotation speed of the first variator 33. In addition, as described above since it is possible to freely determine the value of Ka, the vehicle can drive to the allowable maximum rotation speed of the first variator 33. As a result, it is possible to use the first variator 33 that is small-sized and inexpensive and improve the transmission efficiency of the planetary stepless speed-changing mechanism 24 to 80% to 93%.

Figure 9:
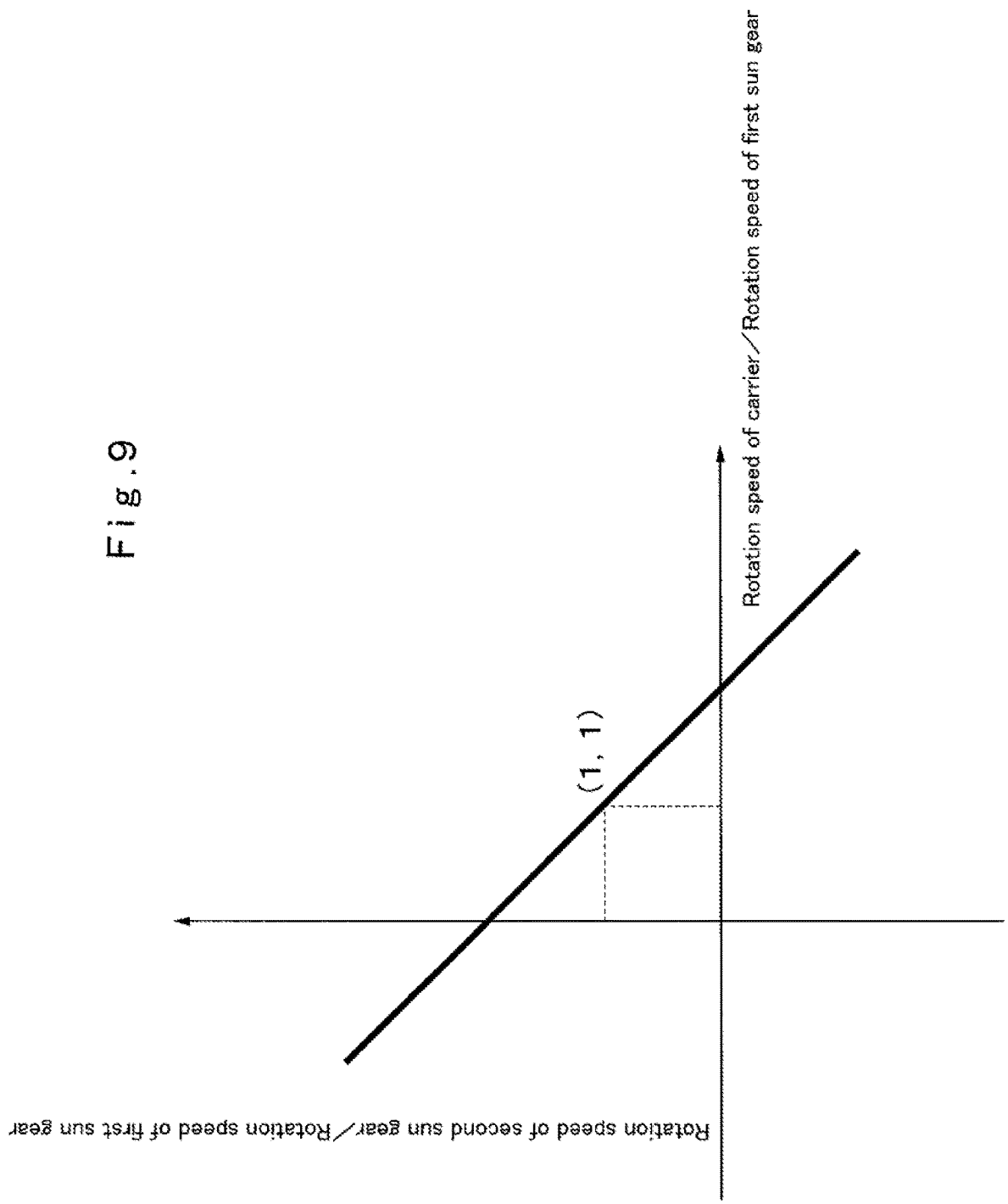
FIG. 9 is a characteristic diagram showing a relation of rotation speeds between respective members in the planetary mechanism ("No. 1-B" in Table 4 to be described later) in FIG. 4.

On the other hand, an explanation will be made of the fourth modification example as shown in FIG. 18 (that is, No. 1-B in Table 4). In the fourth modification example, since the first variator 33 is connected to the carrier 29A, the torque to be distributed to the first variator 33-side becomes Tc. According to Formula 4, Ts2 has only to be made small for making Tc small on a condition that Ts1 (torque from the engine 9 as the power source) is constant. According to Formula 3, Ts2 is made small when rs2 and rp1 are the smaller and rs1 and rp2 are the larger. As described before, since the torque to be distributed to the first variator 33-side is preferably smaller from a point of view of the transmission efficiency and price of the variator, rs2 and rp1 have only to be small and rs1 and rp2 have only to be large. In this case, Ka becomes large according to Formula 6. That is, it can be said that as Ka is the larger, the torque necessary for the first variator 33 becomes the smaller. Formula 8 as follows is derivable by modifying Formula 5. A diagrammatic drawing in Formula 8 is shown in FIG. 9.

$$\frac{Vc2}{Vs1} = (Ka+1)\left(\frac{Vc}{Vs1}\right) - ka \qquad \text{[Formula 8]}$$

As a specific example is taken as one example, since the second sun gear 29C is connected via the idler element 28 and the multistage speed-changing mechanism 26 to the output shaft 23, in a case of rotating in Vs2 of a high rotation, a vehicle travels in a higher vehicle speed. Since a range of a speed change of the planetary stepless speed-changing mechanism 24 is the wider the better, the maximum value of "Vs2/Vs1" is preferably the larger. However, the allowable rotation speed (Vs2) of the third connecting member 32 linked to the idler element 28 is approximately 8000 min$^{-1}$. In addition, in a case where the engine 9 as the power source is a diesel engine, since the maximum rotation speed of the engine 9 is approximately 2000 min$^{-1}$, Vs1 becomes 2000 min$^{-1}$. Therefore, the upper limit value of "Vs2/Vs1" becomes approximately 4.0. In addition, the allowable rotation speed (Vs2) of the first connecting member 30 linked to the first variator 33 is approximately −6000 min$^{-1}$ to 6000 min$^{-1}$. Thereby, "Vc/Vs1" can be in a range of −3 to 3. As "Vs/Vs1=4.0" and "Vs2/Vs1=−3" are substituted to Formula 8 to find Ka, Ka=0.5. That is, the upper limit value of Ka becomes approximately 0.5. In addition, since it is possible to freely determine the value of Ka as described above, the vehicle can drive to the allowable maximum rotation speed of the first connecting member 30 linked to the first variator 33. As a result, the transmission torque of the first variator 33 is made small and it is possible to use the first variator 33 that is small-sized and inexpensive.

Next, an explanation will be made of the internal lockup operation of the planetary stepless speed-changing mechanism 24. The power transmission efficiency of the planetary stepless speed-changing mechanism 24 is 80% to 93%, which is high as a stepless transmission. On the other hand, for example, the power transmission efficiency of a gear transmission by the meshing of a pair of gears each other is approximately 99%. Therefore, the planetary stepless speed-changing mechanism 24 is lower in a power transmission efficiency than a transmission by the meshing of a pair of gears each other. This reason will be explained with reference to FIG. 3.

That is, a transmission efficiency of power between the planetary gear mechanism 29 and the idler element 28 (idler gear 28B) will be considered. Here, the transmission efficiency of the power transmission route via the first connecting member 30, the first variator 33, the transmission element 35, the second variator 34, the transmission 39 and the third clutch 37 is approximately 70% to 80%. On the other hand, the transmission efficiency of the power transmission route via the third connecting member 32 is approximately 99%. Therefore, for enhancing the transmission efficiency, the rotation of the first connecting member 30 linked to the first variator 33 has only to be stopped, not performing the power transmission between the first variator 33 and the second variator 34. Thereby, the power supplied to the planetary gear mechanism 29 through the second connecting member 31 from the engine 9 is not distributed to the first connecting member 30 linked to the first variator 33, all of which is transmitted to the third connecting member 32 linked to the idler element 28 (idler gear 28B).

Since the power is transmitted to the third connecting member 32 and the idler gear 28B by the meshing of the gears each other, the power supplied from the engine 9 through the second connecting member 31 to the planetary gear mechanism 29 can be transmitted to the idler gear 28B in a high efficiency. Thereby, the power transmission efficiency of the planetary stepless speed-changing mechanism 24 is improved to approximately 97%, making it possible to improve the transmission efficiency of the speed-changing device 21. As a result, the wheel loader 1 can be configured to perform fuel saving.

In a case where the planetary stepless speed-changing mechanism 24 is in the middle of performing the internal lockup operation, the planetary stepless speed-changing mechanism 24 operates in a fixed speed change ratio. When the internal lockup speed change ratio is indicated by In, the internal lockup speed change ratio In can be represented by the following Formula 9. It should be noted that a rotation speed of the third connecting member 32 is indicated by "V32", a rotation speed of the second connecting member 31 is indicated by "V31", and a rotation speed of the first connecting member 30 is indicated by "V30".

$$In = \frac{V32}{V31} \quad \text{[Formula 9]}$$

Also at the internal lockup operation, the above-mentioned Formula 5 is established. Therefore, by substituting the rotation speed of the first connecting member 30 linked to the first variator 33 as 0 to Formula 5, the internal lockup speed change ratio In can be calculated. For example, in the first embodiment (No. 1-A in Table 4), the rotating speed Vs1 of the first sun gear 29B connected to the first connecting member 30 is substituted as 0 to Formula 5. That is, the internal lockup speed change ratio In is found according to the following Formula 10.

$$\frac{Vs2}{Vc} = Ka + 1 \quad \text{[Formula 10]}$$

As a result, In=Ka+1

In the fourth modification example (No. 1-B in Table 4) as shown in FIG. 18, the rotating speed Vc of the carrier 29A connected to the first connecting member 30 is substituted as 0 to Formula 8. That is, the internal lockup speed change ratio In is found according to the following Formula 11.

$$\frac{Vs2}{Vs1} = -Ka \quad \text{[Formula 11]}$$

As a result, In=−Ka

In the fifth modification example (No. 1-C in Table 4) as shown in FIG. 19, the rotating speed Vs2 of the second sun gear 29C connected to the first connecting member 30 is substituted as 0 to Formula 7. That is, the internal lockup speed change ratio In is found according to the following Formula 12.

$$\frac{Vc}{Vs1} = \frac{Ka}{(Ka+1)} \quad \text{[Formula 12]}$$

As a result, $$In = \frac{Ka}{(Ka+1)}$$

In this way, the internal lockup speed change ratio In depends upon a combination of gears in the planetary gear mechanism 29, and Ka. For making the planetary stepless speed-changing mechanism 24 operate in a state of the internal lockup, the rotation of the first connecting member 30 linked to the first variator 33 of the three connecting members 30, 31, 32 linked to the planetary gear mechanism 29 has only to be stopped. In a case where the first variator 33 and the second variator 34 are hydraulic pumps/motors, the controller 25 holds a volume of the hydraulic pump/motor of the first variator 33 to a predetermined value or more (preferably 10% or more of the maximum volume) and controls a volume of the hydraulic pump/motor of the second variator 34 to 0.

In addition, for stopping the rotation of the first connecting member 30, for example, as the first modification example as shown in FIG. 13, the block mechanism 40, which is configured to be disposed in the transmission element 35 performing the power transmission between the first variator 33 and the second variator 34, may be adopted. The block mechanism 40 is controlled by the controller 25 to block the power transmission between the first variator 33 and the second variator 34.

For example, in a case where the power transmission of the transmission element 35 is performed by a hydraulic pressure, the block mechanism 40 may be configured of a hydraulic valve. The controller 25 sends a signal to the block mechanism 40 to block the flow of oil between the first variator 33 and the second variator 34. In a case where the power transmission between the first variator 33 and the second variator 34 is performed by electric power, the block mechanism 40 may be configured by an inverter/converter. In this case, the inverter/converter gives a quasi-resistance between power lines to increase a voltage between the power lines. In addition, the block mechanism 40 may be configured to block the flow of power by a magnet contactor or may be configured to give a resistance between power lines by a resistor. In any case, the controller 25 sends a signal of transmission or blockade of power to the block mechanism 40 to control the block mechanism 40.

In addition, the internal lockup state may be realized by fixing the rotation shaft of the first variator 33 to a non-rotation part to stop the rotation of the first variator 33. For example, as the second modification example as shown in FIG. 14 and as the third modification example as shown in FIG. 15, the internal lockup state may be realized by fixing the first connecting member 30 to a non-rotation part (for example, a case of the speed-changing device 21) by the brake mechanism 41. The brake mechanism 41 may adopt the configuration of fixing the first connecting member 30 linked to the first variator 33 to the non-rotation part by friction joint or mechanical meshing joint. Particularly in a case where the first variator 33 is an electric generator, even at the operating of the internal lockup it is necessary to make current flow in the first variator 33 (electric generator). Therefore, from a point of view of power loss, it is preferable to fix the first connecting member 30 to the non-rotation part by the brake mechanism 41. That is, in a case where the first variator 33 is the electric generator, from a point of view of power loss, it is preferable to fix the first connecting member 30 to the non-rotation part by the brake mechanism 41. Thereby, the power transmission of the planetary stepless speed-changing mechanism 24 at the internal lockup time can improve to configure the wheel loader 1 to perform fuel saving.

The speed-changing devices 21A, 21B and 21C according to the first to third modification examples as shown in FIG. 13 to FIG. 15 can perform the internal lockup operation of the planetary stepless speed-changing mechanism 24 but are not provided with the external lockup mechanism (direct connecting mechanism 27). In a case of the speed-changing devices 21A, 21B and 21C of this type, at the starting-up and at the excavating, the planetary stepless speed-changing mechanism 24 is steplessly changed in a speed to perform the power transmission, and at the transporting and at the deadheading, the planetary stepless speed-changing mechanism 24 is made to operate in the internal lockup to perform the power transmission. Thereby, at the starting-up and at the excavating (vehicle speed 0 km/h to 7 km/h) when the stepless speed change is necessary, the power transmission efficiency can be enhanced by the stepless speed change of the planetary stepless speed-changing mechanism 24. On the other hand, at the transporting and at the deadheading (vehicle speed 7 km/h or higher) when the stepless speed change is not necessary, the power transmission efficiency can be further enhanced by making the planetary stepless speed-changing mechanism 24 operate in the internal lockup than the stepless speed change. Thereby, the wheel loader 1 can be configured to perform fuel saving.

Next, an explanation will be made of the direct connecting mechanism 27 as the external lockup mechanism with reference to FIG. 3. The direct connecting mechanism 27 transmits the power supplied from the engine 9 to the idler gear 28B by the meshing of a pair of gears each other without via the planetary stepless speed-changing mechanism 24. Since the power transmission efficiency of the direct connecting mechanism 27 is approximately 99%, the power transmission efficiency of the speed-changing device 21 improves, making it possible to configure the wheel loader 1 to perform fuel saving. The direct connecting mechanism 27 is provided with the input gear 27A disposed in the input shaft 22, a lockup gear 27B meshing with the input gear 27A, and the first clutch 27C. A rotation shaft 27B1 in which the lockup gear 27B is disposed is connected via the first clutch 27C to the idler shaft 28A of the idler element 28. The first clutch 27C is configured of, for example, a clutch (friction plates) by friction joint, a dog clutch or a dog clutch with synchromesh. The first clutch 27C performs mechanical engagement (connection) and disengagement between the lockup gear 27B and the idler gear 28B. The second clutch 36 is disengaged and the first clutch 27C is engaged, whereby the power inputted from the input shaft 22 is transmitted via the input gear 27A, the lockup gear 27B and the first clutch 27C to the idler gear 28B. Thereby, the power supplied from the engine 9 is transmitted via the direct connecting mechanism 27 as the external lockup mechanism without via the planetary stepless speed-changing mechanism 24 to the idler gear 28B.

The planetary stepless speed-changing mechanism 24 can increase a speed of the third connecting member 32 linked to the idler gear 28B in relation to the second connecting member 31 linked to the power source (engine 9) according to characteristics of the planetary gear mechanism 29 in the speed relation line Y1 as shown in FIG. 7. For effectively using the range in speed multiplication of the planetary stepless speed-changing mechanism 24, it is preferable to increase the speed of the power transmission via the direct connecting mechanism 27. Here, when the rotation speed of the first connecting member 30 linked to the first variator 33 of the three connecting members 30, 31, 32 linked to the planetary gear mechanism 29 is the same as that of the third connecting member 32 linked to the idler gear 28B of the three connecting members 30, 31, 32 linked to the planetary gear mechanism 29, the rotation speed of the second connecting member 31 linked to the engine 9 is the same as that of the third connecting member 32 linked to the idler gear 28B.

The rotation speed of the idler gear 28B at this time is found according to the following Formula 13. It should be noted that the rotation speed of the idler gear 28B is indicated by "V28B", the rotation speed of the second connecting member 31 linked to the engine 9 is indicated by "V31", the number of teeth of the third connecting member 32 linked to the idler gear 28B is indicated by "N32" and the number of teeth of the idler gear 28B is indicated by "N28B".

$$V28B = V31 \times \left(\frac{N32}{N28B}\right) \qquad \text{[Formula 13]}$$

Here, a synchronization rotation speed ratio Id is defined according to the following Formula 14. It should be noted that the number of teeth of the third connecting member 32 is indicated by "N32" and the number of teeth of the idler gear 28B is indicated by "N28B".

$$Id = \frac{N32}{N28B} \quad \text{[Formula 14]}$$

In addition, an external lockup rotation speed ratio Ir is defined according to the following Formula 15. It should be noted that the number of teeth of the input gear 27A is indicated by "N27A" and the number of teeth of the lockup gear 27B is indicated by "N27B".

$$Ir = \frac{N27A}{N27B} \quad \text{[Formula 15]}$$

In this case, by making the external lockup rotation speed ratio Ir larger than the synchronization rotation speed ratio Id, a range of speed multiplication of the planetary stepless speed-changing mechanism 24 can be effectively used. For example, in a case of the speed-changing device 21 that is provided with the external lockup but does not perform the internal lockup operation, the power transmission is performed as follows. That is, at the starting-up and at the excavating (vehicle speed 0 km/h to 7 km/h) when the stepless speed change is necessary, the power transmission is performed via the planetary stepless speed-changing mechanism 24. At the transporting and at the deadheading (vehicle speed 7 km/h or higher) when the stepless speed change is not necessary, the power transmission is performed via the external lockup mechanism (direct connecting mechanism 27).

On the other hand, in a case of the speed-changing device 21 that is provided with the external lockup mechanism (direct connecting mechanism 27) and performs the internal lockup operation, it is preferable that the external lockup rotation speed ratio Ir is equal to or more than the internal lockup speed change ratio In. In this case, for example, the power transmission is performed as follows. At the starting-up and at the excavating (vehicle speed 0 km/h to 7 km/h) when the stepless speed change is necessary, the power transmission is performed while performing a stepless speed change via the planetary stepless speed-changing mechanism 24. At the transporting and at the deadheading (vehicle speed 7 km/h or higher) when the stepless speed change is not necessary, the power transmission is performed while performing the internal lockup via the planetary stepless speed-changing mechanism 24. At the transporting and at the deadheading (vehicle speed 10 km/h or higher) when the stepless speed change is not necessary, the power transmission is performed via the external lockup mechanism (direct connecting mechanism 27). Thereby, the speed-changing device 21 can select a power transmission route the highest in the power transmission efficiency at all the operations of the excavating, the starting-up, the transporting and the deadheading. As a result, the wheel loader 1 can be configured to perform fuel saving.

Next, an explanation will be made of the multistage speed-changing mechanism 26. The multistage speed-changing mechanism 26 is a speed-changing mechanism that changes in a speed by meshing of gears, switching of a clutch and switching of a brake. The multistage speed-changing mechanism 26 corresponds to, for example, a planetary transmission, a countershaft type transmission, a manual transmission, an automated manual transmission, a dual clutch transmission and the like. In the first embodiment, the multistage speed-changing mechanism 26 is configured of the dual clutch transmission with forward four speeds and backward one speed. On the other hand, in the first modification example as shown in FIG. 13, in the second modification example as shown in FIG. 14 and in the third modification example as shown in FIG. 15, a multistage speed-changing mechanism 26A is configured of a dual clutch transmission with forward five speeds and backward two speeds. It should be noted that the multistage speed-changing mechanisms 26, 26A are not limited to these configurations, and for example, the forward may be composed of one speed to sixteen speeds and the backward may be composed of one speed to eight speeds.

Figure 10:
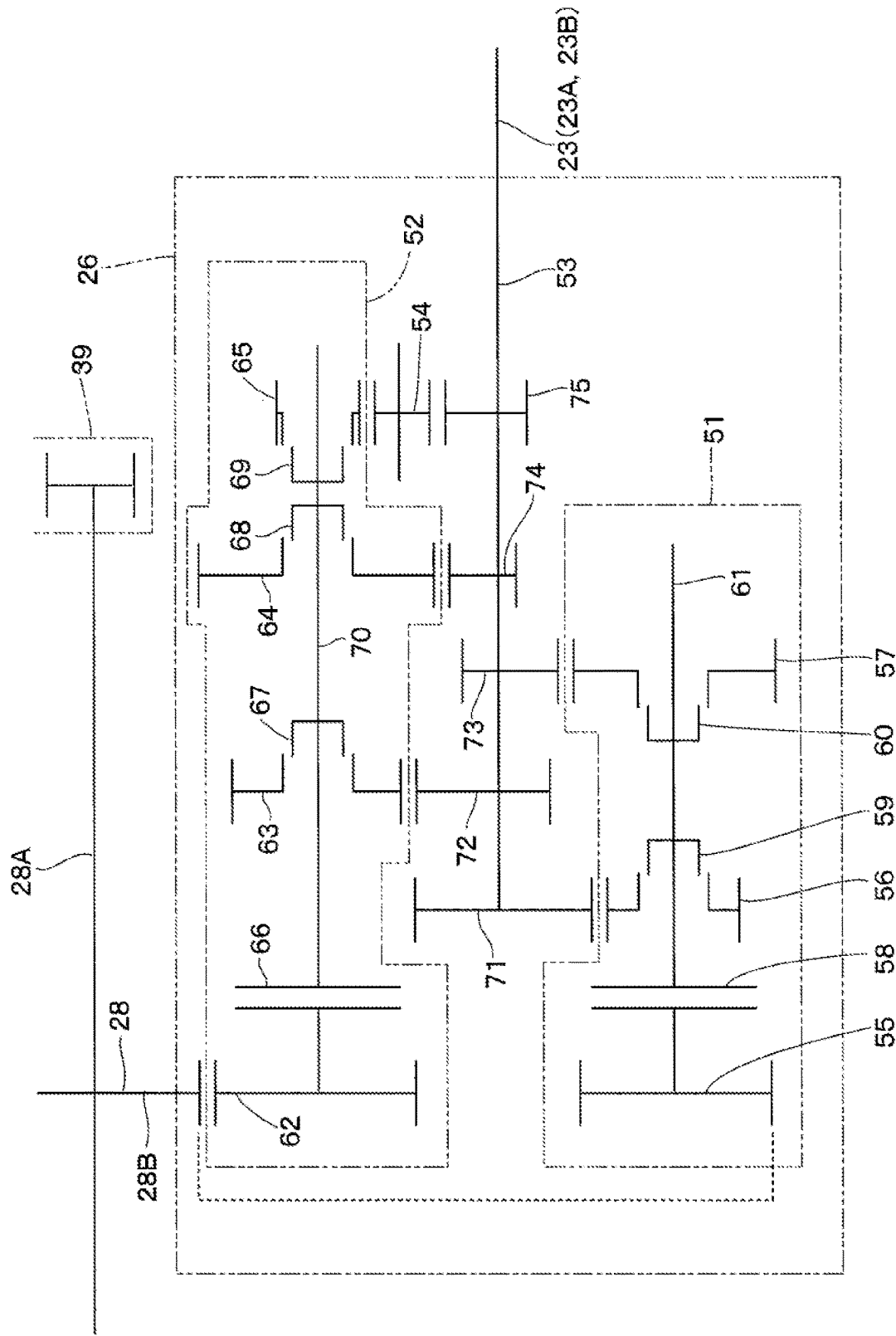
FIG. 10 is an enlarged view showing (X) part in FIG. 4.

An explanation will be made of the multistage speed-changing mechanism 26 as the dual clutch transmission with reference to FIG. 10. The multistage speed-changing mechanism 26 is provided with an odd numbered shaft 51, an even numbered shaft 52, an output shaft 53 and a counter gear 54. The output shaft 53 of the multistage speed-changing mechanism 26 corresponds also to the output shaft 23 of the speed-changing device 21. The odd numbered shaft 51 is configured to include an odd numbered stage gear 55, a forward one-speed gear 56, a forward three-speed gear 57, a fourth clutch 58 as a first output clutch, a sixth clutch 59, an eighth clutch 60 and an odd numbered stage shaft 61. The even numbered shaft 52 is configured to include an even numbered stage gear 62, a forward two-speed gear 63, a forward four-speed gear 64, a backward one-speed gear 65, a fifth clutch 66 as a second output clutch, a seventh clutch 67, a tenth clutch 68, a ninth clutch 69 and an even numbered stage shaft 70.

The counter gear 54 is a gear for reversing a rotation direction of the output shaft 53. The output shaft 53 is configured to include a forward one-speed output gear 71, a forward two-speed output gear 72, a forward three-speed output gear 73, a forward four-speed output gear 74, and a backward one-speed output gear 75. The even numbered stage gear 62 and the odd numbered stage gear 55 are always meshed with the idler gear 28B and rotate together with the idler gear 28B. The forward one-speed gear 56 and the forward one-speed output gear 71, the forward two-speed gear 63 and the forward two-speed output gear 72, the forward three-speed gear 57 and the forward three-speed output gear 73, and the forward four-speed gear 64 and the forward four-speed output gear 74 always mesh respectively. In addition, the backward one-speed gear 65, the counter gear 54 and the backward one-speed output gear 75 also always mesh. The fourth clutch 58 performs engagement (connection) and disengagement of the odd numbered stage gear 55 and the odd numbered stage shaft 61. The odd numbered stage gear 55 and the odd numbered stage shaft 61 are engaged by the fourth clutch 58, whereby the power transmission between the idler gear 28B and the odd numbered stage shaft 61 is made possible. The fifth clutch 66 performs engagement (connection) and disengagement of the even numbered stage gear 62 and the even numbered stage shaft 70. The even numbered stage gear 62 and the even numbered stage shaft 70 are engaged by the fifth clutch 66, whereby the power transmission between the idler gear 28B and the even numbered stage shaft 70 is made possible.

The sixth clutch 59 performs engagement (connection) and disengagement of the forward one-speed gear 56 and the odd numbered stage shaft 61. The forward one-speed gear 56 and the odd numbered stage shaft 61 are engaged by the sixth clutch 59, whereby the power transmission between the output shaft 53 and the odd numbered stage shaft 61 is made possible. The forward three-speed gear 57 and the odd numbered stage shaft 61 are engaged by the eighth clutch 60, whereby the power transmission between the output shaft 53 and the odd numbered stage shaft 61 is made possible. The forward two-speed gear 63 and the even numbered stage shaft 70 are engaged by the seventh clutch 67, whereby the power transmission between the output shaft 53 and the even numbered stage shaft 70 is made possible. The forward four-speed gear 64 and the even numbered stage shaft 70 are engaged by the tenth clutch 68, whereby the power transmission between the output shaft 53 and the even numbered stage shaft 70 is made possible. The backward one-speed gear 65 and the even numbered stage shaft 70 are engaged by the ninth clutch 69, whereby the power transmission between the output shaft 53 and the even numbered stage shaft 70 is made possible. It should be noted that the sixth clutch 59, the seventh clutch 67, the eighth clutch 60, the ninth clutch 69 and the tenth clutch 68 each are configured of a dog clutch or a dog clutch with synchromesh.

Next, an explanation will be made of the multistage speed-changing mechanism 26. For transmitting the power inputted to the idler gear 28B to the output shaft 53 with a forward one-speed, the fourth clutch 58 is engaged, the fifth clutch 66 is disengaged, the sixth clutch 59 is engaged, and the eighth clutch 60 is disengaged. In this state, two clutches or more of the seventh clutch 67, the tenth clutch 68 and the ninth clutch 69 are disengaged. The forward one-speed corresponds to No. 1 to No. 4 in Table 5 to be described later.

For transmitting the power to the output shaft 53 with a forward two-speed, the fifth clutch 66 and the seventh clutch 67 are engaged, and the fourth clutch 58, the tenth clutch 68 and the ninth clutch 69 are disengaged. In this state, one or both of the sixth clutch 59 and the eighth clutch 60 are disengaged. The forward two-speed corresponds to No. 9 to No. 11 in Table 5 to be described later.

For transmitting the power to the output shaft 53 with a forward three-speed, the fourth clutch 58 and the eighth clutch 60 are engaged, and the fifth clutch 66 and the sixth clutch 59 are disengaged. In this state, two or more of the seventh clutch 67, the tenth clutch 68 and the ninth clutch 69 are disengaged. The forward three-speed corresponds to No. 5 to No. 8 in Table 5 to be described later.

For transmitting the power to the output shaft 53 with a forward four-speed, the fifth clutch 66 and the tenth clutch 68 are engaged, and the fourth clutch 58, the seventh clutch 67 and the ninth clutch 69 are disengaged. In this state, one or both of the sixth clutch 59 and the eighth clutch 60 are disengaged. The forward four-speed corresponds to No. 12 to No. 14 in Table 5 to be described later.

For transmitting the power to the output shaft 53 with the backward one-speed, the fifth clutch 66 and the ninth clutch 69 are engaged, and the fourth clutch 58, the seventh clutch 67 and the tenth clutch 68 are disengaged. In this state, one or both of the sixth clutch 59 and the eighth clutch 60 are disengaged. The backward one-speed corresponds to No. 15 to No. 17 in Table 5 to be described later.

At the time of transmitting the power from the idler gear 28B through the odd numbered shaft 51 to the output shaft 53, it is possible to perform the switching between the engagement and the disengagement of the seventh clutch 67, the tenth clutch 68 and the ninth clutch 69. Thereby, any one of the forward two-speed gear 63, the forward four-speed gear 64 or the backward one-speed gear 65 can be in advance engaged to the even numbered stage shaft 70. In the same way, at the time of transmitting the power from the idler gear 28B through the even numbered shaft 52 to the output shaft 53, it is possible to perform the switching between the engagement and the disengagement of the sixth clutch 59 and the eighth clutch 60. Thereby, any one of the forward one-speed gear 56 or the forward three-speed gear 57 can be in advance engaged to the odd numbered stage shaft 61.

The power transmission from the idler gear 28B to the output shaft 53 can be switched from via the odd numbered stage shaft 61 to via the even numbered stage shaft 70 by changing a state where the fourth clutch 58 is engaged and the fifth clutch 66 is disengaged to a state where the fourth clutch 58 is disengaged and the fifth clutch 66 is engaged. In the same way, the power transmission from the idler gear 28B to the output shaft 53 can be switched from via the even numbered stage shaft 70 to via the odd numbered stage shaft 61 by changing a state where the fourth clutch 58 is disengaged and the fifth clutch 66 is engaged to a state where the fourth clutch 58 is engaged and the fifth clutch 66 is disengaged.

However, the switching in the engagement of the fourth clutch 58 and the fifth clutch 66 is not necessarily performed alternately. For example, as shown in Table 5 as follows, there are the switching from No. 1 to 4 to No. 5 to 8 and the switching from No. 5 to 8 to No. 1 to 4. In this case, after disengaging the fourth clutch 58, the sixth clutch 59 and the eighth clutch 60 are engaged or disengaged. After that, the disengaged fourth clutch 58 is engaged. In addition, there are the switching from No. 9 to 11 to No. 12 to 14, the switching from No. 12 to 14 to No. 9 to 11, the switching from No. 9 to 11 to No. 15 to 17, the switching from No. 15 to 17 to No. 9 to 11, the switching from No. 12 to 14 to No. 15 to 17 and the switching from No. 15 to 17 to No. 12 to 14. In this case, after disengaging the fifth clutch 66, the seventh clutch 67, the tenth clutch 68 and the ninth clutch 69 are engaged or disengaged. After that, the disengaged fifth clutch 66 is engaged.

TABLE 5

| No. | State name | $4^{th}$ CL | $5^{th}$ CL | $6^{th}$ CL | $7^{th}$ CL | $8^{th}$ CL | $9^{th}$ CL | $10^{th}$ CL |
|---|---|---|---|---|---|---|---|---|
| 1 | forward one-speed/preparation for forward two-speed | E | D | E | E | D | D | D |
| 2 | forward one-speed/preparation for forward four-speed | E | D | E | D | D | E | D |
| 3 | forward one-speed/preparation for backward one-speed | E | D | E | D | D | D | E |
| 4 | forward one-speed/ no preparation | E | D | E | D | D | D | D |
| 5 | forward three-speed/preparation for forward two-speed | E | D | D | E | E | D | D |
| 6 | forward three-speed/preparation for forward four-speed | E | D | D | D | E | E | D |
| 7 | forward three-speed/preparation for backward one-speed | E | D | D | D | E | D | E |
| 8 | forward three -speed/ no preparation | E | D | D | D | E | D | D |
| 9 | forward two-speed/preparation for forward one-speed | D | E | E | E | D | D | D |
| 10 | forward two-speed/preparation for forward three-speed | D | E | D | E | E | D | D |
| 11 | forward two-speed/ no preparation | D | E | D | E | D | D | D |
| 12 | forward four-speed/preparation for forward one-speed | D | E | E | D | D | E | D |
| 13 | forward four-speed/preparation for forward three-speed | D | E | D | D | E | E | D |
| 14 | forward four-speed/ no preparation | D | E | D | D | D | E | D |

TABLE 5-continued

| No. | State name | 4th CL | 5th CL | 6th CL | 7th CL | 8th CL | 9th CL | 10th CL |
|---|---|---|---|---|---|---|---|---|
| 15 | backward one-speed/preparation for forward three-speed | D | E | D | D | E | D | E |
| 16 | backward one-speed/preparation for forward one-speed | D | E | E | D | D | D | E |
| 17 | backward one-speed/ no preparation | D | E | D | D | D | D | E |

CL: clutch
E: engagement
D: disengagement

In a case where the wheel loader 1 performs a V cycle in which a dump loading work of gravel or the like is mainly performed, a vehicle is traveled forward to excavate gravel or the like, and after that, the vehicle is traveled backward and moves to a dump. At this time, an explanation will be made of the first embodiment by taking a specific example (that is, No. 1-A in Table 4) thereof. The planetary stepless speed-changing mechanism 24 can reverse the rotation direction of the third connecting member 32 linked to the idler gear 28B by controlling the rotation speed of the first connecting member 30 linked to the first variator 33 based upon the speed relation line Y1 of the planetary gear mechanism 29 as shown in FIG. 7. However, in a case of reversing the rotation direction of the second sun gear 29C in relation to the rotation direction of the first sun gear 29B (that is, in a case of controlling it in a right, lower direction in FIG. 7), the rotation speed of the first sun gear 29B gets high. Similarly, in a case of reversing the rotation direction of the first sun gear 29B (that is, in a case of controlling it in a left, upper direction in FIG. 7) in relation to the rotation direction of the second sun gear 29C, the rotation speed of the second sun gear 29C gets high.

In this case, the first variator 33 connected to the first connecting member 30 is required to adopt a variator higher in the limitation of the maximum rotation speed. Therefore, the first connecting member 30 linked to the first variator 33 is rotated in a high speed and the rotation direction of the third connecting member 32 linked to the idler gear 28B is reversed from a normal rotation, resulting in adoption of the first variator 33 that is expensive and is high in the maximum rotation speed. Thereby, a cost price of the planetary stepless speed-changing mechanism 24 possibly increases. Therefore, when the wheel loader 1 travels backward, it is preferable to reverse the rotation direction of the output shaft 53 (output shaft 23) from the forward direction to the backward direction by using the multistage speed-changing mechanism 26. As a result, it is possible to lower the rotation speed of the first variator 33 to be connected at the reversing to use the inexpensive first variator 33. It should be noted that the first embodiment (that is, No. 1-A in Table 4) is taken as the example, but in a case of the fourth modification example (that is, No. 1-B in Table 4) and the fifth modification example (that is, No. 1-C in Table 4), similarly the forward direction and the backward direction are switched by switching the rotation direction of the output shaft 53 by using the multistage speed-changing mechanism 26. As a result, it is possible to lower the rotation speed of the first variator 33 to be connected at the reversing to use the inexpensive first variator 33.

As described above, according to the first embodiment, the speed-changing device 21 is provided with the input shaft 22 (input member) linked to the power source (engine 9), the output shaft 23 (output member) linked to the load (the front axle 12 and the rear axle 13), the planetary gear mechanism 29 (planetary mechanism) disposed between the input shaft 22 and the output shaft 23, the first variator 33 connected to the planetary gear mechanism 29, the second variator 34 disposed apart from the first variator 33 and the controller 25 configured to change the rotation speed of the first variator 33. The planetary gear mechanism 29 is configured to include three members (rotation members) of the carrier 29A, the first sun gear 29B (first sun member) rotating about the rotation center axis of the carrier 29A and the second sun gear 29C (second sun member) rotating about the rotation center axis of the carrier 29A.

In this case, for example, as shown in FIG. 4 and FIG. 5, the carrier 29A as the first member that is one of the three members is connected via the second connecting member 31 (the other member) to the input shaft 22. The first sun gear 29B as the second member apart from the carrier 29A is connected via the first connecting member 30 and the second clutch 36 (any of them is the other member) to the first variator 33. The second sun gear 29C as the third member apart from the carrier 29A and the first sun gear 29B is connected via the third connecting member 32, the idler element 28 and the multistage speed-changing mechanism 26 (any of them is the other member) to the output shaft 23. It should be noted that the carrier 29A (first member) may be connected directly to the input shaft 22. The first sun gear 29B (second member) may be connected directly to the first variator 33. The second sun gear 29C (third member) may be connected directly to the output shaft 23.

Here, the planet gear 29D (planet member) and the balance gear 29E (balance member) as the counter gear are supported on the carrier 29A, the planet gear 29D and the balance gear 29E performing the power transmission while revolving about the rotation center axis S of the carrier 29A and rotating with the first sun gear 29B and the second sun gear 29C. The planetary gear mechanism 29 distributes the torque transmitted to the carrier 29A (first member) of the planetary gear mechanism 29 from the engine 9 to the first sun gear 29B (second member) and the second sun gear 29C (third member). The planetary gear mechanism 29 performs the rotation motion with two degrees of freedom between the carrier 29A, the first sun gear 29B and the second sun gear 29C. The second variator 34 transmits the power transmitted from the first variator 33 to the load (output shaft 23) or the power source (input shaft 22), or transmits the power transmitted from the load (output shaft 23) or the power source (input shaft 22) to the first variator 33. The controller 25 changes the rotation speed of the first variator 33 to change the rotation speed of the output shaft 23 in relation to the rotation speed of the input shaft 22.

That is, the speed-changing device 21 in the first embodiment performs the speed change steplessly by the planetary gear mechanism 29 and transmits the power transmitted from the power source (input shaft 22) to the load (output shaft 23) or transmits the power transmitted from the load (output shaft 23) to the power source (input shaft 22). In this case, the speed-changing device 21 is provided with the planetary gear mechanism 29 disposed between the input shaft 22 and the output shaft 23, the first variator 33 connected to the planetary gear mechanism 29, and the second variator 34 transmitting the power transmitted from the first variator 33 to the load or the power source. The planetary gear mechanism 29 is provided with the carrier 29A that is connected to the input shaft 22 and on which the planet gear 29D and the balance gear 29E are supported, the first sun gear 29B connected to the first variator 33, and the second sun gear 29C connected via the idler element 28 and the multistage speed-changing mechanism 26 to the output shaft 23. Further, the speed-changing device 21 is provided with at least one lockup of the internal lockup and the external lockup (direct connecting mechanism 27). The speed-changing device 21 can perform the switching between the power transmission by the planetary stepless speed-changing mechanism 24 and the power transmission by the lockup.

Therefore, the speed-changing device 21 high in the transmission efficiency can be provided to reduce the power loss of the wheel loader 1 as the working vehicle. In this case, it is possible to effectively use the speed-changing range in speed multiplication of the planetary stepless speed-changing mechanism 24 including the planetary gear mechanism 29, the first variator 33 and the second variator 34. In addition to it, at the time of switching the power transmission by the planetary stepless speed-changing mechanism 24 to the power transmission by the lockup, a change in an acceleration/deceleration speed of a vehicle can be made small. Further, in a case where the upper limit value in the rotation speed of the first variator 33 and the upper limit value in the generation (absorption) possible torque thereof are limited, the gear arrangement in which a gear ratio of the planetary gear mechanism 29 becomes an optimal value can be provided to improve the transmission efficiency of the planetary stepless speed-changing mechanism 24. That is, even in a case of using the first variator 33 that is inexpensive and is small-sized and in which the upper limit value in the rotation speed and the upper limit value in the generation (absorption) possible torque are limited, the transmission efficiency of the planetary stepless speed-changing mechanism 24 can be improved.

For example, in the first embodiment on a condition of forcing the cargo working machine 7 not to operate or high operability of the cargo working machine 7 being not required, the power transmission by the lockup mechanism is performed. Therefore, in this case it is possible to perform the power transmission (the internal lockup and the external lockup) by the meshing of gears each other high in the transmission efficiency. On the other hand, on a condition of operating the cargo working machine 7 or the high operability of the cargo working machine 7 being required, the power transmission by the planetary stepless speed-changing mechanism 24 is performed. Therefore, the stepless speed change can be made by operating the planetary stepless speed-changing mechanism 24. It should be noted that the power transmission by the planetary stepless speed-changing mechanism 24 is possibly made lower in a transmission efficiency than the power transmission (the internal lockup and the external lockup) to be performed only by the meshing of gears each other. However, the stepless speed change by the planetary stepless speed-changing mechanism 24 can be made higher in a transmission efficiency than the stepless speed change by a torque converter. As a result, when the power of the single engine 9 is distributed to "the speed-changing device 21 for making a vehicle travel" and "the hydraulic pump 10 for operating the cargo working machine 7", a change in a rotation speed of the engine 9 by the speed change of the speed-changing device 21 can be made slow. Therefore, the operation speed of the cargo working machine 7 can be suppressed from rapidly changing to improve the operability of the cargo working machine 7. In addition to it, when the power of the single engine 9 is distributed to the speed-changing device 21 and the hydraulic pump 10, the power loss by the distribution can be reduced.

According to the first embodiment, the controller 25 stops the rotation of the first sun gear 29B (second member) in the planetary gear mechanism 29 to realize the state of the internal lockup. That is, the controller 25 stops the rotation of the first sun gear 29B to change a state of performing the rotation motion with two degrees of freedom between the carrier 29A, the first sun gear 29B and the second sun gear 29C to a state of performing the rotation motion with one degree of freedom. Thereby, in the speed-changing device 21 the planetary gear mechanism 29 transmits the power transmitted from the power source to the planetary gear mechanism 29 to the load in a state of being in one degree of freedom. At this time, the controller 25 outputs a command of making the rotation speed be 0 to the first variator 33. In addition, the controller 25 outputs a command of stopping the rotation of the member to be connected to the first variator 33 by a mechanical engagement. In addition, the controller 25 outputs a command of blocking the power to be sent to the second variator 34 from the first variator 33. Thereby, the controller 25 stops the rotation of the first sun gear 29B. In any case, the internal lockup can be realized by stopping the rotation of the first sun gear 29B in the planetary gear mechanism 29 to improve the transmission efficiency.

According to the first embodiment, the speed-changing device 21 is provided with two power transmission routes composed of a first power transmission route (planetary stepless speed-changing mechanism 24) and a second power transmission route (direct connecting mechanism 27). That is, the power transmission route for transmitting the power from the power source through the planetary gear mechanism 29 to the load (output shaft 23) is defined as the first power transmission route. In this case, the second power transmission route is disposed in the speed-changing device 21 to be in parallel with the first power transmission route. The second power transmission route is the direct connecting mechanism 27 (external lockup mechanism) for transmitting the power to the load (output shaft 23) by the meshing of gears each other without via the planetary gear mechanism 29. The second power transmission route (the direct connecting mechanism 27) is provided with the first clutch 27C for switching the engagement and the disengagement. The controller 25 engages the first clutch 27C and performs the power transmission through the second power transmission route (direct connecting mechanism 27). Thereby, the transmission efficiency can improve more than the configuration of performing the internal lockup only, for example.

According to the first embodiment, the speed ratio when the rotation speed of the carrier 29A (first member) is the same as that of the second sun gear 29C (third member) is defined as a synchronization rotation speed ratio. In addition, a value is found by dividing the rotation speed of the second sun gear 29C (third member), at the time the power transmission is performed via the second transmission route (direct connecting mechanism 27) by engaging the first clutch 27C, by the rotation speed of the power source. That value is defined as a lockup rotation speed ratio. In this case, the lockup rotation speed ratio is larger than the synchronization rotation speed ratio. Therefore, at the time of transmitting the power through the second power transmission route as the external lockup mechanism, the speed can increase.

According to the first embodiment, the second clutch 36 is disposed between the first sun gear 29B (second member) and the first variator 33 to switch the transmission and release in power between the first sun gear 29B (second member) and the first variator 33. The controller 25 disconnects the power transmission between the first sun gear 29B (second member) and the first variator 33 by disengaging the second clutch 36 during the time the working vehicle (wheel loader 1) is stopped. As a result, when a vehicle speed of the wheel loader 1 is 0, the power transmission to the first variator 33 can be blocked.

According to the first embodiment, the controller 25 engages the second clutch 36 for stopping the first sun gear 29B (second member). Therefore, at the internal lockup it is possible to stop the rotation of the first sun gear 29B (second member). In the first embodiment, the third clutch 37 is disposed between the second variator 34 and the load or the power source to switch the transmission and release in power between the second variator 34 and the load or the power source. The controller 25 disengages the third clutch 37 during the time the first sun gear 29B (second member) is stopped. Therefore, at the internal lockup it is possible to block the power transmission to the second variator 34. It should be noted that at the internal lockup the second clutch 36 is required to be engaged, but the third clutch 37 can be either disengaged or engaged.

According to the first embodiment, the controller 25 disengages the second clutch 36 during the time the first clutch 27C is engaged. Therefore, at the external lockup it is possible to block the power transmission to the first variator 33. In addition, the controller 25 disengages the third clutch 37 during the time the first clutch 27C is engaged. Therefore, at the external lockup it is possible to block the power transmission to the second variator 34. It should be noted that at the external lockup the second clutch 36 and the third clutch 37 can be either disengaged or engaged.

According to the first embodiment, in the speed-changing device 21 the multistage speed-changing mechanism 26 is disposed between the second sun gear 29C (third member) and the output shaft 23 (output member). The multistage speed-changing mechanism 26 is provided with the first output transmission route (odd numbered shaft 51) and the second output transmission route (even numbered shaft 52). In this case, in the first output transmission route (odd numbered shaft 51), the number of times of the gear meshing is the odd number of times between the second sun gear 29C (third member) and the output shaft 23 (output member). In the second output transmission route (even numbered shaft 52), the number of times of the gear meshing may be the odd number of times or the even number of times between the second sun gear 29C (third member) and the output shaft 23 (output member). Specifically, a route, for transmitting the power from the idler gear 28B via the even numbered stage gear 62, the fifth clutch 66, the ninth clutch 69, the counter gear 54 and the backward one-speed output gear 75 to the output shaft 53, of the second output transmission route (even numbered shaft 52) has the number of times of the gear meshing as the even number of times. The number of times of the gear meshing between the second sun gear 29C (third member) and the output shaft 23 (output member) by the other route becomes the odd number of times. In addition, the first output transmission route (odd numbered shaft 51) is provided with a first output clutch (the fourth clutch 58, sixth clutch 59 and eighth clutch 60) for switching the transmission and release of power in the first output transmission route. The second output transmission route (even numbered shaft 52) is provided with a second output clutch (the fifth clutch 66, seventh clutch 67, tenth clutch 68 and ninth clutch 69) for switching the transmission and release of power in the second output transmission route. The controller 25 switches a normal rotation mode and a reverse rotation mode, in the normal rotation mode (for example, in a one-speed mode) the first output clutch (the fourth clutch 58 and sixth clutch 59) being engaged and the second output clutch (for example, the fifth clutch 66) being disengaged and in the reverse rotation mode (backward mode) the first output clutch (for example, the fourth clutch 58) being disengaged and the second output clutch (for example, the fifth clutch 66 and ninth clutch 69) being engaged. A forward direction of the wheel loader 1 (vehicle) is reversed by this switching. Therefore, the speed-changing device 21 can reverse the rotation direction of the load (output shaft 23).

According to the first embodiment, the speed-changing device 21 is provided with the multistage speed-changing mechanism 26 as a sub speeding-changing mechanism. In addition, the second variator 34 is connected to an idler element (specifically, the idler gear 28B as a rotation element) disposed between the planetary gear mechanism 29 and the multistage speed-changing mechanism 26. It should be noted that as a sixth modification example as shown in FIG. 20, the second variator 34 may be connected to the output shaft 23 (output member). That is, as shown in FIG. 30 to FIG. 39 to be described later, the second variator 34 may be configured to be connected to a rotation element disposed between the input shaft 22 (input member) and the drive source (engine 9), a rotation element configuring the multistage speed-changing mechanism 26, a rotation element disposed between the multistage speed-changing mechanism 26 and the output shaft 23 (output member), the output shaft 23 (output member), or a rotation element disposed between the output shaft 23 and the load.

Next, FIG. 21 to FIG. 24 show a second embodiment. The second embodiment is characterized in that a planetary gear mechanism is configured of a carrier, a sun gear and a ring gear. It should be noted that in the second embodiment, components identical to those in the first embodiment are referred to as the identical reference numerals, and an explanation thereof is omitted.

In the first embodiment, the explanation is made by taking as an example a case where the planetary gear mechanism 29 in the planetary stepless speed-changing mechanism 24 is configured of the carrier and the two sun gears. On the other hand, in the second embodiment a planetary gear mechanism 81 in the planetary stepless speed-changing mechanism 24 is configured of a carrier 81A, a sun gear 81B and a ring gear 81C. Table 6 as follows shows a combination of configuration elements (a carrier, sun gear and ring gear) of the planetary gear mechanism 81. In any case, the power transmission is made possible. "No. 2-A" in Table 6 is the most preferable from a point of view that the transmission efficiency of the planetary stepless speed-changing mechanism 24 can improve, the maximum absorption torque of the first variator 33 can be made small, and the entirety of the planetary stepless speed-changing mechanism 24 can be configured to be small-sized and light in weight.

TABLE 6

Figure 21:
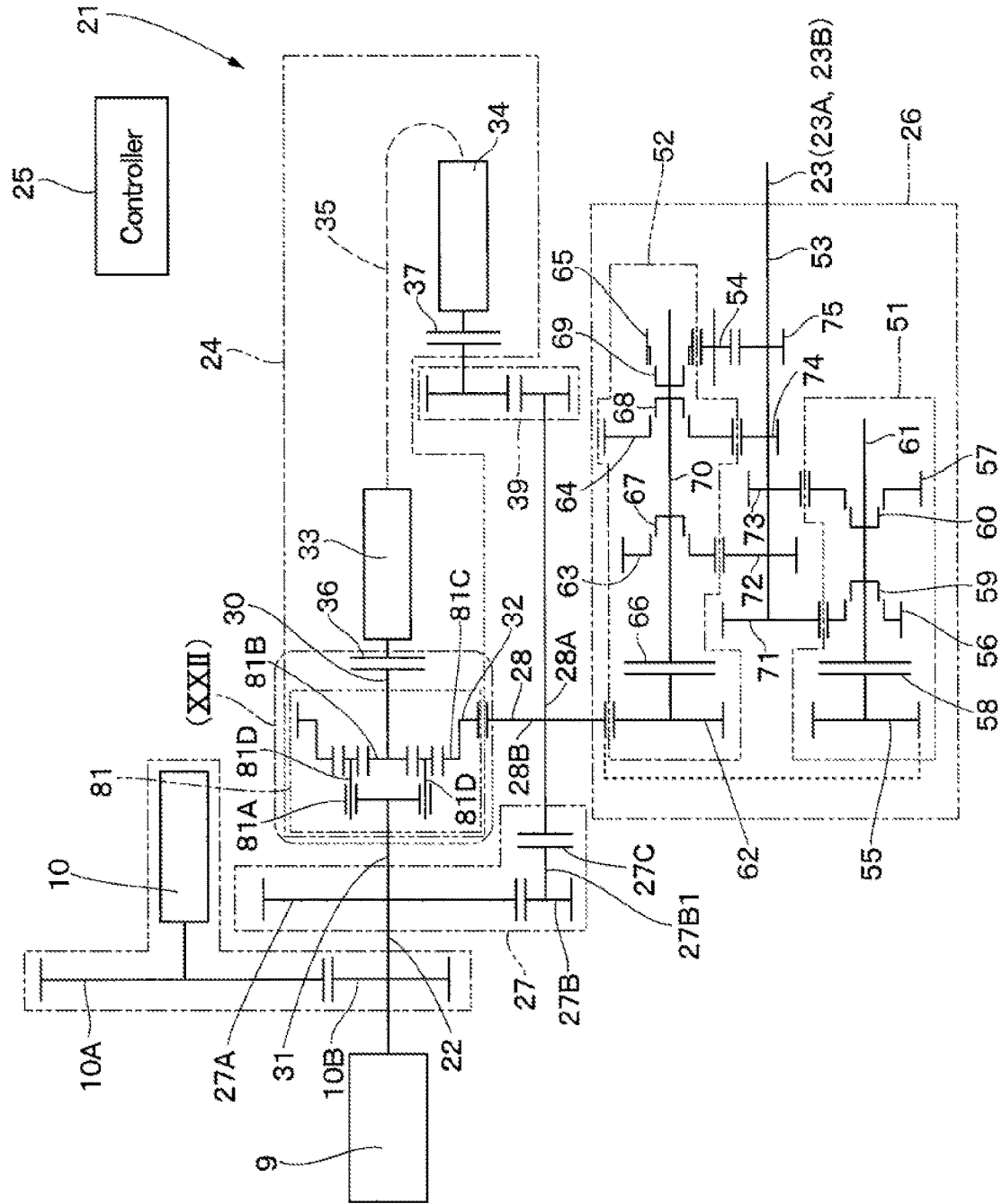
FIG. 21 is a configuration diagram as similar to FIG. 4, showing a second embodiment.
Figure 25:
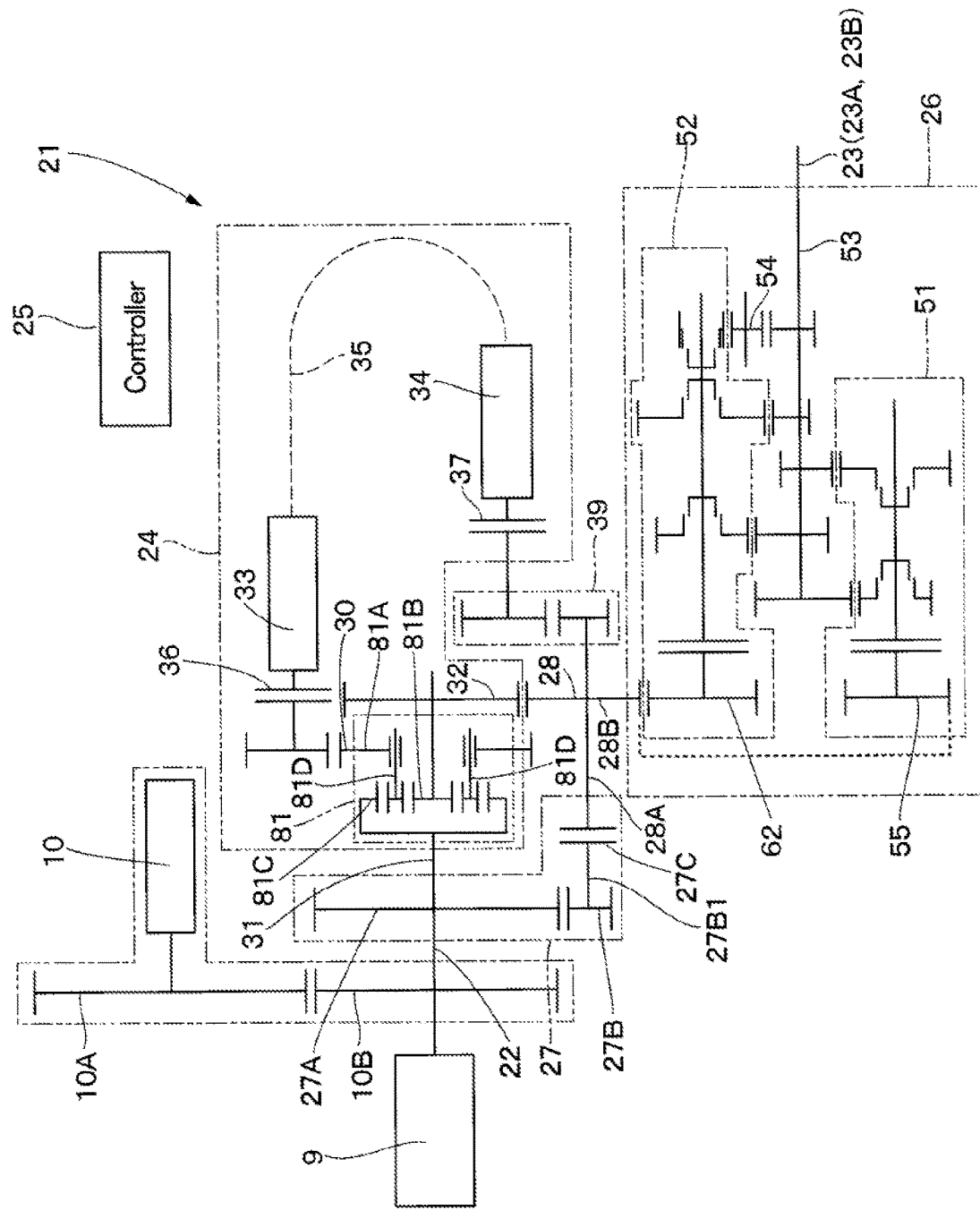
FIG. 25 is a configuration diagram as similar to FIG. 21, showing a seventh modification example (configuration in which an input shaft is connected to a ring member and a first variator is connected to a carrier).
Figure 26:
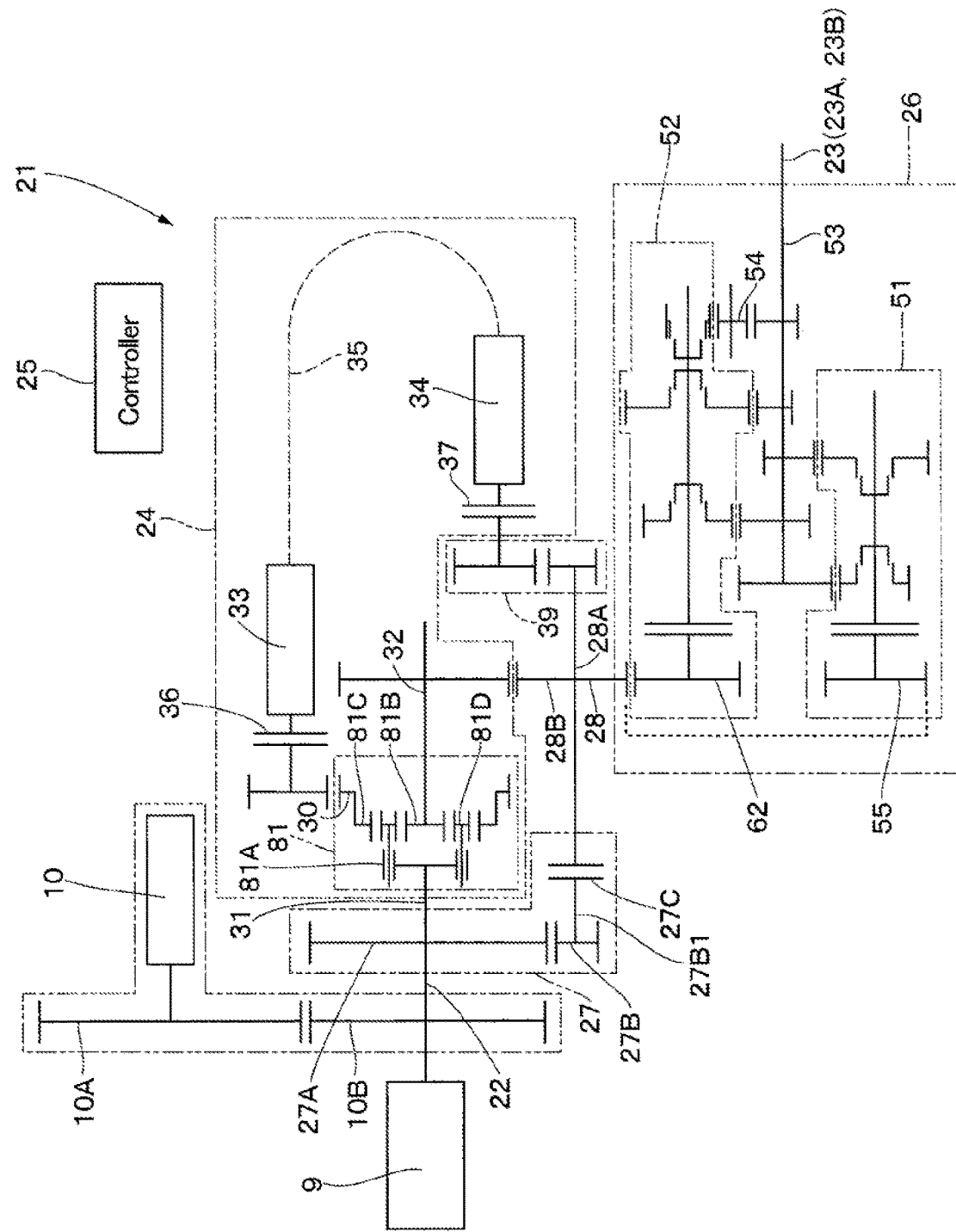
FIG. 26 is a configuration diagram as similar to FIG. 21, showing an eighth modification example (configuration in which an input shaft is connected to a carrier and a first variator is connected to a ring member).

| No. | First member linked to power source | Second member linked to first variator | Third member linked to idler element | Number of Figure |
|---|---|---|---|---|
| 2-A | carrier | sun gear | ring gear | FIG. 21 (second embodiment) |
| 2-B | ring gear | carrier | sun gear | FIG. 25 (seventh modification example) |
| 2-C | carrier | ring gear | sun gear | FIG. 26 (eighth modification example) |

TABLE 6-continued

Figure 27:
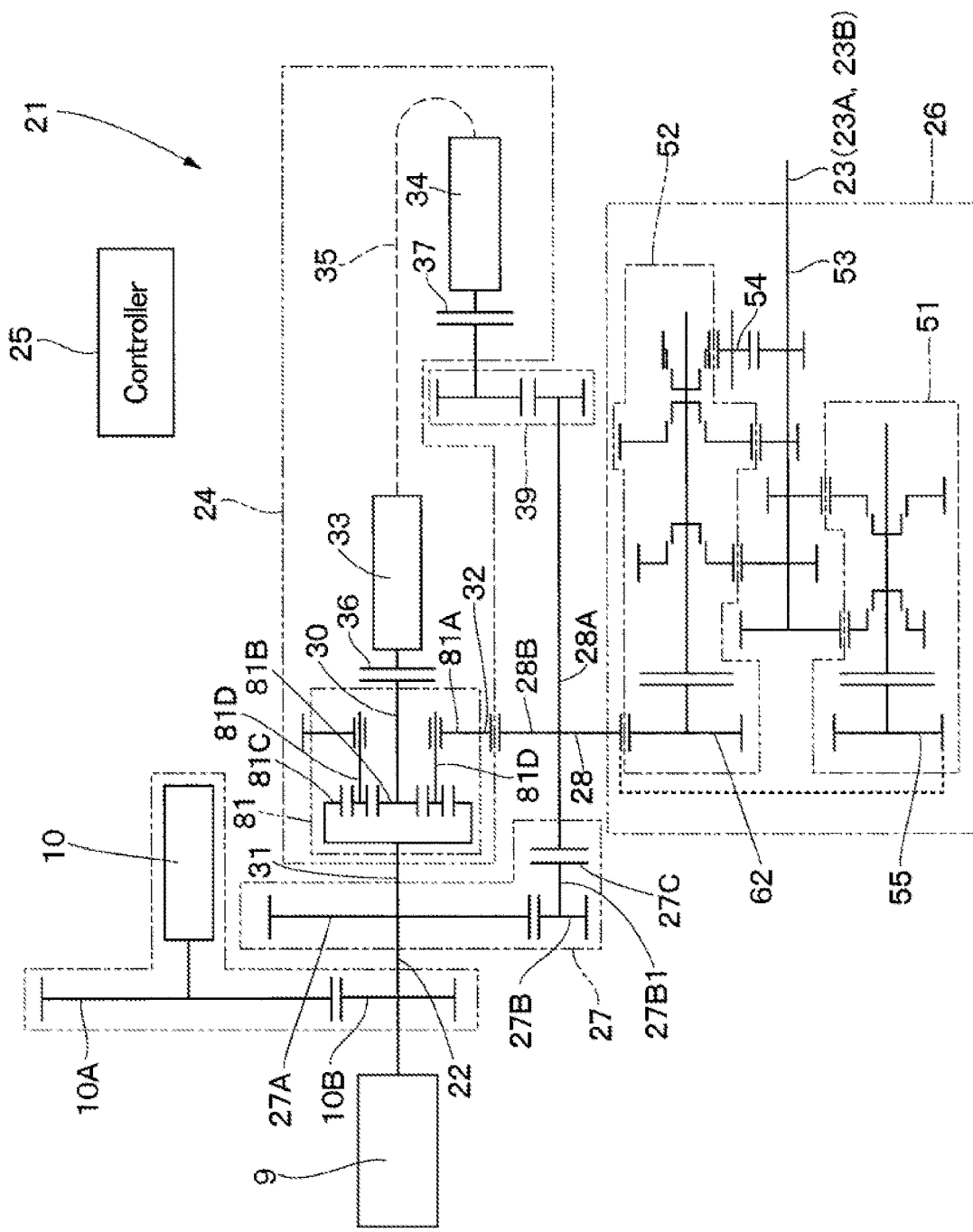
FIG. 27 is a configuration diagram as similar to FIG. 21, showing a ninth modification example (configuration in which an input shaft is connected to a ring member and a first variator is connected to a sun member).
Figure 28:
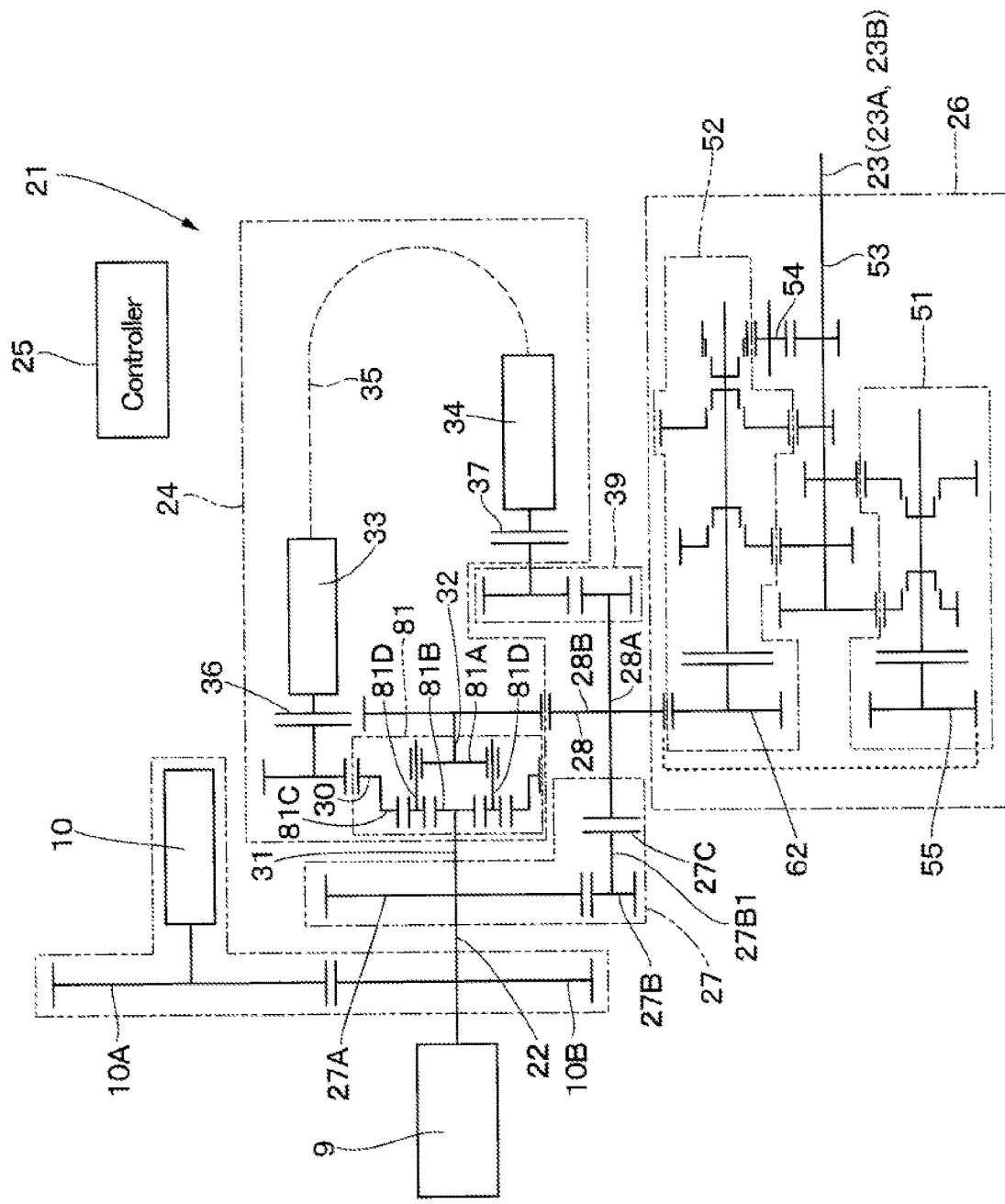
FIG. 28 is a configuration diagram as similar to FIG. 21, showing a tenth modification example (configuration in which an input shaft is connected to a sun member and a first variator is connected to a ring member).
Figure 29:
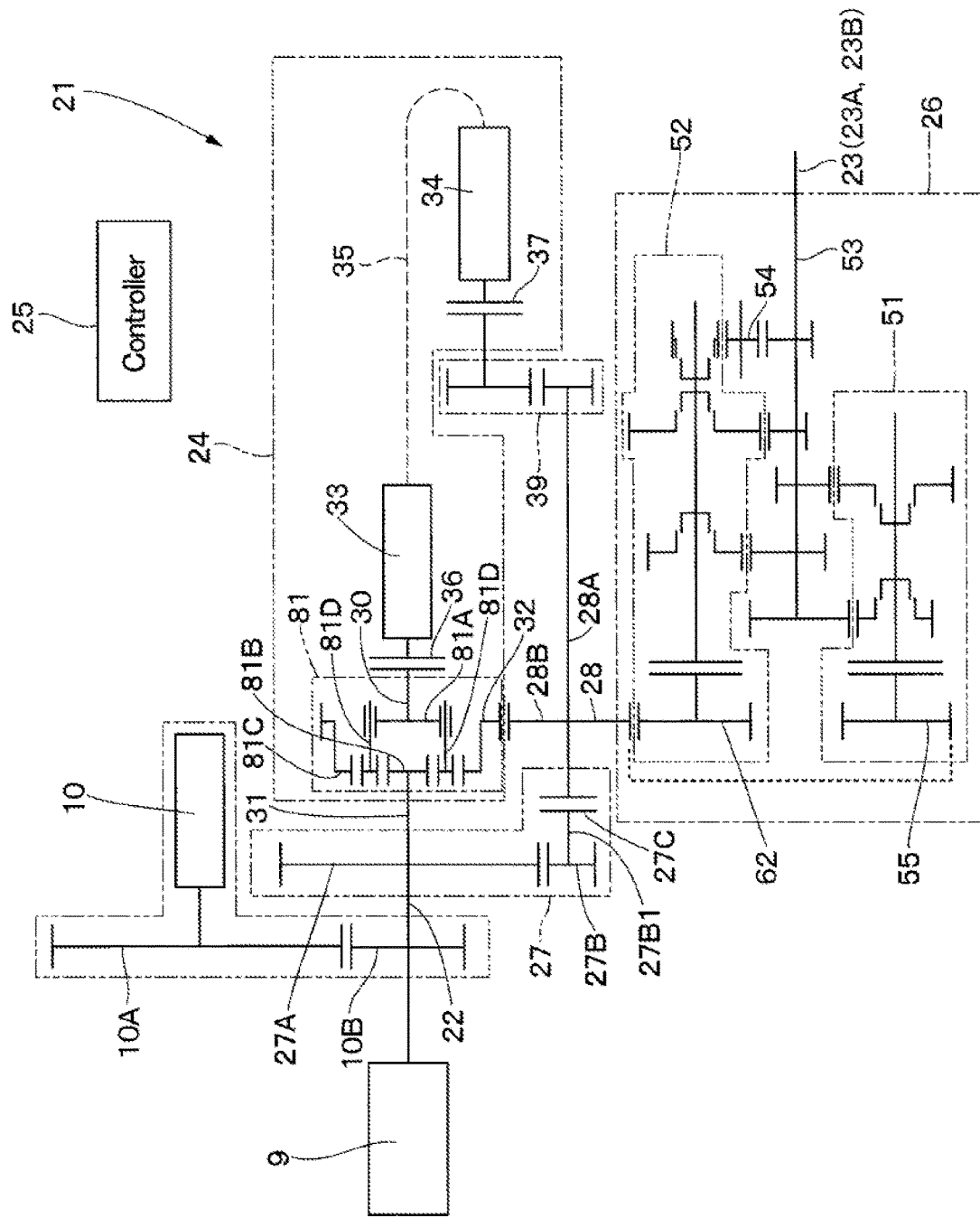
FIG. 29 is a configuration diagram as similar to FIG. 21, showing an eleventh modification example (configuration in which an input shaft is connected to a sun member and a first variator is connected to a carrier).

| No. | First member linked to power source | Second member linked to first variator | Third member linked to idler element | Number of Figure |
|---|---|---|---|---|
| 2-D | ring gear | sun gear | carrier | FIG. 27 (nineth modification example) |
| 2-E | sun gear | ring gear | carrier | FIG. 28 (tenth modification example) |
| 2-F | sun gear | carrier | ring gear | FIG. 29 (eleventh modification example) |

Figure 22:
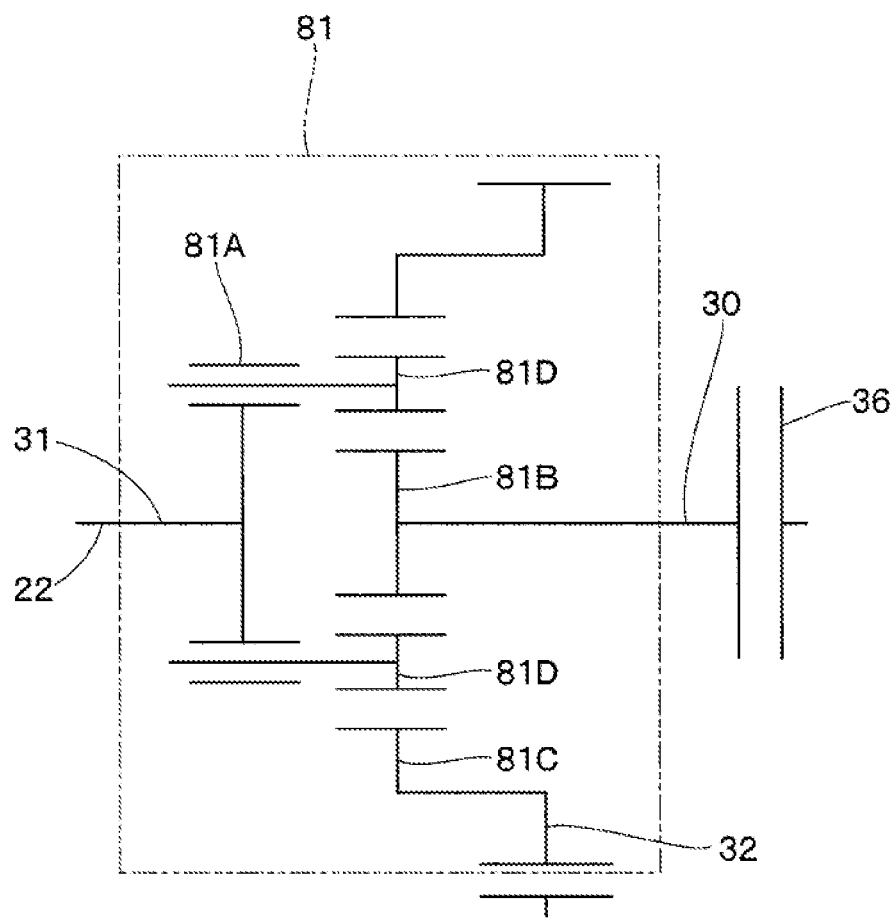
FIG. 22 is an enlarged view showing (XXII) part in FIG. 21.

As shown in FIG. 21 and FIG. 22, in the second embodiment the planetary gear mechanism 81 is provided with the carrier 81A corresponding to a first member, the sun gear 81B corresponding to a second member, the ring gear 81C corresponding to a third member and the planet gear 81D. The power transmission of the sun gear 81B, the ring gear 81C and the planet gear 81D may be performed not by the meshing of gears but by friction of a roller (an outer peripheral surface), for example.

The engine 9 is connected via the second connecting member 31 to the carrier 81A. The sun gear 81B is connected via the first connecting member 30 to the first variator 33. The ring gear 81C is connected via the third connecting member 32 to the idler element 28 (idler gear 28B). The sun gear 81B is meshed with the planet gear 81D. In addition, the planet gear 81D is meshed with the ring gear 81C. A rotating axis Sp (FIG. 23) of the planet gear 81D is supported on the carrier 81A. Therefore, the planet gear 81D rotates on its own axis while revolving about a center axis S (FIG. 23) of the planetary gear mechanism 81.

Next, an explanation will be made of an operation of the planetary gear mechanism 81 configured of the carrier 81A, the sun gear 81B and the ring gear 81C. The following is established in all the conditions of "No. 2-A", "No. 2-B", "No. 2-C", "No. 2-D" and "No. 2-F" in Table 6.

Figure 23:
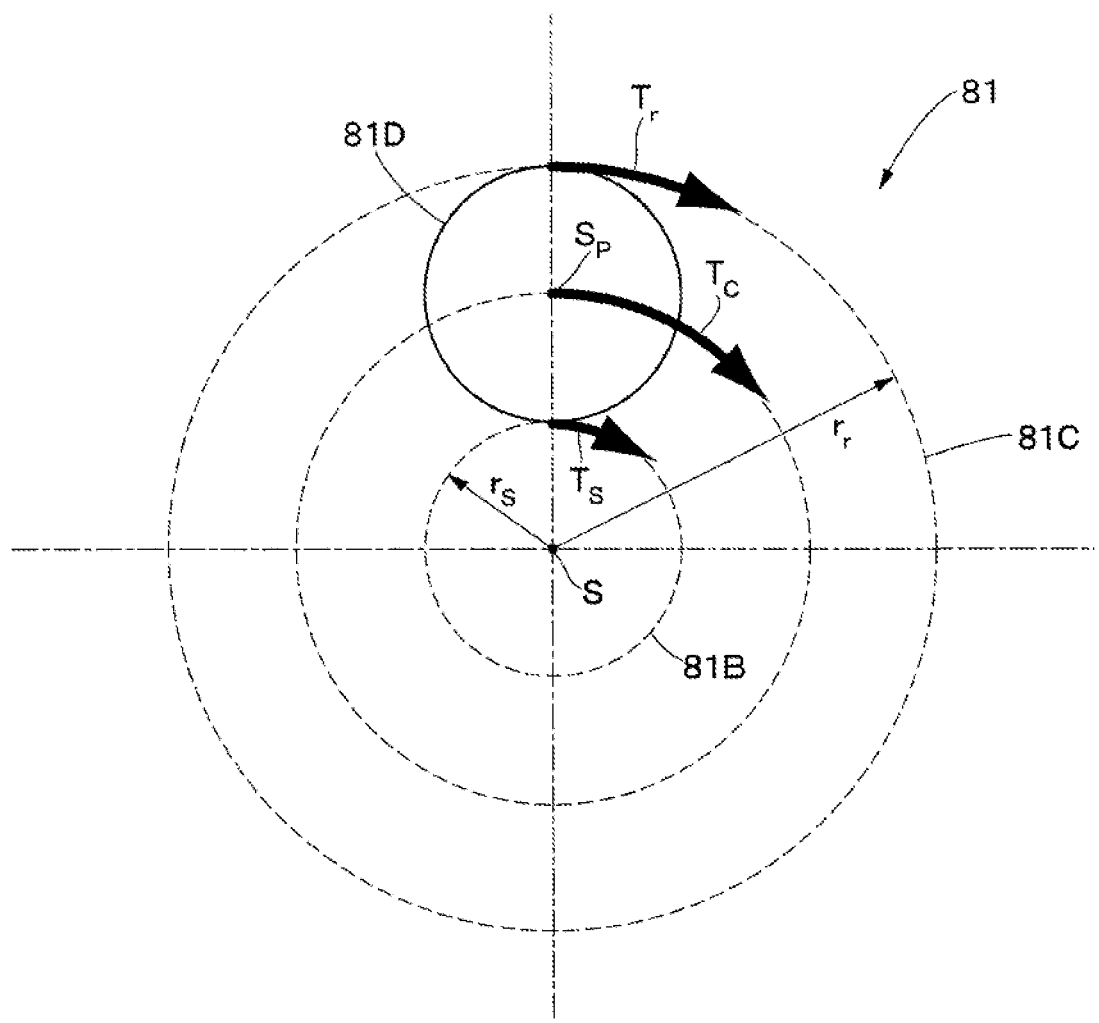
FIG. 23 is an explanatory diagram showing a planetary mechanism in FIG. 21 as viewed from a power source side.

First, an explanation will be made of distribution of torque between three members (the carrier 81A, the sun gear 81B and the ring gear 81C) in the planetary gear mechanism 81. FIG. 23 is a cross section showing the planetary gear mechanism 81 as viewed from the power source side. The carrier 81A, the sun gear 81B and the ring gear 81C are arranged concentrically. That is, the center axis S (rotation center axes) of the carrier 81A, the sun gear 81B and the ring gear 81C is in agreement. The planet gear 81D is arranged to contact an outer periphery of the sun gear 81B and an inner periphery of the ring gear 81C. The planet gear 81D is meshed with the sun gear 81B and the ring gear 81C. The carrier 81A, the sun gear 81B and the ring gear 81C are, for establishing the meshing of the respective gears, supported on a casing of the planetary stepless speed-changing mechanism 24 to be capable of rotating about the center axis S and to be incapable of moving in the other direction. The planet gear 81D is supported on the carrier 81A to be capable of rotating about the rotating axis Sp as the center axis of the planet gear 81D and to be incapable of moving in the other direction. The planet gear 81D rotates about the rotating axis Sp of the planet gear 81D while revolving about the center axis S of the carrier 81A.

The limiting condition of the planetary gear mechanism 81 lies, as shown in FIG. 23, in that the sun gear 81B, the ring gear 81C and the planet gear 81D are required to be meshed. In addition, for securing the strength of gears, it is necessary to make a diameter of the planet gear 81D large. That is, the limiting condition of the planetary gear mechanism 81 lies in that a mesh radius rs of the sun gear 81B becomes smaller by a large magnitude than a mesh radius rr of the ring gear 81C.

"No. 2-A" in Table 6 is configured such that the carrier 81A is connected to the second connecting member 31 linked to the engine 9 (power source). Therefore, torque Tc of the carrier 81A is a torque that the engine 9 can generate. The sun gear 81B is connected to the first connecting member 30 linked to the first variator 33. Therefore, torque Ts of the sun gear 81B is a torque that the first variator 33 can generate. The ring gear 81C is connected to the third connecting member 32 linked to the idler element 28. Therefore, torque Tr of the ring gear 81C is a torque reaction receiving from the idler gear 28B.

"No. 2-B" in Table 6 is configured such that the ring gear 81C is connected to the second connecting member 31. Therefore, the torque Tr of the ring gear 81C is a torque that the engine 9 can generate. The carrier 81A is connected to the first connecting member 30. Therefore, the torque Tc of the carrier 81A is a torque that the first variator 33 can generate. The sun gear 81B is connected to the third connecting member 32. Therefore, the torque Ts of the sun gear 81B is a torque reaction receiving from the idler gear 28B.

"No. 2-C" in Table 6 is configured such that the carrier 81A is connected to the second connecting member 31, the ring gear 81C is connected to the first connecting member 30 and the sun gear 81B is connected to the third connecting member 32. "No. 2-D" in Table 6 is configured such that the ring gear 81C is connected to the second connecting member 31, the sun gear 81B is connected to the first connecting member 30 and the carrier 81A is connected to the third connecting member 32. "No. 2-E" in Table 6 is configured such that the sun gear 81B is connected to the second connecting member 31, the ring gear 81C is connected to the first connecting member 30 and the carrier 81A is connected to the third connecting member 32. "No. 2-F" in Table 6 is configured such that the sun gear 81B is connected to the second connecting member 31, the carrier 81A is connected to the first connecting member 30 and the ring gear 81C is connected to the third connecting member 32.

Next, an explanation will be made of the relationship of the torque Ts of the sun gear 81B, the torque Tr of the ring gear 81C and the torque Tc of the carrier 81A. The sun gear 81B and the ring gear 81C are meshed via the planet gear 81D. Therefore, a meshing tangential force between the sun gear 81B and the planet gear 81D is equal to a meshing tangential force between the planet gear 81D and the ring gear 81C. That is, Formula 16 and Formula 17 as follows are obtained.

[Formula 16]

$$Ts = \frac{rs}{(rs+rr)} \times Tc \qquad \text{[Formula 16]}$$

[Formula 17]

$$Tr = \frac{rr}{(rs+rr)} \times Tc \qquad \text{[Formula 17]}$$

Based upon a relation of action and reaction, Formula 18 as follows is obtained.

$$Tc = Ts + Tr \qquad \text{[Formula 18]}$$

According to Formula 16, Formula 17 and Formula 18, the torque Ts of the sun gear 81B, the torque Tr of the ring gear 81C and the torque Tc of the carrier 81A can be calculated based upon the mesh radius rr of the ring gear 81C and the mesh radius rs of the sun gear 81B. Since the mesh radius rr of the ring gear 81C and the mesh radius rs of the sun gear 81B are determined by the mesh radii of the respective gears, the radius cannot be changed during the time when the planetary stepless speed-changing mechanism 24 is transmitting the power. Therefore, a ratio of the torque Ts of the sun gear 81B, the torque Tr of the ring gear 81C and the torque Tc of the carrier 81A does not change during the time when the planetary stepless speed-changing mechanism 24 is transmitting the power.

The controller 25 outputs a signal for controlling the first variator 33 based upon this principle and controls the torque of the first connecting member 30 (for example, the sun gear 81B) linked to the first variator 33. That is, the controller 25 controls the torque of the first connecting member 30 (for example, the sun gear 81B) by controlling the first variator 33. Thereby, the controller 25 indirectly controls the torque of the second connecting member 31 (for example, the carrier 81A) linked to the engine 9 and the torque of the third connecting member 32 (for example, the ring gear 81C) linked to the idler element 28. As a result, the transmission torque can be controlled between the second connecting member 31 (for example, the carrier 81A) linked to the engine 9 and the third connecting member 32 (for example, the ring gear 81C) linked to the idler element 28.

Next, an explanation will be made of a relationship of a rotating speed of the sun gear 81B, a rotating speed of the ring gear 81C and a rotating speed of the carrier 81A. First, the sun gear 81B and the ring gear 81C are meshed with each other via the planet gear 81D. The sun gear 81B and the ring gear 81C rotate about the center axis S. The planet gear 81D rotates freely in the rotating direction by the carrier 81A and is restricted in the revolving direction in relation to the center axis S of the carrier 81A. When a relation of the rotating speeds is found from the above, Formula 19 as follows is established. It should be noted that "Kb" in Formula 19 is shown according to Formula 20. The rotating speed of the carrier 81A is indicated as "Vc", the rotating speed of the sun gear 81B is indicated as "Vs" and the rotating speed of the ring gear 81C is indicated as "Vr".

[Formula 19]

$$\frac{Vr}{Vc} = -Kb\left\{\frac{Vs}{Vc}\right\} + (Kb+1) \qquad \text{[Formula 19]}$$

[Formula 20]

$$Kb = \left(\frac{rs}{rr}\right) \qquad \text{[Formula 20]}$$

Figure 24:
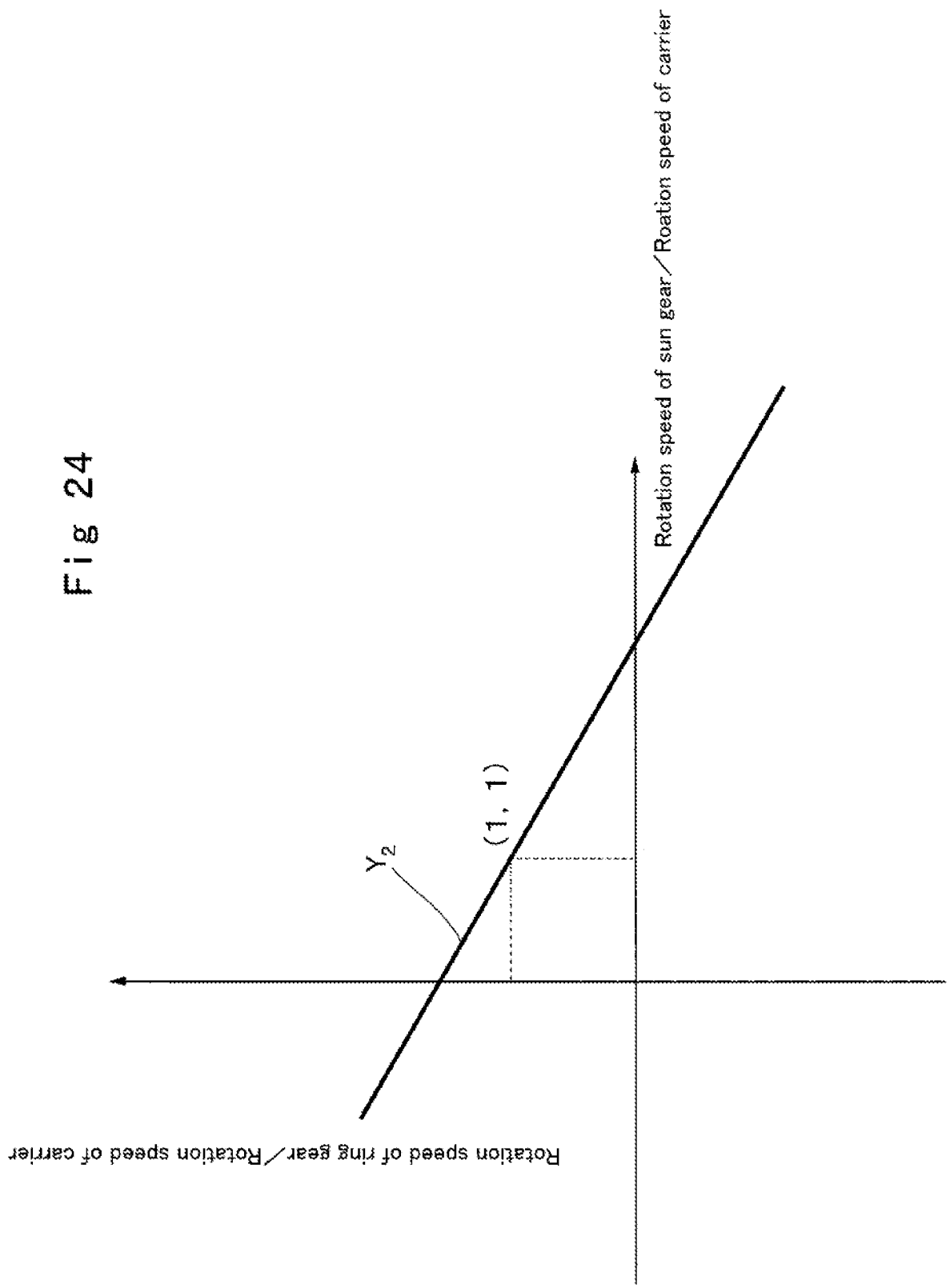
FIG. 24 is a characteristic diagram showing a relation of rotation speeds of three members in the planetary mechanism in FIG. 21.

FIG. 24 shows a relation of rotation speeds of the planetary gear mechanism 81. A speed relation line Y2 in FIG. 24 represents Formula 19 in a diagrammatic drawing. There is assumed that the rotating speed of the carrier 81A is constant. In this case, when the rotating speed of the ring gear 81C is made high, the rotating speed of the sun gear 81B is made low. In contrast, when the rotating speed of the ring gear 81C is made low, the rotating speed of the sun gear 81B is made high. The controller 25 outputs a signal for controlling the first variator 33 based upon this principle and controls the rotation speed of the first connecting member 30 (for example, the sun gear 81B) linked to the first variator 33. That is, the controller 25 controls the rotation speed of the first connecting member 30 (for example, the sun gear 81B) by controlling the first variator 33. Thereby, the controller 25 indirectly controls the rotation speed of the second connecting member 31 (for example, the carrier 81A) linked to the engine 9 and the rotation speed of the third connecting member 32 (for example, the ring gear 81C) linked to the idler element 28. As a result, the speed change ratio can be controlled between the second connecting member 31 (for example, the carrier 81A) linked to the engine 9 and the third connecting member 32 (for example, the ring gear 81C) linked to the idler element 28.

As described before, in the planetary gear mechanism 81, the sun gear 81B, the ring gear 81C and the planet gear 81D are required to be meshed with each other. For securing the strength of the gear, it is necessary to make a diameter of the planet gear 81D large. However, as the diameter of the planet gear 81D is made large, the planetary gear mechanism 81 is large-sized. That is, a structural limit of the planetary gear mechanism 81 lies in that when the planetary gear mechanism 81 is designed to be small-sized, the mesh radius rs of the sun gear 81B is made smaller by a large magnitude than the mesh radius rr of the ring gear 81C. Therefore, in the planetary gear mechanism 81, a value of Kb is difficult to be made larger than 0.3 and is possibly made too smaller than a value of an idealistic value Kb.

By this structural limit, the planetary gear mechanism 81 adjusts the mesh radius rs of the sun gear 81B and the mesh radius rr of the ring gear 81C in accordance with the torque that can be absorbed by the first variator 33 and the allowable maximum rotation speed thereof based upon the relation formulas (the Formula 16, Formula 17 and Formula 18) of the torque Tc, Ts and Tr and the relation formulas (the Formula 19 and Formula 20) of the rotating speeds Vs, Vr and Vc. Thereby, by setting the value of Kb in Formula 20 to an idealistic value and making an inclination of the speed relation line Y2 as shown in FIG. 24 an idealistic value, both of the torque that can be absorbed by the first variator 33 and the allowable maximum rotation speed thereof can be reduced. However, under this condition, the value of Kb is made too small and the establishment of both is difficult to achieve. That is, there is a possibility that the second embodiment has a disadvantage in relation to the first embodiment in a point of providing the arrangement of the planetary gear mechanism 81 in which both of the torque that can be absorbed by the first variator 33 and the allowable maximum rotation speed thereof are optimized. That is, the second embodiment has a tendency that the first variator 33 becomes more expensive in relation to the first embodiment and has a possibility that the transmission efficiency of the planetary stepless speed-changing mechanism 24 is lowered.

It should be noted that the size and the price of the first variator 33 are in proportion to a magnitude of the torque that can be absorbed by the first variator 33. Therefore, the absorbed torque of the first variator 33 is preferably smaller. The second embodiment (that is, No. 2-A in Table 6) will be explained by taking a specific example thereof. First, the value of Kb in Formula 20 is preferably made small. In addition, as the torque to be distributed to the first variator 33 is the smaller, the transmission efficiency of the planetary stepless speed-changing mechanism 24 can be further improved. Therefore, making the value of Kb in Formula 20 small is appropriate for the planetary stepless speed-changing mechanism 24.

On the other hand, as the value of Kb is made small based upon the speed relation line Y2 as shown in FIG. 24, the rotation speed of the first variator 33 results in increase. Therefore, it is preferable that the value of Kb is made small within a range not exceeding the allowable maximum rotation speed of the first variator 33. The planetary gear mechanism 81 configured of the sun gear, the ring gear and the carrier has the structural limit that, as the planetary gear mechanism 81 is designed to be made small, the mesh radius rs of the sun gear 81B is made smaller by a large magnitude than the mesh radius rr of the ring gear 81C. Therefore, as the planetary gear mechanism 81 is designed to be small-sized, the value of Kb becomes too small. As a result, the rotation speed of the first variator 33 becomes high, which possibly exceeds the allowable maximum rotation speed of the first variator 33. Therefore, the planetary gear mechanism 81 operable in a high rotation becomes necessary. That is, there is a possibility that the first variator 33 becomes as expensive as to be capable of responding to the high rotation, the planetary gear mechanism 81 becomes large-sized and the transmission efficiency of the planetary stepless speed-changing mechanism 24 is lowered.

Next, the planetary gear mechanism 29 in the first embodiment will be compared with the planetary gear mechanism 81 in the second embodiment. That is, the two planetary gear mechanisms 29, 81 each have an advantage due to the distinction, and it cannot be completely said that one of them is more excellent. That is, in a case of being capable of freely setting the torque that can be absorbed by the first variator 33 and the allowable maximum rotation speed thereof, it is preferable to adopt the structurally simple planetary gear mechanism 81. Therefore, the first variator 33 is designed to adapt to the structural limit (the value of Kb) of the mesh radius rs of the sun gear 81B and the mesh radius rr of the ring gear 81C in the planetary gear mechanism 81. Thereby, the first variator 33 that is small-sized and inexpensive can be used. As a result, the planetary gear mechanism 81 can be simplified and the transmission efficiency of the planetary stepless speed-changing mechanism 24 can be improved.

On the other hand, in a case of being incapable of freely setting the torque that can be absorbed by the first variator 33 and the allowable maximum rotation speed thereof, it is preferable to adopt the planetary gear mechanism 29 in the first embodiment. In this case, by setting the value of Ka to the idealistic value and the inclination of the speed relation line Y1 as shown in FIG. 7 to the idealistic value, it is preferable to be capable of using all of the torque that can be absorbed by the first variator 33 and the allowable maximum rotation speed thereof. Thereby, the first variator 33 that is small-sized and inexpensive can be used and the transmission efficiency of the planetary stepless speed-changing mechanism 24 can be improved.

Next, an explanation will be made of an internal lockup speed change ratio In of the planetary stepless speed-changing mechanism 24 according to the second embodiment. At the internal lockup operation, by substituting the rotation speed of the first connecting member 30 linked to the first variator 33 as 0 to the above-mentioned Formula 19, the internal lockup speed change ratio In can be calculated. For example, in the second embodiment (No. 2-A in Table 6), the rotating speed Vs of the sun gear 81B connected to the first connecting member 30 is substituted as 0 to Formula 19. That is, the internal lockup speed change ratio In is found according to the following Formula 21.

[Formula 21]

$$\frac{Vr}{Vc} = Kb + 1 \qquad \text{[Formula 21]}$$

As a result, In=Kb+1

In the seventh modification example (No. 2-B in Table 6) as shown in FIG. 25, Formula 19 is modified, to which the rotating speed Vc of the carrier 81A connected to the first connecting member 30 is substituted as 0. That is, the internal lockup speed change ratio In is found according to the following Formula 22.

[Formula 22]

$$\frac{Vs}{Vr} = \frac{-1}{Kb} \qquad \text{[Formula 22]}$$

As a result, $$In = \frac{-1}{Kb}$$

In the eighth modification example (No. 2-C in Table 6) as shown in FIG. 26, the rotating speed Vr of the ring gear 81C connected to the first connecting member 30 is substituted as 0 to Formula 19. That is, the internal lockup speed change ratio In is found according to the following Formula 23.

[Formula 23]

$$\frac{Vs}{Vc} = \frac{(Kb+1)}{Kb} \qquad \text{[Formula 23]}$$

As a result, $$In = \frac{(Kb+1)}{Kb}$$

In the ninth modification example (No. 2-D in Table 6) as shown in FIG. 27, the rotating speed Vs of the sun gear 81B connected to the first connecting member 30 is substituted as 0 to Formula 19. That is, the internal lockup speed change ratio In is found according to the following Formula 24.

[Formula 24]

$$\frac{Vc}{Vr} = -\frac{1}{Kb+1} \qquad \text{[Formula 24]}$$

As a result, $$In = -\frac{1}{Kb+1}$$

In the tenth modification example (No. 2-E in Table 6) as shown in FIG. 28, the rotating speed Vr of the ring gear 81C connected to the first connecting member 30 is substituted as 0 to Formula 19. That is, the internal lockup speed change ratio In is found according to the following Formula 25.

[Formula 25]

$$\frac{Vc}{Vs} = \frac{Kb}{Kb+1} \qquad \text{[Formula 25]}$$

As a result, $$\text{In} = \frac{Vc}{Vs} = \frac{Kb}{Kb+1}$$

In the eleventh modification example (No. 2-F in Table 6) as shown in FIG. 29, Formula 19 is modified, to which the rotating speed Vc of the carrier 81A connected to the first connecting member 30 is substituted as 0. That is, the internal lockup speed change ratio In is found according to the following Formula 26.

[Formula 26]

$$\frac{Vr}{Vs} = -Kb \qquad \text{[Formula 26]}$$

As a result, $$\text{In} = \frac{Vr}{Vs} = -Kb$$

In this way, the internal lockup speed change ratio In of the planetary stepless speed-changing mechanism 24 according to the second embodiment depends upon a combination of gears in the planetary gear mechanism 81 and Kb.

As described above, according to the second embodiment, the speed-changing device 21 is provided with the input shaft 22 (input member), the output shaft 23 (output member), the planetary gear mechanism 81 (planetary mechanism), the first variator 33, the second variator 34 and the controller 25. In addition, the planetary gear mechanism 81 is configured to include three members of the carrier 81A, the sun gear 81B (sun member) rotating about the rotation center axis of the carrier 81A and the ring gear 81C (ring member) that is positioned closer to the radial outside than the sun gear 81B and rotates about the rotation center axis of the carrier 81A.

In this case, for example, as shown in FIG. 21 and FIG. 22, the carrier 81A as the first member that is one of the three members is connected via the second connecting member 31 (the other member) to the input shaft 22. The sun gear 81B as the second member apart from the carrier 81A is connected via the first connecting member 30 and the second clutch 36 (any of them is the other member) to the first variator 33. The ring gear 81C as the third member apart from the carrier 81A and the sun gear 81B is connected via the third connecting member 32, the idler element 28 and the multistage speed-changing mechanism 26 (any of them is the other member) to the output shaft 23. It should be noted that the carrier 81A (first member) may be connected directly to the input shaft 22. The sun gear 81B (second member) may be connected directly to the first variator 33. The ring gear 81C (third member) may be connected directly to the output shaft 23.

Here, the planet gear 81D (planet member) is supported on the carrier 81A, the planet gear 81D performing the power transmission while revolving about the rotation center axis S of the carrier 81A and rotating with the sun gear 81B and the ring gear 81C. The planetary gear mechanism 81 distributes the torque transmitted to the carrier 81A (first member) of the planetary gear mechanism 81 from the engine 9 to the sun gear 81B (second member) and the ring gear 81C (third member). The planetary gear mechanism 81 performs the rotation motion with two degrees of freedom between the carrier 81A, the sun gear 81B and the ring gear 81C. The second variator 34 transmits the power transmitted from the first variator 33 to the load (output shaft 23) or the power source (input shaft 22), or transmits the power transmitted from the load (output shaft 23) or the power source (input shaft 22) to the first variator 33. The controller 25 changes the rotation speed of the first variator 33 to change the rotation speed of the output shaft 23 in relation to the rotation speed of the input shaft 22.

That is, the speed-changing device 21 in the second embodiment performs the speed change steplessly by the planetary gear mechanism 81 and transmits the power transmitted from the power source (input shaft 22) to the load (output shaft 23) or transmits the power transmitted from the load (output shaft 23) to the power source (input shaft 22). In this case, the speed-changing device 21 is provided with the planetary gear mechanism 81 disposed between the input shaft 22 and the output shaft 23, the first variator 33 connected to the planetary gear mechanism 81, and the second variator 34 for transmitting the power transmitted from the first variator 33 to the load or the power source. In addition, the planetary gear mechanism 81 is provided with the carrier 29A that is connected to the input shaft 22 and on which the planet gear 81D is supported, the sun gear 81B connected to the first variator 33, and the ring gear 81C connected via the idler element 28 and the multistage speed-changing mechanism 26 to the output shaft 23. Further, the speed-changing device 21 is provided with at least one of the internal lockup and the external lockup (direct connecting mechanism 27). The speed-changing device 21 can perform the switching between the power transmission by the planetary stepless speed-changing mechanism 24 and the power transmission by the lockup. Therefore, the second embodiment can also achieve the same functional effects as those in the first embodiment.

According to the second embodiment, as similar to the first embodiment, the speed-changing device 21 is provided with two power transmission routes composed of the first power transmission route (planetary stepless speed-changing mechanism 24) and the second power transmission route (direct connecting mechanism 27). Thereby, the transmission efficiency can improve more than the configuration of performing the internal lockup only.

According to the second embodiment, as similar to the first embodiment, the controller 25 stops the rotation of the sun gear 81B (second member) in the planetary gear mechanism 81 to realize the state of the internal lockup. In this case, the controller 25 outputs a command of making the rotation speed be 0 to the first variator 33. Alternatively, the controller 25 outputs a command of stopping the rotation of the member to be connected to the first variator 33 by a mechanical engagement. Alternatively, the controller 25 outputs a command of blocking the power to be sent to the second variator 34 from the first variator 33. Thereby, the controller 25 stops the rotation of the sun gear 81B. In any case, the internal lockup can be realized by stopping the rotation of the sun gear 81B in the planetary gear mechanism 81 to improve the transmission efficiency.

According to the second embodiment, as similar to the first embodiment, the lockup rotation speed ratio is larger than the synchronization rotation speed ratio. Therefore, at the time of transmitting the power through the second power transmission route (direct connecting mechanism 27) as the external lockup mechanism, the speed can increase.

According to the second embodiment, as similar to the first embodiment, the controller 25 disconnects the second clutch 36 during the time a vehicle is stopped. As a result, when a vehicle speed of the vehicle is 0, the power transmission to the first variator can be blocked.

According to the second embodiment, as similar to the first embodiment, the controller 25 engages the second clutch 36 for stopping the sun gear 81B (second member). In addition, the controller 25 disengages the third clutch 37. Therefore, at the internal lockup the power transmission to the second variator 34 can be blocked.

According to the second embodiment, as similar to the first embodiment, the controller 25 disengages at least one of the second clutch 36 and the third clutch 37 when the first clutch 27C is engaged. Therefore, at the external lockup the power transmission to at least one of the first variator 33 and the second variator 34 can be blocked.

According to the second embodiment, as similar to the first embodiment, the speed-changing device 21 is provided with the multistage speed-changing mechanism 26 as a sub speeding-changing mechanism between the ring gear 81C (third member) and the output shaft 23 (output member). Therefore, the speed-changing device 21 can reverse the rotation direction of the load (output shaft 23).

According to the second embodiment, as similar to the first embodiment, the second variator 34 is connected to the idler element 28 (specifically, the idler gear 28B as a rotation element) disposed between the planetary gear mechanism 81 and the multistage speed-changing mechanism 26. It should be noted that as shown in FIG. 30 to FIG. 39, the second variator 34 may be configured to be connected to a rotation element disposed between the input shaft 22 (input member) and the drive source (engine 9), a rotation element configuring the multistage speed-changing mechanism 26, a rotation element disposed between the multistage speed-changing mechanism 26 and the output shaft 23 (output member), the output shaft 23 (output member), or a rotation element disposed between the output shaft 23 and the load.

Figure 30:
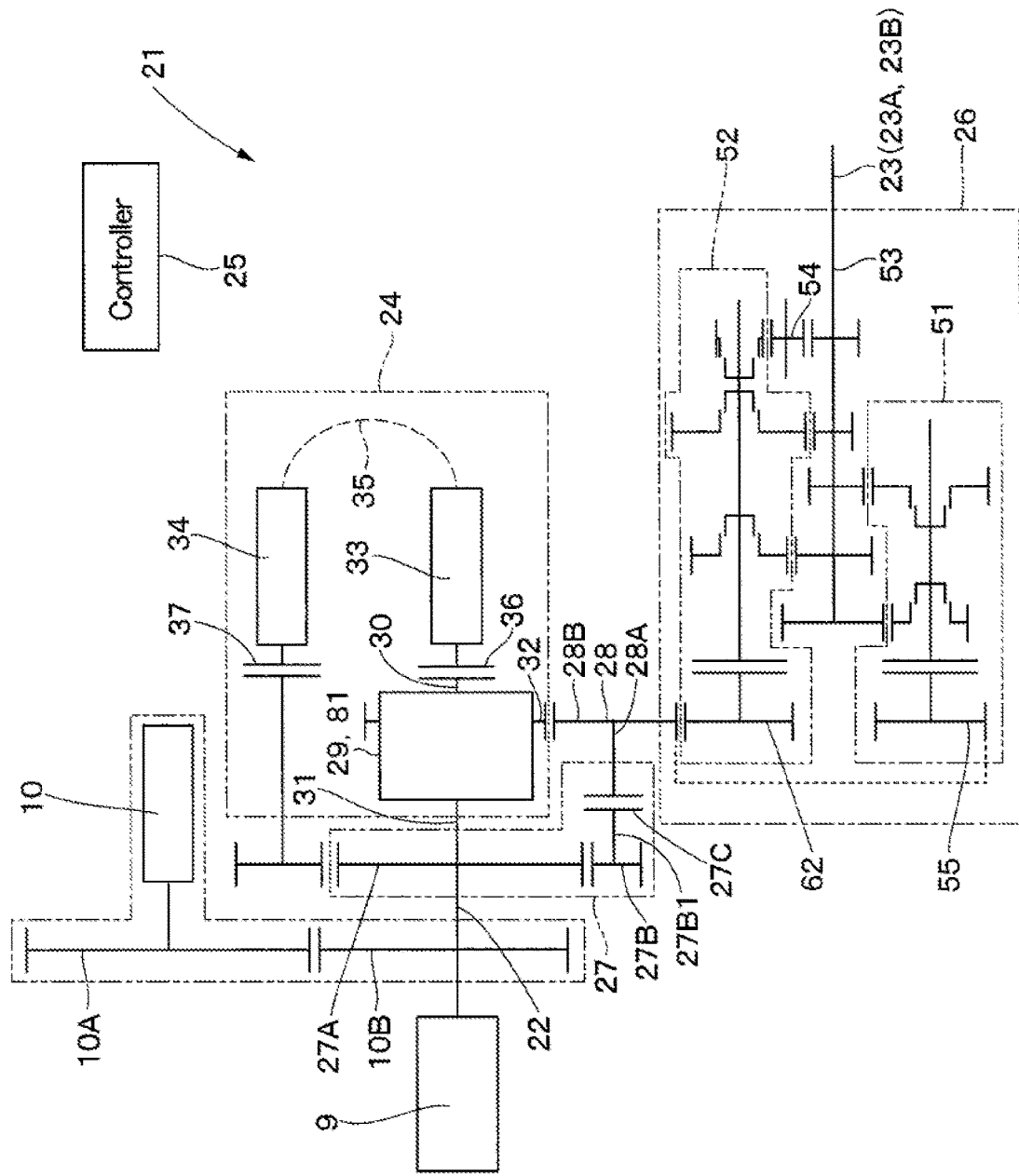
FIG. 30 is a configuration diagram as similar to FIG. 3, showing a twelfth modification example (configuration in which a second variator is connected to an input shaft).

That is, the first embodiment and the second embodiment are so configured that the second variator 34 is connected closer to the output shaft 23 (output member)-side than the planetary gear mechanism 29, that is, the second variator 34 is connected between the planetary gear mechanism 29 and the output shaft 23. On the other hand, FIG. 30 shows a twelfth modification example. In the twelfth modification example, the second variator 34 is connected to the input gear 27A of the direct connecting mechanism 27 disposed in the input shaft 22. That is, the second variator 34 is connected between the planetary gear mechanism 29 and the input shaft 22 (input member). In this way, the second variator 34 may be configured to be connected closer to the engine 9-side (drive source side) than the planetary gear mechanism 29. It should be noted that the illustration is omitted but the second variator 34 may be connected to the lockup gear 27B in the direct connecting mechanism 27.

Figure 31:
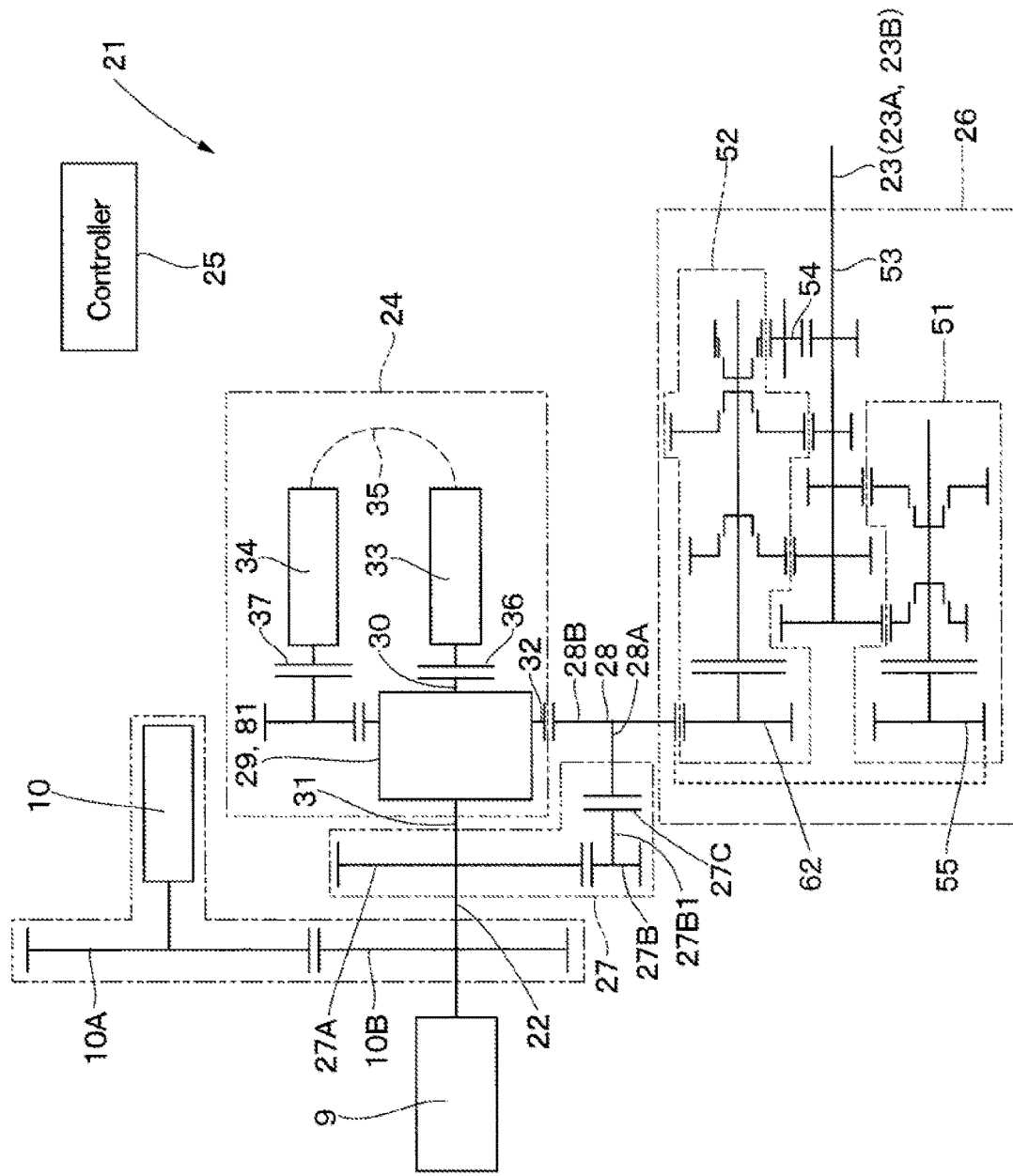
FIG. 31 is a configuration diagram as similar to FIG. 3, showing a thirteenth modification example (configuration in which a second variator is connected to a third connecting member linked to an idler element).
Figure 32:
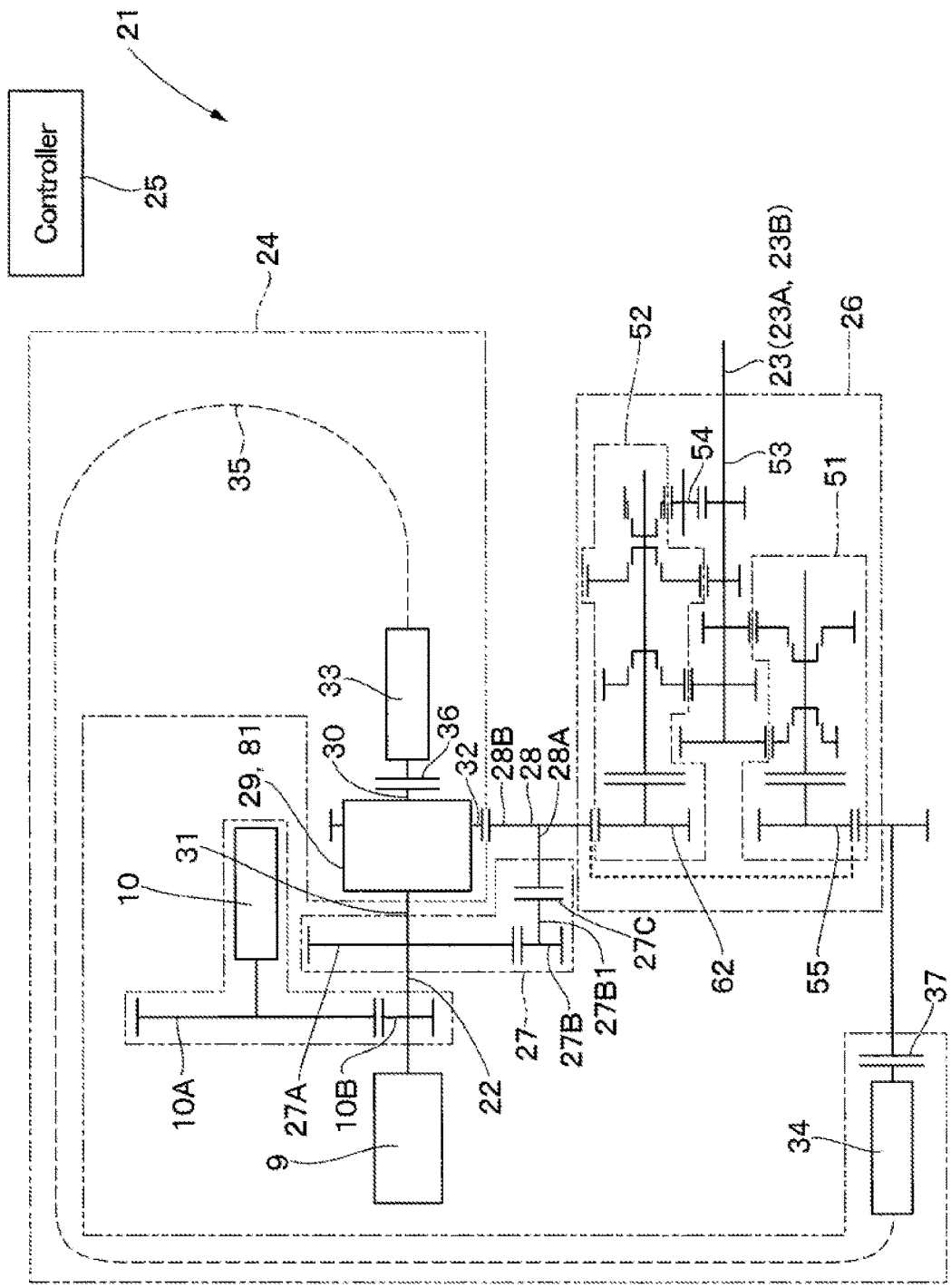
FIG. 32 is a configuration diagram as similar to FIG. 3, showing a fourteenth modification example (configuration in which a second variator is connected to an odd-numbered stage gear in a multistage speed-changing mechanism).
Figure 33:
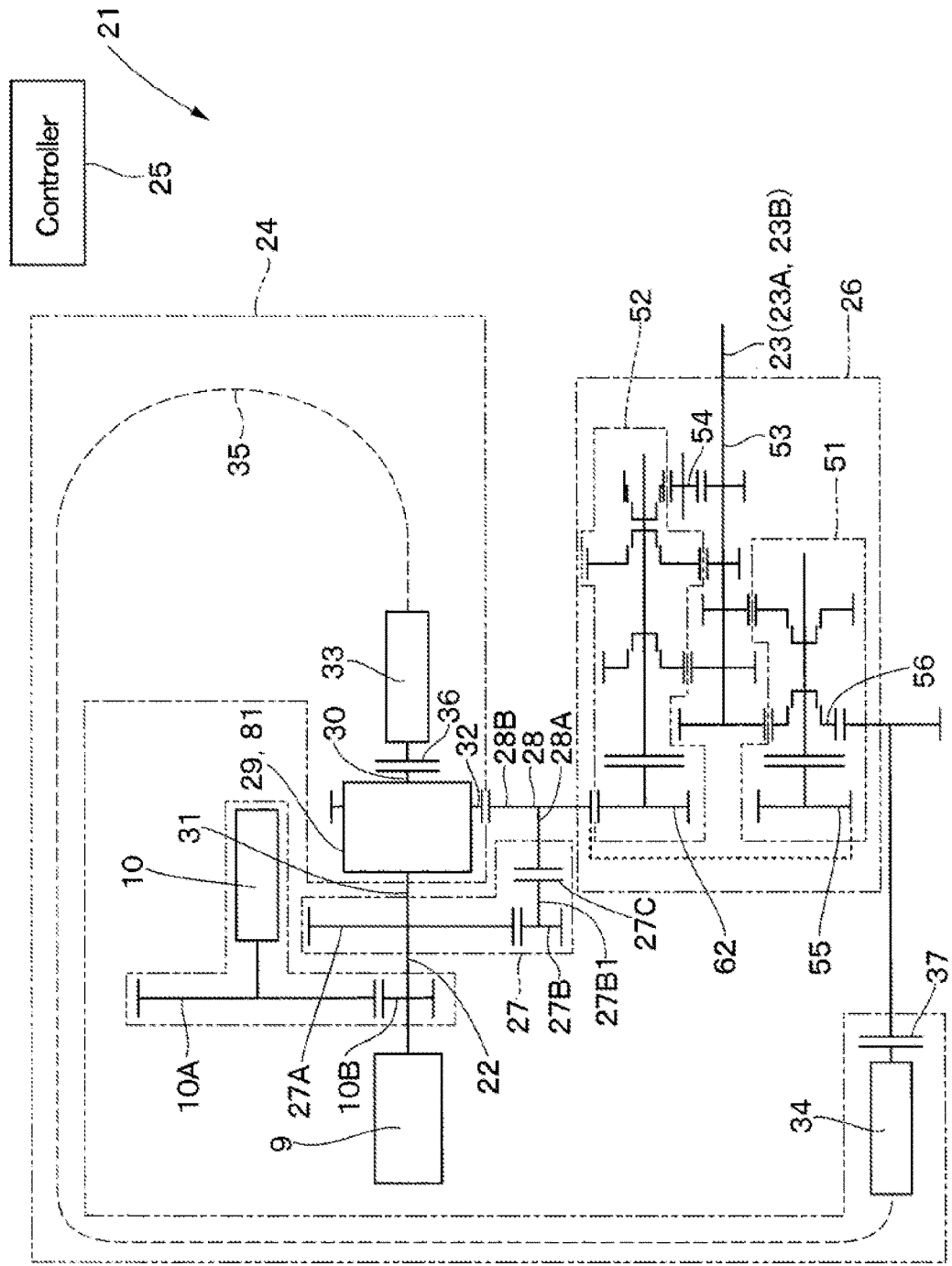
FIG. 33 is a configuration diagram as similar to FIG. 3, showing a fifteenth modification example (configuration in which a second variator is connected to a forward one-speed gear in a multistage speed-changing mechanism).
Figure 34:
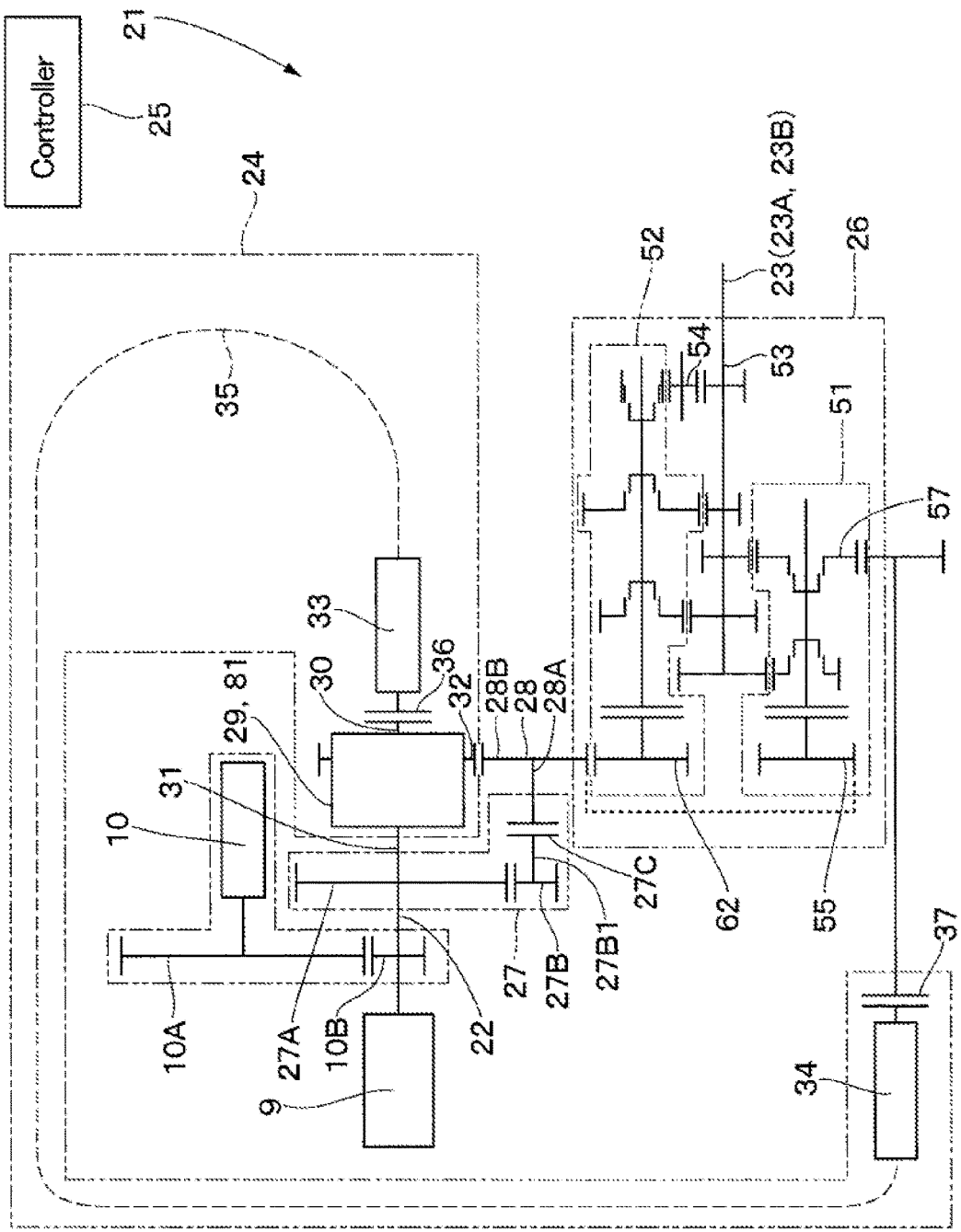
FIG. 34 is a configuration diagram as similar to FIG. 3, showing a sixteenth modification example (configuration in which a second variator is connected to a forward three-speed gear in a multistage speed-changing mechanism).
Figure 35:
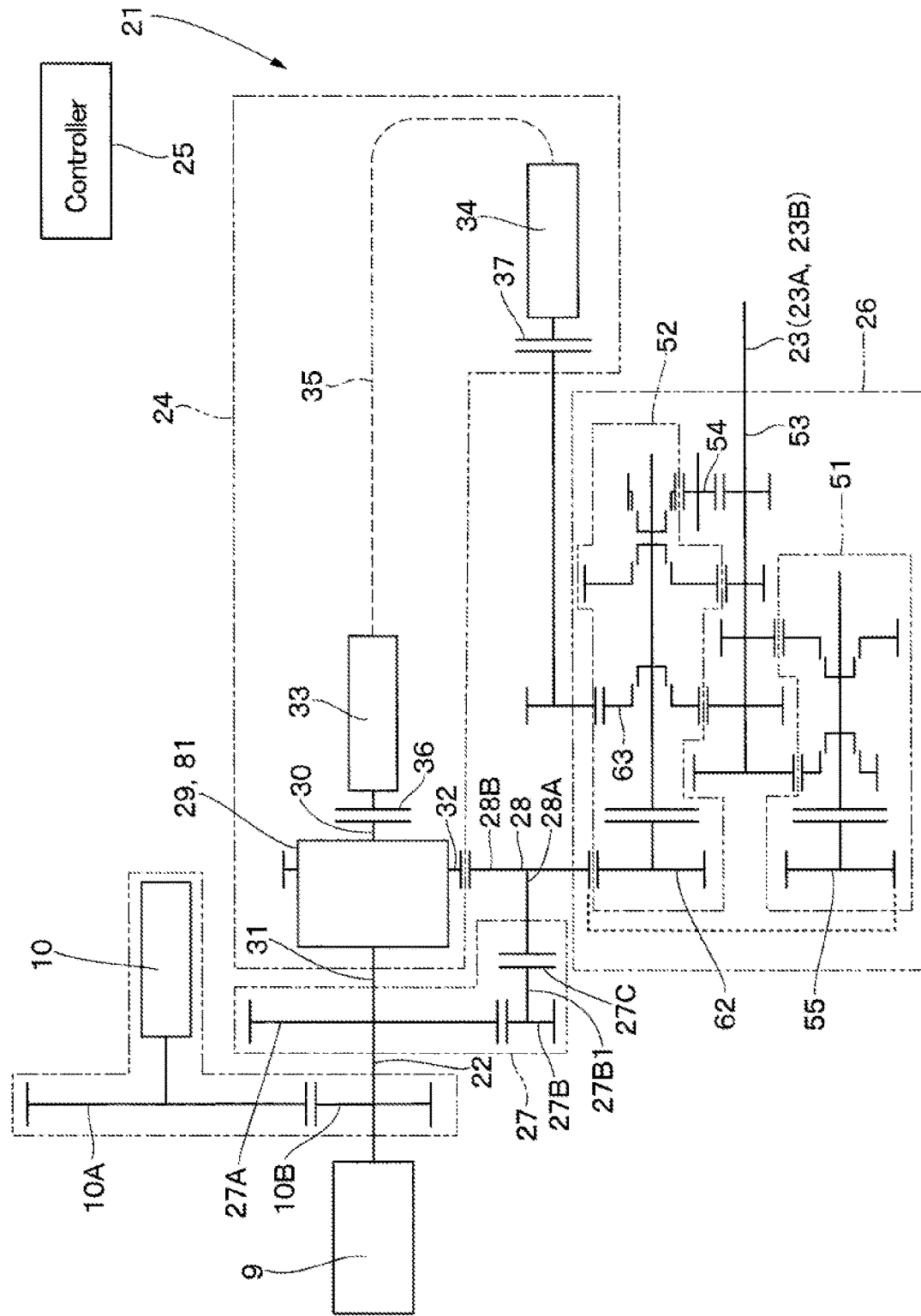
FIG. 35 is a configuration diagram as similar to FIG. 3, showing a seventeenth modification example (configuration in which a second variator is connected to a forward two-speed gear in a multistage speed-changing mechanism).
Figure 36:
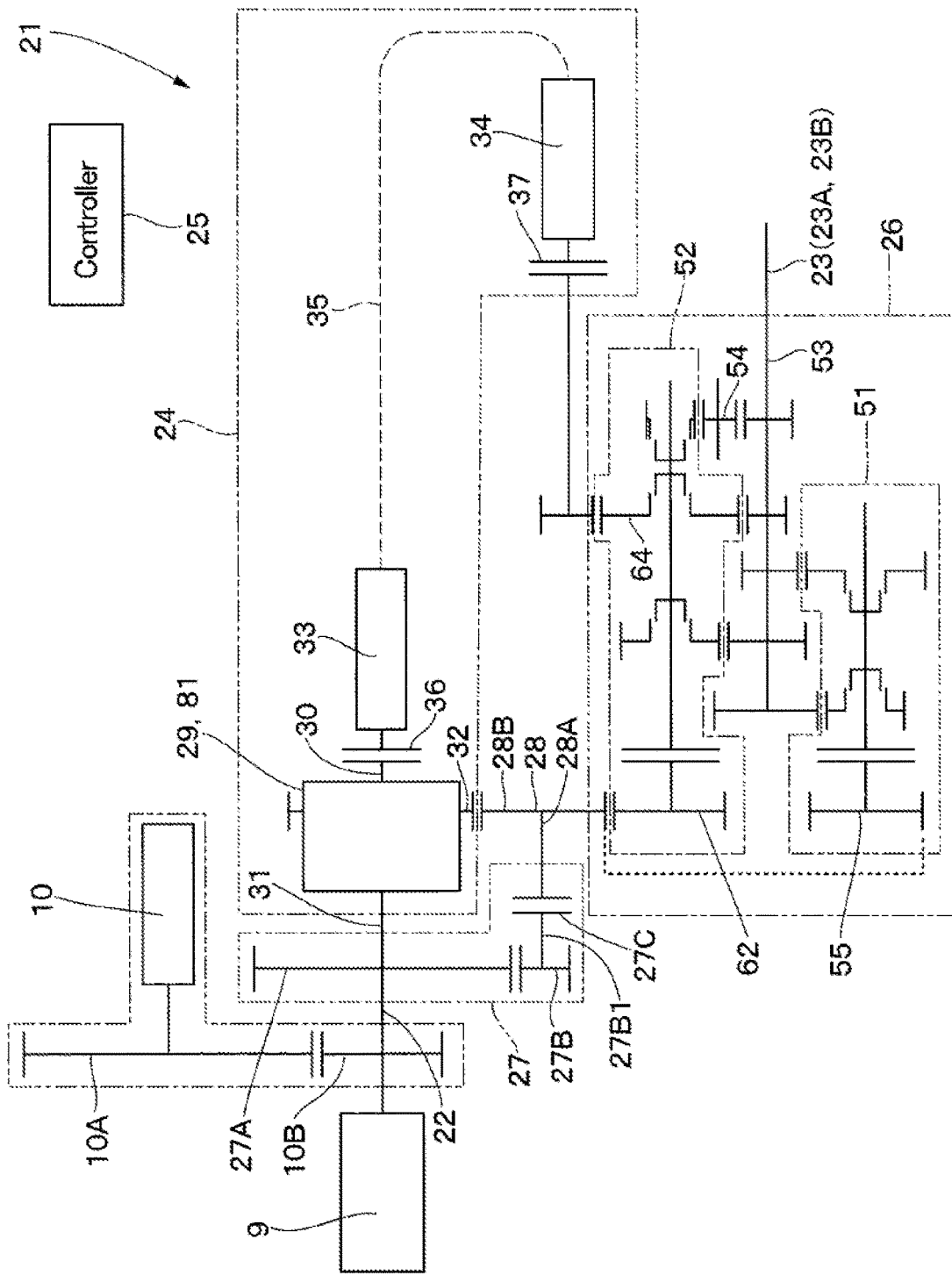
FIG. 36 is a configuration diagram as similar to FIG. 3, showing an eighteenth modification example (configuration in which a second variator is connected to a forward four-speed gear in a multistage speed-changing mechanism).
Figure 37:
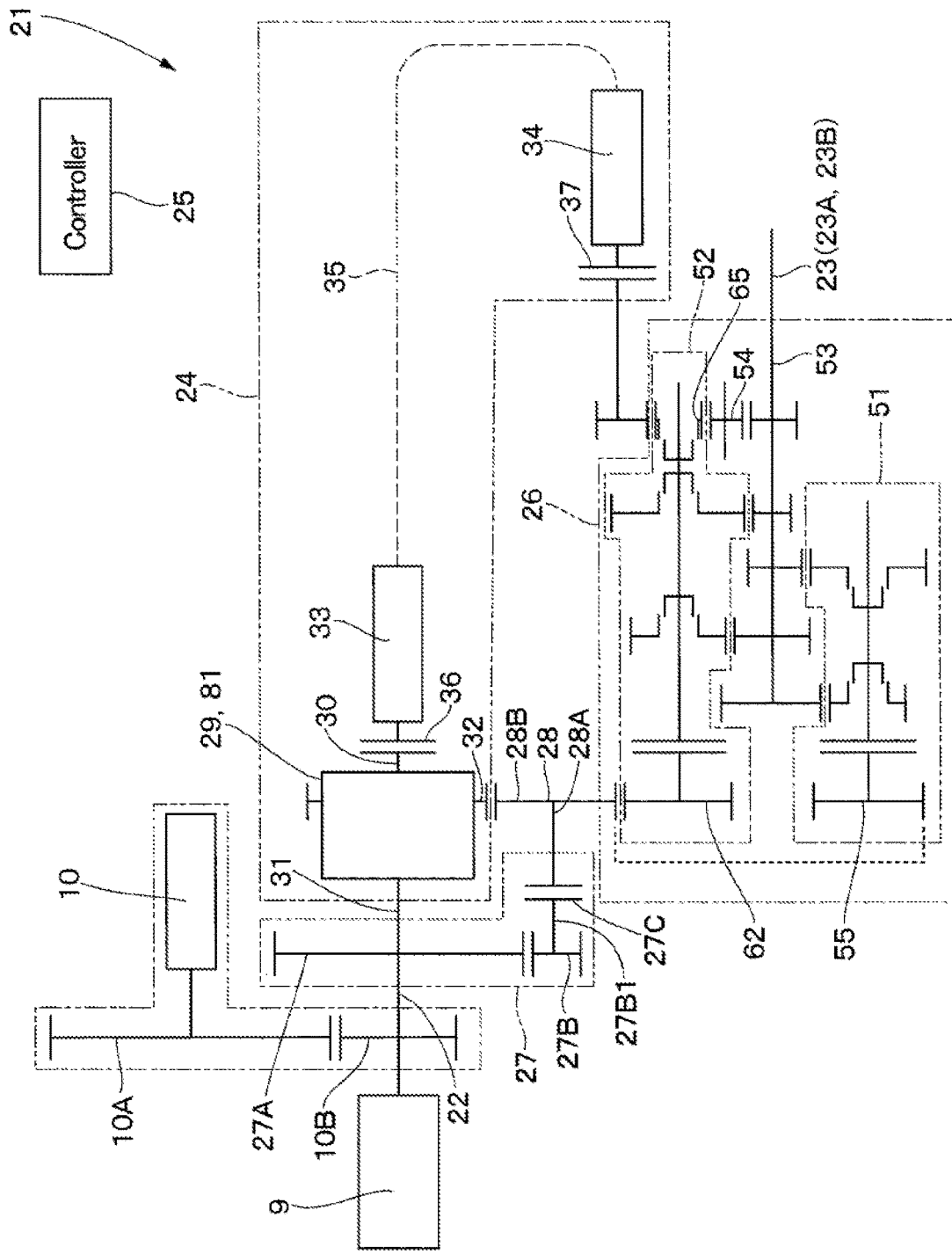
FIG. 37 is a configuration diagram as similar to FIG. 3, showing a nineteenth modification example (configuration in which a second variator is connected to a backward one-speed gear in a multistage speed-changing mechanism).

FIG. 31 shows a thirteenth modification example. In the thirteenth modification example, the second variator 34 is connected to the third connecting member 32 linked to the idler element 28. FIG. 32 shows a fourteenth modification example. In the fourteenth modification example, the second variator 34 is connected to the odd numbered stage gear 55 of the multistage speed-changing mechanism 26. It should be noted that the illustration is omitted but the second variator 34 may be connected to the even numbered stage gear 62 of the multistage speed-changing mechanism 26. FIG. 33 shows a fifteenth modification example. In the fifteenth modification example, the second variator 34 is connected to the forward one-speed gear 56 of the multistage speed-changing mechanism 26. FIG. 34 shows a sixteenth modification example, wherein the second variator 34 is connected to the forward three-speed gear 57 of the multistage speed-changing mechanism 26. FIG. 35 shows a seventeenth modification example, wherein the second variator 34 is connected to the forward two-speed gear 63 of the multistage speed-changing mechanism 26. FIG. 36 shows an eighteenth modification example, wherein the second variator 34 is connected to the forward four-speed gear 64 of the multistage speed-changing mechanism 26. FIG. 37 shows a nineteenth modification example, wherein the second variator 34 is connected to the backward one-speed gear 65 of the multistage speed-changing mechanism 26. It should be noted that the illustration is omitted but the second variator 34 may be connected to the counter gear 54 of the multistage speed-changing mechanism 26.

Figure 38:
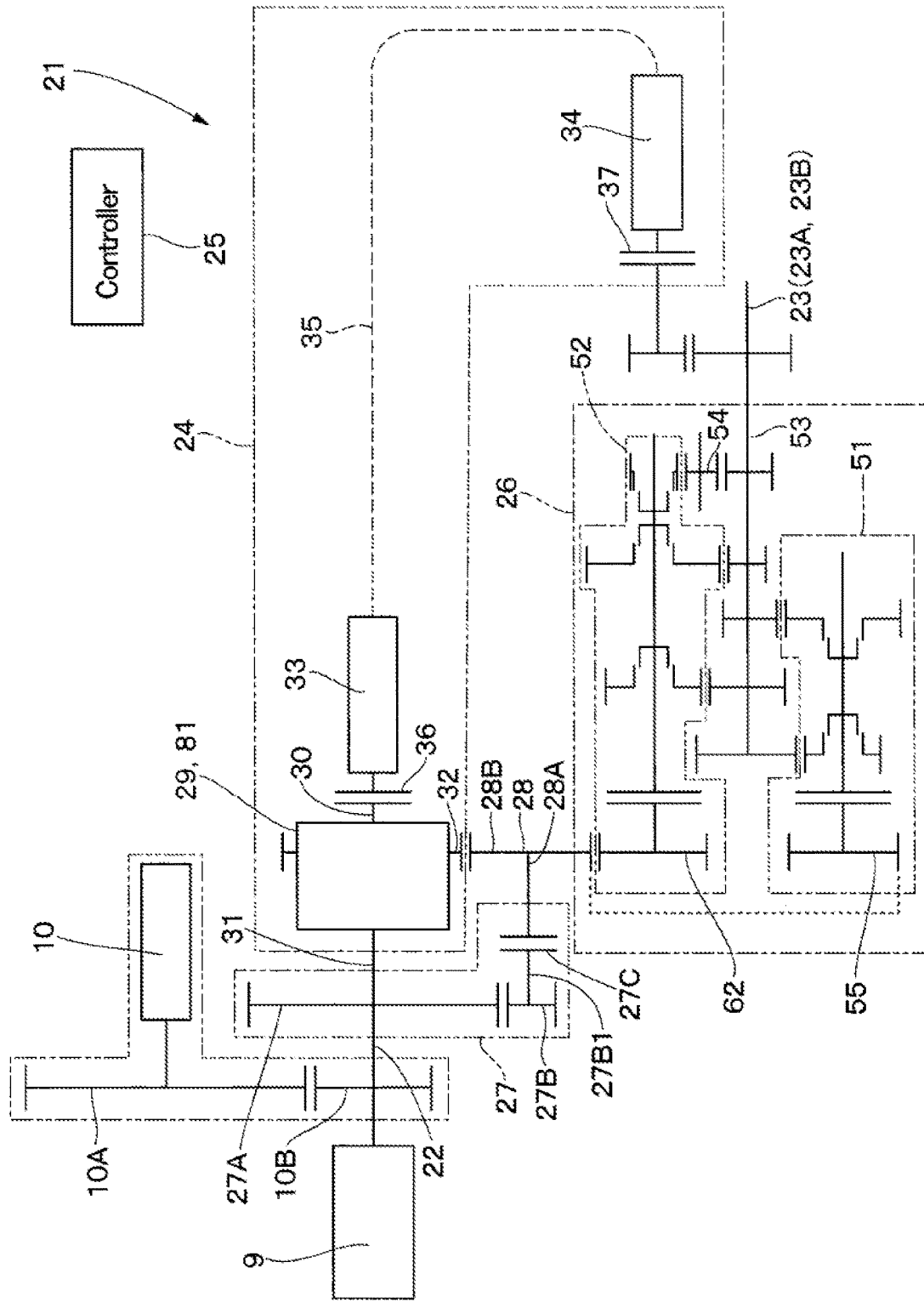
FIG. 38 is a configuration diagram as similar to FIG. 3, showing a twenty-first modification example (configuration in which a second variator is connected to an output shaft).
Figure 39:
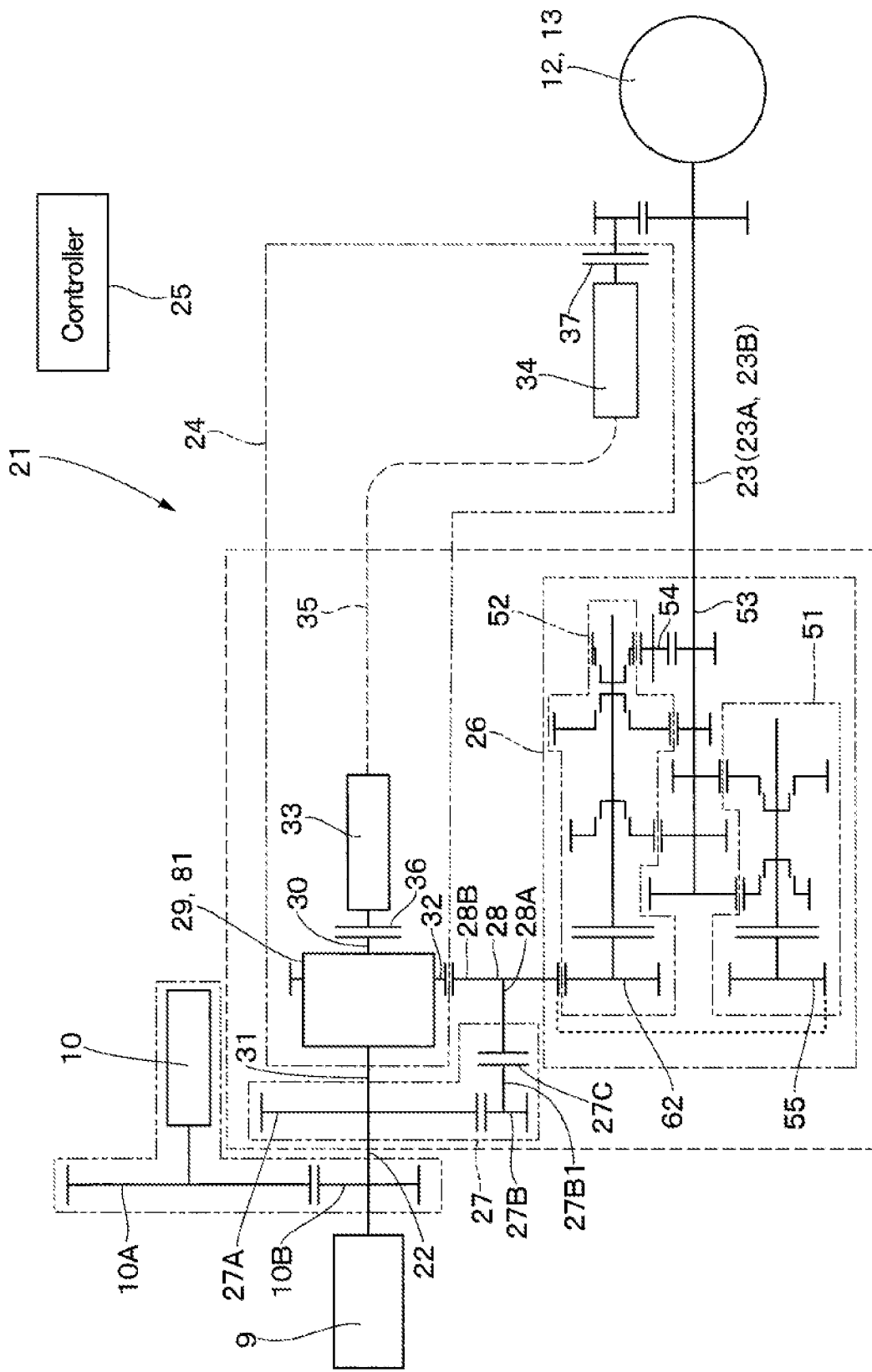
FIG. 39 is a configuration diagram as similar to FIG. 3, showing a twentieth modification example (configuration in which a second variator is connected closer to a load-side than an output shaft in a speed-changing device).

FIG. 38 shows a twentieth modification example, wherein the second variator 34 is connected to the output shaft 53 of the multistage speed-changing mechanism 26 (output shaft 23 in the speed-changing device 21). It should be noted that the illustration is omitted but the second variator 34 may be connected to the one-speed output gear 71, the two-speed output gear 72, the three-speed output gear 73, the four-speed output gear 74 or the backward one-speed output gear 75 in the multistage speed-changing mechanism 26. FIG. 39 shows a twenty-first modification example, wherein the second variator 34 is connected closer to the load side (front axle 12-side and rear axle 13-side) than the output shaft 23 in the speed-changing device 21. It should be noted that the illustration is omitted but the second variator 34 may be connected to the front axle 12, the rear axle 13, the front propeller shaft 14 or the rear propeller shaft 15. According to the modification examples, for example, the fifteenth to twenty-first modification examples as shown in FIG. 33 to FIG. 39, the idler element 28 (idler gear 28B) and the multistage speed-changing mechanism 26 can be small-sized by connecting the second variator 34 closer to the output shaft 53-side than the idler gear 28B. Thereby, the speed-changing device 21 can be manufactured in lower costs.

It should be noted that in the first embodiment the explanation is made by taking the speed-changing device 21 provided with the multistage speed-changing mechanism 26 as an example. However, not limited thereto, the multistage speed-changing mechanism 26 may be omitted in the speed-changing device 21. In this case, for example, by screwing the output gear of the output shaft 23 to the third connecting member 32, the planetary gear mechanism 29 in the planetary stepless speed-changing mechanism 24 can be connected to the output shaft 23 (output member). In addition, in this case the second variator 34 may be connected closer to the output shaft 23-side (output member side) than the planetary gear mechanism 29, and the second variator 34 may be connected closer to the input shaft 22-side (input member side) than the planetary gear mechanism 29. Further, in the first embodiment the explanation is made by taking the speed-changing device 21 provided with the direct connecting mechanism 27 as the external lockup as an example, but the direct connecting mechanism 27 may be omitted. These matters can similarly be applied to the second embodiment and the respective modification examples.

The first embodiment is explained by taking a case where the speed-changing device 21 is mounted on the wheel loader 1 as an example. However, not limited thereto, the speed-changing device 21 may be mounted on working vehicles (construction machines) of hydraulic excavators, hydraulic cranes, dump trucks, forklifts and the like other than the wheel loader. In addition, the speed-changing device 21, not limited to the working vehicles, can be applied widely as speed-changing devices incorporated in various vehicles of automobiles, railway vehicles and the like, or various industrial machines and general machinery. This is similarly applied to the second embodiment and the respective modification examples.

In addition, the respective embodiments and the respective modification examples as described above are simply exemplified and without mentioning, a partial replacement and combination of components shown in the different embodiments and in the different modification examples are made possible.

DESCRIPTION OF REFERENCE NUMERALS

1: WHEEL LOADER (WORKING VEHICLE)
21, 21A, 21B, 21C, 21D, 21E: SPEED-CHANGING DEVICE
22: INPUT SHAFT (INPUT MEMBER)
23, 23A, 23B: OUTPUT SHAFT (OUTPUT MEMBER)
24: PLANETARY STEPLESS SPEED-CHANGING MECHANISM (FIRST POWER TRANSMISSION ROUTE)
25: CONTROLLER
26: MULTISTAGE SPEED-CHANGING MECHANISM (SUB SPEED-CHANGING MECHANISM, FIRST OUTPUT TRANSMISSION ROUTE, SECOND OUTPUT TRANSMISSION ROUTE)
27: DIRECT CONNECTING MECHANISM (EXTERNAL LOCKUP MECHANISM, SECOND POWER TRANSMISSION ROUTE)
27C: FIRST CLUTCH
28: IDLER ELEMENT
29: PLANETARY GEAR MECHANISM (PLANETARY MECHANISM)
29A: CARRIER (FIRST MEMBER, SECOND MEMBER, THIRD MEMBER)
29B: FIRST SUN GEAR (FIRST SUN MEMBER, FIRST MEMBER, SECOND MEMBER, THIRD MEMBER)
29C: SECOND SUN GEAR (SECOND SUN MEMBER, FIRST MEMBER, SECOND MEMBER, THIRD MEMBER)
33: FIRST VARIATOR
34: SECOND VARIATOR
36: SECOND CLUTCH
51: ODD NUMBERED SHAFT (FIRST OUTPUT TRANSMISSION ROUTE)
52: EVEN NUMBERED SHAFT (SECOND OUTPUT TRANSMISSION ROUTE)
58: FOURTH CLUTCH (FIRST OUTPUT CLUTCH)
66: FIFTH CLUTCH (SECOND OUTPUT CLUTCH)
69: NINTH CLUTCH (SECOND OUTPUT CLUTCH)
81: PLANETARY GEAR MECHANISM (PLANETARY MECHANISM)
81A: CARRIER (FIRST MEMBER, SECOND MEMBER, THIRD MEMBER)
81B: SUN GEAR (SUN MEMBER, FIRST MEMBER, SECOND MEMBER, THIRD MEMBER)
81C: RING GEAR (RING MEMBER, FIRST MEMBER, SECOND MEMBER, THIRD MEMBER)

The invention claimed is:
1. A speed-changing device comprising:
an input shaft linked to a power source;
an output shaft linked to a load;
a planetary mechanism disposed between the input shaft and the output shaft;
a first variator connected to the planetary mechanism;
a second variator disposed apart from the first variator; and
a controller configured to change a rotation speed of the first variator, characterized in that:
the planetary mechanism is configured to include three members of a carrier, a first sun member rotating about a rotation center axis of the carrier and a second sun member rotating about the rotation center axis of the carrier, wherein
a first member that is one of the three members in the planetary mechanism is connected directly or via another member to the input shaft,
a second member apart from the first member of the three members in the planetary mechanism is connected directly or via another member to the first variator,
a third member apart from the first member and the second member of the three members in the planetary mechanism is connected directly or via another member to the output shaft, and
a planet member and a balance member are supported on the carrier of the planetary mechanism, the planet member and the balance member performing power transmission while revolving about the rotation center axis of the carrier and rotating with the first sun member and the second sun member, wherein
the planetary mechanism distributes torque transmitted to the planetary mechanism from the power source to the second member and the third member,
the planetary mechanism performs a rotation motion with two degrees of freedom between the first member, the second member and the third member,
the second variator transmits power transmitted from the first variator to the load or the power source, or transmits power transmitted from the load or the power source to the first variator, and
the controller changes a rotation speed of the first variator to change a rotation speed of the output shaft in relation to a rotation speed of the input shaft.

2. The speed-changing device according to claim 1, wherein
the controller stops rotation of the second member in the planetary mechanism to change a state of performing the rotation motion with two degrees of freedom between the first member, the second member and the third member to a state of performing the rotation motion with one degree of freedom, and to transmit the power transmitted from the power source to the planetary mechanism to the load in the state with the one degree of freedom.

3. The speed-changing device according to claim 1, further comprising:
a first power transmission route as a power transmission route for transmitting the power from the power source through the planetary mechanism to the load;
a second power transmission route that is disposed in parallel with the first power transmission route to transmit the power to the load by meshing of gears each other without via the planetary mechanism; and a first clutch disposed in the second power transmission route to switch the engagement and disengagement, wherein the controller engages the first clutch to perform power transmission through the second power transmission route.

4. The speed-changing device according to claim 1, further comprising:

a second clutch disposed between the second member and the first variator to switch transmission and release of the power between the second member and the first variator, wherein the controller, during the time a vehicle is stopped, disengages the second clutch to disconnect the power transmission between the second member and the first variator.

5. The speed-changing device according to claim 1, further comprising:

a first output transmission route disposed between the third member and the output shaft, the number of times in meshing of gears therebetween being the odd number of times; and a second output transmission route disposed between the third member and the output shaft, the number of times in the meshing of gears therebetween being the zero number of times or the even number of times, wherein the first output transmission route is provided with a first output clutch to switch transmission and release of power in the first output transmission route, the second output transmission route is provided with a second output clutch to switch transmission and release of power in the second output transmission route, and the controller switches a normal rotation mode in which the first output clutch is engaged and the second output clutch is disengaged, and a reverse rotation mode in which the first output clutch is disengaged and the second output clutch is engaged, thereby reversing a forward direction of a vehicle.

6. A speed-changing device comprising:

an input shaft linked to a power source;

an output shaft linked to a load;

a planetary mechanism disposed between the input shaft and the output shaft;

a first variator connected to the planetary mechanism;

a second variator disposed apart from the first variator; and a controller configured to change a rotation speed of the first variator, characterized in that:

the planetary mechanism is configured to include three members of a carrier, a sun member rotating about a rotation center axis of the carrier and a ring member positioned closer to a radial outside than the sun member and rotating about the rotation center axis of the carrier, wherein a first member that is one of the three members in the planetary mechanism is connected directly or via another member to the input shaft, a second member apart from the first member of the three members in the planetary mechanism is connected directly or via another member to the first variator, a third member apart from the first member and the second member of the three members in the planetary mechanism is connected directly or via another member to the output shaft, and a planet member is supported on the carrier of the planetary mechanism, the planet member performing power transmission while revolving about the rotation center axis of the carrier and rotating with the sun member and the ring member, wherein the planetary mechanism distributes torque transmitted to the planetary mechanism from the power source to the second member and the third member, the planetary mechanism performs a rotation motion with two degrees of freedom between the first member, the second member and the third member, the second variator transmits power transmitted from the first variator to the load or the power source, or transmits power transmitted from the load or the power source to the first variator, and the controller changes a rotation speed of the first variator to change a rotation speed of the output shaft in relation to a rotation speed of the input shaft, further comprising:

a first power transmission route as a power transmission route for transmitting the power from the power source through the planetary mechanism to the load, a second power transmission route that is disposed in parallel with the first power transmission route to transmit the power to the load by meshing of gears each other without via the planetary mechanism, and a first clutch disposed in the second power transmission route to switch the engagement and disengagement, wherein the controller engages the first clutch to perform power transmission through the second power transmission route.

7. The speed-changing device according to claim 6, wherein the controller stops rotation of the second member in the planetary mechanism to change a state of performing the rotation motion with two degrees of freedom between the first member, the second member and the third member to a state of performing the rotation motion with one degree of freedom, and to transmit the power transmitted from the power source to the planetary mechanism to the load in the state with the one degree of freedom.

8. The speed-changing device according to claim 6, further comprising:

a second clutch disposed between the second member and the first variator to switch transmission and release of the power between the second member and the first variator, wherein the controller disengages the second clutch during the time a vehicle is stopped.

9. The speed-changing device according to claim 6, further comprising:

a first output transmission route disposed between the third member and the output shaft, the number of times in meshing of gears therebetween being the odd number of times; and a second output transmission route disposed between the third member and the output shaft, the number of times in the meshing of gears therebetween being the zero number of times or the even number of times, wherein the first output transmission route is provided with a first output clutch to switch transmission and release of power in the first output transmission route, the second output transmission route is provided with a second output clutch to switch transmission and release of power in the second output transmission route, and the controller switches a normal rotation mode in which the first output clutch is engaged and the second output clutch is disengaged, and a reverse rotation mode in which the first output clutch is disengaged and the second output clutch is engaged, thereby reversing a forward direction of a vehicle.

\* \* \* \* \*